(12) United States Patent
Scott et al.

(10) Patent No.: US 7,283,584 B2
(45) Date of Patent: *Oct. 16, 2007

(54) DIRECT DIGITAL ACCESS ARRANGEMENT CIRCUITRY AND METHOD FOR CONNECTING TO PHONE LINES

(75) Inventors: Jeffrey W. Scott, Austin, TX (US);
Navdeep S. Sooch, Austin, TX (US);
David R. Welland, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 662 days.

This patent is subject to a terminal disclaimer.

(21) Appl. No.: 10/780,142

(22) Filed: Feb. 17, 2004

(65) Prior Publication Data
US 2004/0161023 A1 Aug. 19, 2004

Related U.S. Application Data

(63) Continuation of application No. 10/227,104, filed on Aug. 23, 2002, now Pat. No. 7,072,389, which is a continuation of application No. 10/127,285, filed on Apr. 22, 2002, which is a continuation of application No. 09/035,175, filed on Mar. 4, 1998, now Pat. No. 6,385,235, which is a continuation-in-part of application No. 08/841,409, filed on Apr. 22, 1997, now Pat. No. 6,137,827, and a continuation-in-part of application No. 08/837,702, filed on Apr. 22, 1997, now Pat. No. 5,870,046, and a continuation-in-part of application No. 08/837,714, filed on Apr. 22, 1997, now Pat. No. 6,430,229.

(51) Int. Cl.
*H04B 1/38* (2006.01)
*H04L 5/16* (2006.01)

(52) U.S. Cl. ............... 375/220; 375/222; 379/399.02; 379/412; 379/413

(58) Field of Classification Search ............... 375/220, 375/222, 285, 219, 257, 259, 359; 379/399.02, 379/412, 413
See application file for complete search history.

(56) References Cited

U.S. PATENT DOCUMENTS 3,750,024 A 7/1973 Dunn et al.

(Continued)

OTHER PUBLICATIONS

Boser et al., *The Design of Sigma-Delta Modulation Analog-to-Digital Converters*, IEEE J. Solid-State Circuits, vol. SC-23, pp. 1298-1308, Dec. 1988.

(Continued)

*Primary Examiner*—Phuong Phu
(74) *Attorney, Agent, or Firm*—O'Keefe, Egan, Peterman & Enders, LLP

(57) ABSTRACT

An isolation system is provided that is suitable for use in telephony, medical instrumentation, industrial process control and other applications. Preferred embodiments of the invention comprise a capacitive isolation barrier across which a digital signal is communicated. The system provides a means of communication across the isolation barrier that is highly immune to amplitude and phase noise interference. Clock recovery circuitry may be employed on one side of the isolation barrier to extract timing information from the digital signal communicated across the barrier, and to filter the effects of phase noise introduced at the barrier. Delta-sigma converters may be disposed on both sides of the isolation barrier to convert signals between analog and digital domains. An isolated power supply may also be provided on the isolated side of the barrier, whereby direct current is generated in response to the digital data received across the isolation barrier. Finally, a bidirectional isolation system is provided whereby bidirectional communication of digital signals is accomplished using a single pair of isolation capacitors. In preferred embodiments, the digital data communicated across the barrier consists of digital delta-sigma data signals multiplexed in time with other digital control, signaling and framing information.

59 Claims, 16 Drawing Sheets

U.S. PATENT DOCUMENTS

| | | |
|---|---|---|
| 3,904,833 A | 9/1975 | Beene et al. |
| 3,981,006 A | 9/1976 | Takayama et al. |
| 4,053,720 A | 10/1977 | Wycheck |
| 4,054,941 A | 10/1977 | Shichman |
| 4,066,843 A | 1/1978 | Waks et al. |
| 4,118,603 A | 10/1978 | Kumhyr |
| 4,192,978 A | 3/1980 | Vincent |
| 4,216,426 A | 8/1980 | Flora |
| 4,224,478 A | 9/1980 | Fahey et al. |
| 4,271,526 A | 6/1981 | Flora |
| 4,292,595 A | 9/1981 | Smith |
| 4,349,821 A | 9/1982 | Vancsa |
| 4,384,274 A | 5/1983 | Mao |
| 4,393,516 A | 7/1983 | Itani |
| 4,415,777 A | 11/1983 | Agnew |
| 4,417,099 A | 11/1983 | Pierce |
| 4,465,903 A | 8/1984 | Barber |
| 4,475,208 A | 10/1984 | Ricketts |
| 4,528,664 A | 7/1985 | Cheng et al. |
| 4,529,845 A | 7/1985 | Boeckmann |
| 4,540,854 A | 9/1985 | Beirne |
| 4,541,104 A | 9/1985 | Hirosaki |
| 4,567,331 A | 1/1986 | Martin |
| 4,594,577 A | 6/1986 | Mao |
| 4,607,170 A | 8/1986 | Wickman |
| 4,644,526 A | 2/1987 | Wu |
| 4,656,661 A | 4/1987 | Carbrey |
| 4,686,697 A | 8/1987 | Shapiro et al. |
| 4,686,699 A | 8/1987 | Wilkie |
| 4,712,233 A | 12/1987 | Kuo |
| 4,720,811 A | 1/1988 | Yamaguchi et al. |
| 4,741,031 A | 4/1988 | Grandstaff |
| 4,757,528 A | 7/1988 | Falater et al. |
| 4,835,486 A | 5/1989 | Somerville |
| 4,843,339 A | 6/1989 | Burt et al. |
| 4,864,605 A | 9/1989 | Ramsay et al. |
| 4,901,217 A | 2/1990 | Wilson |
| 4,901,275 A | 2/1990 | Hardie et al. |
| 4,943,807 A | 7/1990 | Early et al. |
| 4,993,063 A | 2/1991 | Kiko |
| 4,995,111 A | 2/1991 | Tojo et al. |
| 4,996,529 A | 2/1991 | Connell |
| 5,021,950 A | 6/1991 | Nishikawa |
| 5,032,819 A | 7/1991 | Sakuragi |
| 5,051,799 A | 9/1991 | Paul et al. |
| 5,058,129 A | 10/1991 | Gupta |
| 5,068,659 A | 11/1991 | Sakaguchi |
| 5,086,454 A | 2/1992 | Hirzel |
| 5,097,503 A | 3/1992 | Cotty |
| 5,136,630 A | 8/1992 | Breneman et al. |
| 5,204,896 A | 4/1993 | Oliver |
| 5,224,154 A | 6/1993 | Aldridge et al. |
| 5,235,634 A | 8/1993 | Oliver |
| 5,237,511 A | 8/1993 | Caird et al. |
| 5,245,654 A | 9/1993 | Wilkison et al. |
| 5,258,721 A | 11/1993 | Zanders |
| 5,260,941 A | 11/1993 | Wilder et al. |
| 5,262,779 A | 11/1993 | Sauer |
| 5,287,107 A | 2/1994 | Gampell et al. |
| 5,311,588 A | 5/1994 | Polcyn et al. |
| 5,323,398 A | 6/1994 | Wake et al. |
| 5,323,451 A | 6/1994 | Yatsunami |
| 5,329,281 A | 7/1994 | Baumgartner et al. |
| 5,329,585 A | 7/1994 | Susak et al. |
| 5,333,196 A | 7/1994 | Jakab |
| 5,337,338 A | 8/1994 | Sutton et al. |
| 5,343,514 A | 8/1994 | Snyder |
| 5,343,516 A | 8/1994 | Callele et al. |
| 5,355,407 A | 10/1994 | Lazik |
| 5,355,468 A | 10/1994 | Jeppesen, III et al. |
| 5,361,067 A | 11/1994 | Pinckley |
| 5,361,296 A | 11/1994 | Reyes et al. |
| 5,369,666 A | 11/1994 | Folwell et al. |
| 5,375,051 A | 12/1994 | Decker et al. |
| 5,377,260 A | 12/1994 | Long |
| 5,384,808 A | 1/1995 | Van Brunt et al. |
| 5,390,249 A | 2/1995 | Park |
| 5,406,283 A | 4/1995 | Leung |
| 5,410,594 A | 4/1995 | Maruyama |
| 5,426,698 A | 6/1995 | Reymond |
| 5,428,682 A | 6/1995 | Apfel |
| 5,438,678 A | 8/1995 | Smith |
| 5,442,694 A | 8/1995 | Chitrapu et al. |
| 5,459,721 A | 10/1995 | Yoshida |
| 5,467,385 A | 11/1995 | Reuben et al. |
| 5,473,552 A | 12/1995 | Chen et al. |
| 5,500,894 A | 3/1996 | Hershbarger |
| 5,500,895 A | 3/1996 | Yurgelites |
| 5,506,900 A | 4/1996 | Fritz |
| 5,506,903 A | 4/1996 | Yamashita |
| 5,509,068 A | 4/1996 | Bayless et al. |
| 5,511,118 A | 4/1996 | Gores et al. |
| 5,521,967 A | 5/1996 | Novas et al. |
| 5,533,053 A | 7/1996 | Hershbarger |
| 5,544,241 A | 8/1996 | Dibner et al. |
| 5,546,448 A | 8/1996 | Caswell et al. |
| 5,555,100 A | 9/1996 | Bloomfield et al. |
| 5,561,712 A | 10/1996 | Nishihara |
| 5,577,104 A | 11/1996 | Knuth et al. |
| 5,592,529 A | 1/1997 | Linsker |
| 5,598,157 A | 1/1997 | Kornblum et al. |
| 5,600,551 A | 2/1997 | Luscher, Jr. |
| 5,602,912 A | 2/1997 | Hershbarger |
| 5,644,629 A | 7/1997 | Chow |
| 5,654,984 A | 8/1997 | Hershbarger et al. |
| 5,655,010 A | 8/1997 | Bingel |
| 5,659,608 A | 8/1997 | Stiefel |
| 5,675,640 A | 10/1997 | Tappert et al. |
| 5,692,041 A | 11/1997 | Torazzina |
| 5,694,465 A | 12/1997 | Apfel |
| 5,705,978 A | 1/1998 | Frick et al. |
| 5,721,774 A | 2/1998 | Stiefel |
| 5,737,411 A | 4/1998 | Apfel et al. |
| 5,740,241 A | 4/1998 | Koenig et al. |
| 5,745,060 A | 4/1998 | McCartney et al. |
| 5,751,803 A | 5/1998 | Shpater |
| 5,790,656 A | 8/1998 | Rahamim et al. |
| 5,805,687 A | 9/1998 | Westergaard et al. |
| 5,818,923 A | 10/1998 | Consiglio et al. |
| 5,841,840 A | 11/1998 | Smith et al. |
| 5,848,133 A | 12/1998 | Kuwahara et al. |
| 5,859,584 A | 1/1999 | Counsell et al. |
| 5,870,046 A | 2/1999 | Scott et al. |
| 5,875,235 A | 2/1999 | Mohajeri |
| 5,881,102 A | 3/1999 | Samson |
| 5,881,129 A | 3/1999 | Chen et al. |
| 5,901,210 A | 5/1999 | Schley-May |
| 5,907,596 A | 5/1999 | Karnowski |
| 5,914,671 A | 6/1999 | Tuttle |
| 5,917,364 A | 6/1999 | Nakamura |
| 5,940,459 A | 8/1999 | Hsu et al. |
| 5,946,393 A | 8/1999 | Holcombe |
| 5,959,372 A | 9/1999 | Every |
| 5,982,317 A | 11/1999 | Madsen |
| 5,991,335 A | 11/1999 | Price |
| 6,005,923 A | 12/1999 | Lee |
| 6,061,051 A | 5/2000 | Chan et al. |
| 6,072,778 A | 6/2000 | Labedz et al. |
| 6,081,586 A | 6/2000 | Rahamin et al. |
| 6,107,948 A | 8/2000 | Scott et al. |
| 6,111,939 A | 8/2000 | Brabanec |
| 6,124,756 A | 9/2000 | Yaklin et al. |
| 6,137,827 A * | 10/2000 | Scott et al. .................. 375/219 |
| 6,191,717 B1 | 2/2001 | Scott et al. |

| | | |
|---|---|---|
| 6,205,219 B1 | 3/2001 | Hollenbach et al. |
| 6,225,927 B1 | 5/2001 | Scott et al. |
| 6,297,755 B2 | 10/2001 | Scott et al. |
| 6,385,235 B1* | 5/2002 | Scott et al. ............ 375/220 |
| 6,389,061 B1 | 5/2002 | Scott |
| 6,430,229 B1 | 8/2002 | Scott et al. |
| 6,570,513 B2* | 5/2003 | Scott et al. ............ 341/110 |

OTHER PUBLICATIONS

Candy, *A Use of Double Integration in Sigma Delta Modulation*, IEEE Trans. Commun., vol. COM-33, pp. 249-258, Mar. 1985.

Naus, et al., *A CMOS Stereo 16-bit D/A Converter for Digital Audio*, IEEE J. Solid-State Circuits, vol. SC-22, pp. 390-395, Jun. 1987.

Silicon Systems, *SSI 73D2950/2950T, Low Power FAX/Data Modem Chip Set Advance Information*, pp. 4-75-4-105, Dec. 1993.

Siemens, "*Ics For Communications Analog Line Interface Solution ALIS*", PSB 4595 Version 2.0 and PSB 4596 Version 2.1 Product Overview 08.97, 19 pages (1997).

Krypton, "*K²930G Functional and Electrical Descriptions*", 10 pages (1997).

Lucent Technologies, *LUCL8576 Dual Subscriber Line Interface Circuit*, Advanced Data Sheet Issue 1.3, 16 pages, Jan. 8, 1997.

Information Sheet—Siemens, *DAA2000 Optical DAA Kit*—Preliminary, pp. 1-21; Jun. 13, 1997.

Siemens Press Release, *Siemens Pioneers Programmable Front End For Analog Modems Single Design For Worldwide Standards*, Aug. 6, 1997.

Information Sheet—Siemens, *ICs for Communications, ALIS Reference Board, SIPB 4595 Version 1.0, Technical Description 06.97*, Q67220-H1014, Jun. 1997.

Information Sheet—Siemens, *ICs for Communications, ALIS Evaluation Board, SIPB 45900 Version 1.1, Technical Description 06.97*, Q67220-H1047, Jun. 1997.

Information Sheet—Siemens, *ALIS—Development Tools Evaluation Board*, pp. 1-3, Jul. 21, 1997.

International Search Report (Dec. 21, 1998).

Crystal Semiconductor CS4303 (CDB4303) Datasheet "107db, D/A Converter for Digital Audio," pp. 2.3-2.29 (Aug. 1993).

Crystal Semiconductor CS5326 (CDB5326), CS 5327 (CDB5327), CS5328 (CDB5328), CS5329 (CDB5329), Datasheet, "16 and 18-Bit, Stereo A/D Converters for Digital Audio," pp. 3.5-3.37 (Mar. 1992).

Crystal Semiconductor CDB5345 Datasheet, "Evaluation Board for CS5345," pp. 3.73-3.99 (Aug. 1993).

Crystal Semiconductor CS8411, CS8412 Preliminary Product Information "Digital Audio Interface Receiver," pp. 6.35-6.67 (Nov. 1993).

Crystal Semiconductor (Divison of Cirrus Logic) CS8401A, CS84102A Datasheet, "Digital Audio Interface Transmitter," pp. 6.3-6.33 (Nov. 1993).

Burr-Brown ISO122 Datasheet, "Precision Lowest Cost Isolation Amplifier," pp. 1-15 (Nov. 1993).

Bur-Brown Application Bulletin, "Single-Supply Operation of Isolation Amplifier," pp. 1-4 (Aug. 1991).

Burr-Brown Application Bulletin, "Boost ISO120 Bandwidth to More than 100kHz," pp. 1-3 (Sep. 1990).

Burr-Brown Application Bulletin, "Simple Output Filter Eliminates ISO AMP Output Ripple and Keep's Full Bandwidth," pp. 1-3 (Jan. 1991).

Burr-Brown Application Bulletin, "Very Low Cost Analog Isolation with Power," pp. 1-4 (Mar. 1991).

Burr-Brown Application Bulletin, "IC Building Blocks form Complete Isolated 4-20mA Current-Loop Systems," pp. 1-9 (Jun. 1992).

Burr-Brown Application Bulletin, "Single Supply 4-20mA Current Loop Receiver," pp. 1-2 (Jun. 1992).

Audio Codec '97 Component Specification Rev. 1.03, pp. 1-50 (Sep. 15, 1996).

Crystal Semiconductor Corp., "A Family of AES-EBU Interface Devices," David Knapp et al., pp.8.

Rockwell International Digital Communications Division, RC144Aci and RC144ACL Modem Designer's Guide (Preliminary), Order No. 876, Rev. 1, Nov. 1994.

Burr-Brown Application Bulletin "High-Voltage, Internally Powered Isolation Amplifier," pp. 1-7 (Oct. 1993).

Copending U.S. Appl No. 10/227,104, filed Aug. 23, 2003, "Direct Digital Access Arrangement Circuitry And Method For Connecting To Phone Lines" (Sila:028C2).

Copending U.S. Appl. No. 10/127,285, filed Apr. 22, 2002, "Direct Digital Access Arrangement Circuitry And Method For Connecting To Phone Lines" (Sila:028C1).

Copending U.S. Appl. No. 10/780,219, filed Feb. 17, 2004, "Direct Digital Access Arrangement Circuitry And Method For Connecting To Phone Lines" (Sila:028C4).

* cited by examiner

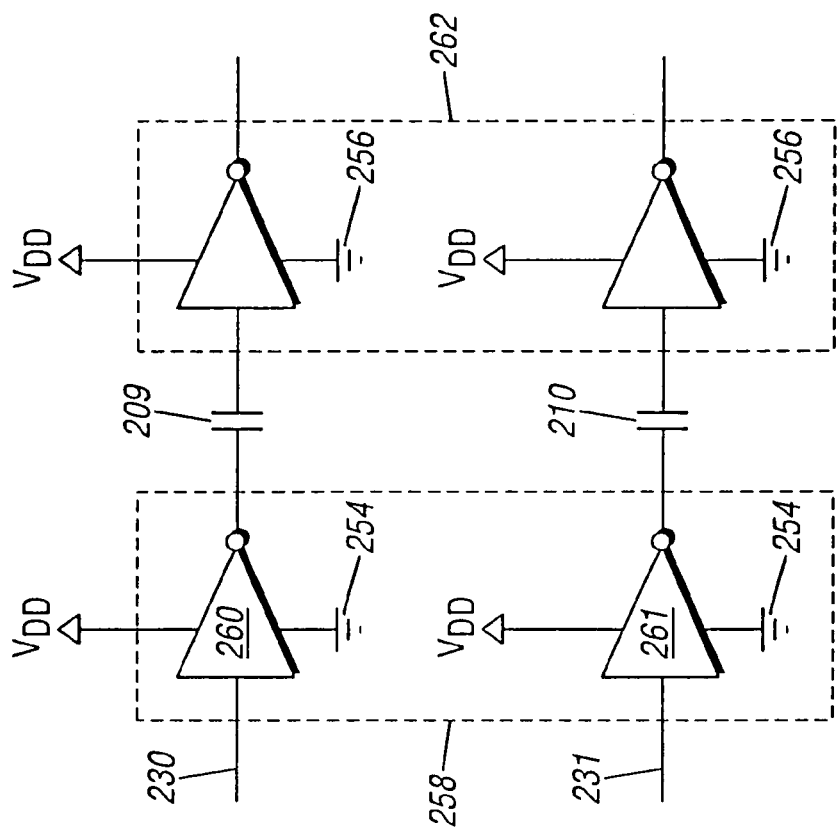
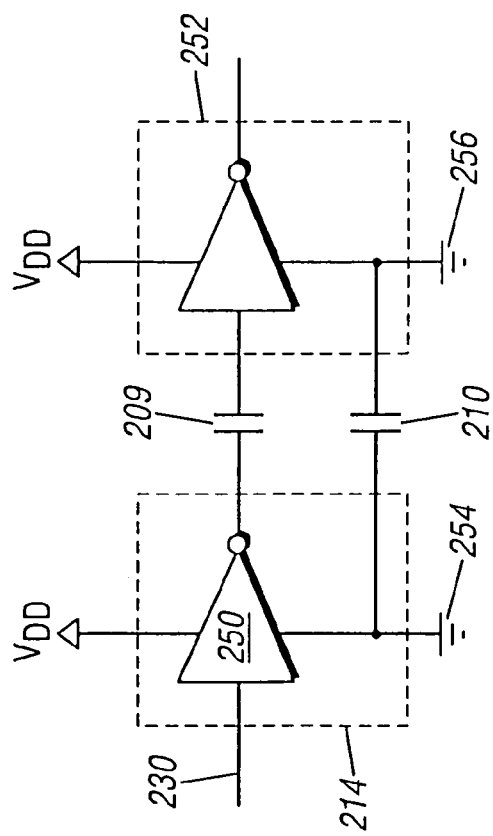
FIG. 13B
FIG. 13A

DIRECT DIGITAL ACCESS ARRANGEMENT CIRCUITRY AND METHOD FOR CONNECTING TO PHONE LINES

This application is a continuation of U.S. Ser. No. 10/227,104 filed on Aug. 23, 2002, now U.S. Pat. No. 7,072,389 entitled "Direct Digital Access Arrangement Circuitry and Method for Connecting to Phone Lines" which is a continuation of U.S. Ser. No. 10/127,285 filed on Apr. 22, 2002, entitled "Direct Digital Access Arrangement Circuitry and Method for Connecting to Phone Lines" which is a continuation of U.S. Ser. No. 09/035,175 (now U.S. Pat. No. 6,385,235), filed on Mar. 4, 1998, entitled "Direct Digital Access Arrangement Circuitry and Method for Connecting to Phone Lines" which is a continuation-in-part of U. S. Ser. Nos. 08/841,409 (now U.S. Pat. No. 6,137,827), 08/837,702 (now U.S. Pat. No. 5,870,046), and 08/837,714 (now U.S. Pat. No. 6,430,229) all filed on Apr. 22, 1997. Further, the following U. S. patent applications filed concurrently herewith Ser. No. 09/034,621 (now U.S. Pat. No. 6,442,271), entitled "Digital Isolation System With Low Power Mode" by George Tyson Tuttle et al; Ser. No. 09/034,456 (now U.S. Pat. No. 6,144,326), entitled "Digital Isolation System With ADC Offset Calibration; by Andrew W. Krone et al.; Ser. No. 09/034,455 (now U.S. Pat. No. 6,480,602), entitled "Ring-Detect Interface Circuitry and Method for a Communication System" by Timothy J. Dupuis et al.; Ser. No. 09/035,779 (now U.S. Pat. No. 6,389,134), entitled "Call Progress Monitor Circuitry and Method for a Communication System" by Timothy J. Dupuis et al.; Ser. No. 09/034,683 (now U.S. Pat. No. 6,167,134), entitled "External Resistor and Method to Minimize Power Dissipation in DC Holding Circuitry for a Communication System" by Jeffrey W. Scott et al.; Ser. No. 09/034,620 (now U.S. Pat. No. 6,160,885), entitled "Caller ID Circuit Powered Through Hookswitch Devices" by Jeffrey W. Scott et al.; and Serial No. 09/034,682 (now U.S. Pat. No. 6,408,034), entitled "Framed Delta Sigma Data With Unlikely Delta Sigma Data Patterns" by Andrew W. Krone et al., are expressly incorporated herein by reference.

NOTICE OF COPYRIGHT

A portion of this patent document contains material which is subject to copyright protection. The copyright owner has no objection to the reproduction by anyone of the patent disclosure, as it appears in the Patent and Trademark Office patent files or records, but otherwise reserves all copyright rights whatsoever.

TECHNICAL FIELD OF THE INVENTION

This invention relates to the field of isolation systems for use in selectively isolating electrical circuits from one another. More particularly, this invention relates to isolation systems having capacitor-coupled isolation barriers and to direct digital access arrangement circuitry for connecting to phone lines. This invention is useful in, for example, telephony, medical electronics and industrial process control applications.

BACKGROUND

Electrical isolation barriers can be identified in many industrial, medical and communication applications where it is necessary to electrically isolate one section of electronic circuitry from another electronic section. In this context isolation exists between two sections of electronic circuitry if a large magnitude voltage source, typically on the order of one thousand volts or more, connected between any two circuit nodes separated by the barrier causes less than a minimal amount of current flow, typically on the order of ten milliamperes or less, through the voltage source. An electrical isolation barrier must exist, for example, in communication circuitry which connects directly to the standard two-wire public switched telephone network and that is powered through a standard residential wall outlet. Specifically, in order to achieve regulatory compliance with Federal Communications Commission Part 68, which governs electrical connections to the telephone network in order to prevent network harm, an isolation barrier capable of withstanding 1000 volts rms at 60 Hz with no more than 10 milliamps current flow, must exist between circuitry directly connected to the two wire telephone network and circuitry directly connected to the residential wall outlet.

In many applications there exists an analog or continuous time varying signal on one side of the isolation barrier, and the information contained in that signal must be communicated across the isolation barrier. For example, common telephone network modulator/demodulator, or modem, circuitry powered by a residential wall outlet must typically transfer an analog signal with bandwidth of approximately 4 kilohertz across an isolation barrier for transmission over the two-wire, public switched telephone network. The isolation method and associated circuitry must provide this communication reliably and inexpensively. In this context, the transfer of information across the isolation barrier is considered reliable only if all of the following conditions apply: the isolating elements themselves do not significantly distort the signal information, the communication is substantially insensitive to or undisturbed by voltage signals and impedances that exist between the isolated circuitry sections and, finally, the communication is substantially insensitive to or undisturbed by noise sources in physical proximity to the isolating elements.

High voltage isolation barriers are commonly implemented by using magnetic fields, electric fields, or light. The corresponding signal communication elements are transformers, capacitors and opto-isolators. Transformers can provide high voltage isolation between primary and secondary windings, and also provide a high degree of rejection of lower voltage signals that exist across the barrier, since these signals appear as common mode in transformer isolated circuit applications. For these reasons, transformers have been commonly used to interface modem circuitry to the standard, two-wire telephone network. In modem circuitry, the signal transferred across the barrier is typically analog in nature, and signal communication across the barrier is supported in both directions by a single transformer. However, analog signal communication through a transformer is subject to low frequency bandwidth limitations, as well as distortion caused by core nonlinearities. Further disadvantages of transformers are their size, weight and cost.

The distortion performance of transformer coupling can be improved while reducing the size and weight concerns by using smaller pulse transformers to transfer a digitally encoded version of the analog information signal across the isolation barrier, as disclosed in U.S. Pat. No. 5,369,666, "MODEM WITH DIGITAL ISOLATION" (incorporated herein by reference). However, two separate pulse transformers are disclosed for bidirectional communication with this technique, resulting in a cost disadvantage. Another disadvantage of transformer coupling is that additional isolation elements, such as relays and opto-isolators, are typically required to transfer control signal information, such as phone line hookswitch control and ring detect, across the isolation barrier, further increasing the cost and size of transformer-based isolation solutions.

Because of their lower cost, high voltage capacitors have also been commonly used for signal transfer in isolation system circuitry. Typically, the baseband or low frequency analog signal to be communicated across the isolation barrier is modulated to a higher frequency, where the capacitive isolation elements are more conductive. The receiving circuitry on the other side of the barrier demodulates the signal to recover the lower bandwidth signal of interest. For example, U.S. Pat. No. 5,500,895, "TELEPHONE ISOLATION DEVICE" (incorporated herein by reference) discloses a switching modulation scheme applied directly to the analog information signal for transmission across a capacitive isolation barrier. Similar switching circuitry on the receiving end of the barrier demodulates the signal to recover the analog information. The disadvantage of this technique is that the analog communication, although differential, is not robust. Mismatches in the differential components allow noise signals, which can capacitively couple into the isolation barrier, to easily corrupt both the amplitude and timing (or phase) of the analog modulated signal, resulting in unreliable communication across the barrier. Even with perfectly matched components, noise signals can couple preferentially into one side of the differential communication channel. This scheme also requires separate isolation components for control signals, such as hookswitch control and ring detect, which increase the cost and complexity of the solution.

The amplitude corruption concern can be eliminated by other modulation schemes, such as U.S. Pat. No. 4,292,595, "CAPACITANCE COUPLED ISOLATION AMPLIFIER AND METHOD," which discloses a pulse width modulation scheme; U.S. Pat. No. 4,835,486 "ISOLATION AMPLIFIER WITH PRECISE TIMING OF SIGNALS COUPLED ACROSS ISOLATION BARRIER," which discloses a voltage-to-frequency modulation scheme; and U.S. Pat. No. 4,843,339 "ISOLATION AMPLIFIER INCLUDING PRECISION VOLTAGE-TO-DUTY CYCLE CONVERTER AND LOW RIPPLE, HIGH BANDWIDTH CHARGE BALANCE DEMODULATOR," which discloses a voltage-to-duty cycle modulation scheme. (All of the above-referenced patents are incorporated herein by reference.) In these modulation schemes, the amplitude of the modulated signal carries no information and corruption of its value by noise does not interfere with accurate reception. Instead, the signal information to be communicated across the isolation barrier is encoded into voltage transitions that occur at precise moments in time. Because of this required timing precision, these modulation schemes remain analog in nature. Furthermore, since capacitively coupled noise can cause timing (or phase) errors of voltage transitions in addition to amplitude errors, these modulation schemes remain sensitive to noise interference at the isolation barrier.

Another method for communicating an analog information signal across an isolation barrier is described in the Silicon Systems, Inc. data sheet for product number SSI73D2950. (See related U.S. Pat. No. 5,500,894 for "TELEPHONE LINE INTERFACE WITH AC AND DC TRANSCONDUCTANCE LOOPS" and U.S. Pat. No. 5,602,912 for "TELEPHONE HYBRID CIRCUIT", both of which are incorporated herein by reference.) In this modem chipset, an analog signal with information to be communicated across an isolation barrier is converted to a digital format, with the amplitude of the digital signal restricted to standard digital logic levels. The digital signal is transmitted across the barrier by means of two, separate high voltage isolation capacitors. One capacitor is used to transfer the digital signal logic levels, while a separate capacitor is used to transmit a clock or timing synchronization signal across the barrier. The clock signal is used on the receiving side of the barrier as a timebase for analog signal recovery, and therefore requires a timing precision similar to that required by the analog modulation schemes. Consequently one disadvantage of this approach is that noise capacitively coupled at the isolation barrier can cause clock signal timing errors known as jitter, which corrupts the recovered analog signal and results in unreliable communication across the isolation barrier. Reliable signal communication is further compromised by the sensitivity of the single ended signal transfer to voltages that exist between the isolated circuit sections. Further disadvantages of the method described in this data sheet are the extra costs and board space associated with other required isolating elements, including a separate high voltage isolation capacitor for the clock signal, another separate isolation capacitor for bidirectional communication, and opto-isolators and relays for communicating control information across the isolation barrier.

Opto-isolators are also commonly used for transferring information across a high voltage isolation barrier. Signal information is typically quantized to two levels, corresponding to an "on" or "off" state for the light emitting diode (LED) inside the opto-isolator. U.S. Pat. No. 5,287,107 "OPTICAL ISOLATION AMPLIFIER WITH SIGMA-DELTA MODULATION" (incorporated herein by reference) discloses a delta-sigma modulation scheme for two-level quantization of a baseband or low frequency signal, and subsequent communication across an isolation barrier through opto-isolators. Decoder and analog filtering circuits recover the baseband signal on the receiving side of the isolation barrier. As described, the modulation scheme encodes the signal information into on/off transitions of the LED at precise moments in time, thereby becoming susceptible to the same jitter (transition timing) sensitivity as the capacitive isolation amplifier modulation schemes.

Another example of signal transmission across an optical isolation barrier is disclosed in U.S. Pat. No. 4,901,275 "ANALOG DATA ACQUISITION APPARATUS AND METHOD PROVIDED WITH ELECTRO-OPTICAL ISOLATION" (incorporated herein by reference). In this disclosure, an analog-to-digital converter, or ADC, is used to convert several, multiplexed analog channels into digital format for transmission to a digital system. Opto-isolators are used to isolate the ADC from electrical noise generated in the digital system. Serial data transmission across the isolation barrier is synchronized by a clock signal that is passed through a separate opto-isolator. The ADC timebase or clock, however, is either generated on the analog side of the barrier or triggered by a software event on the digital side of the barrier. In either case, no mechanism is provided for jitter insensitive communication of the ADC clock, which is required for reliable signal reconstruction, across the isolation barrier. Some further disadvantages of optical isolation are that opto-isolators are typically more expensive than high voltage isolation capacitors, and they are unidirectional in nature, thereby requiring a plurality of opto-isolators to implement bidirectional communication.

Thus, there exists an unmet need for a reliable, accurate and inexpensive apparatus for effecting bidirectional communication of both analog signal information and control information across a high voltage isolation barrier, while avoiding the shortcomings of the prior art.

SUMMARY OF THE INVENTION

The above-referenced deficiencies in the prior art are addressed by the present invention, which provides a reliable, inexpensive, lightweight isolation system that is substantially immune to noise that affects the timing and/or amplitude of the signal that is transmitted across the isolating element, thus permitting an input signal to be accurately reproduced at the output of the isolation system.

The present invention provides digital direct access arrangement (DAA) circuitry that may be used to terminate the telephone connections at the user's end that provides a communication path for signals to and from the phone lines. Briefly described, the invention provides a means for transmitting and receiving a signal across a capacitive isolation barrier. The signal is digitized and quantized to standard logic levels for transmission through the barrier, and is therefore largely immune to amplitude noise interference. In one embodiment of the invention, the digital signal is synchronous and the signal is re-timed or latched on the receiving side of the isolation barrier using a clock signal that is recovered from the digital data sent across the barrier. The clock recovery circuit provides a means for filtering jitter on the received digital data so that the clock recovered has substantially less jitter than the received digital signal. Consequently, the digital communication across the capacitive isolation barrier is also largely immune to timing or phase noise interference.

In one embodiment, digital direct access arrangement circuitry for terminating a phone line connection is provided. This circuitry may include powered side circuitry operable to communicate digitally with phone line side circuitry, the digital communication comprising a digital data stream in a pulse density modulation format transmitted across an isolation barrier. Further the DDAA circuitry may include phone line side circuitry operable to communicate digitally with powered side circuitry, the digital communication comprising a digital data stream in a pulse density modulation format transmitted across said isolation barrier.

In another embodiment, powered side circuitry for digital direct access arrangement circuitry for terminating a phone line connection is provided. This circuitry may include a communication interface that may be coupled to an external device and an isolation interface that may communicate digitally with phone line side circuitry through an isolation barrier. The circuitry may also include encode circuitry within the isolation interface to generate an encoded digital signal from a digital data stream for transmission across the isolation barrier.

In yet another embodiment, phone line side circuitry for digital direct access arrangement circuitry for terminating a phone line connection is provided. This circuitry may include a communication interface that may be coupled to phone lines and an isolation interface that may communicate digitally with powered side circuitry through an isolation barrier. The circuitry further includes decode circuitry within the isolation interface to generate a decoded digital signal from an encoded digital signal received from the powered side circuitry across the isolation barrier.

In still another embodiment, a method for communicating with phone lines is provided. This method may include converting a signal received from phone lines into a digital data stream in a pulse density modulation format. It may also include communicating the digital data stream across an isolation barrier from phone line side circuitry to powered side circuitry.

In another embodiment, a method for communicating with phone lines is provided. This method converts a digital signal into a digital data stream in a pulse density modulation format and communicates the digital data stream across an isolation barrier from powered side circuitry to phone line side circuitry.

In yet another embodiment, a method for communicating with phone lines is provided. This method may include generating an encoded digital signal from a digital data signal and communicating the encoded digital signal across an isolation barrier from phone line side circuitry to powered side circuitry.

In still another embodiment, a method for communicating with phone lines is provided. This method may include generating an encoded digital signal from a digital data signal, and communicating the encoded digital signal across an isolation barrier from powered side circuitry to phone line side circuitry

DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

FIGS. 13A and 13B are schematic diagrams of driver circuits that may be utilized to implement the present invention.

DESCRIPTION OF PREFERRED EMBODIMENTS

Figure 1:
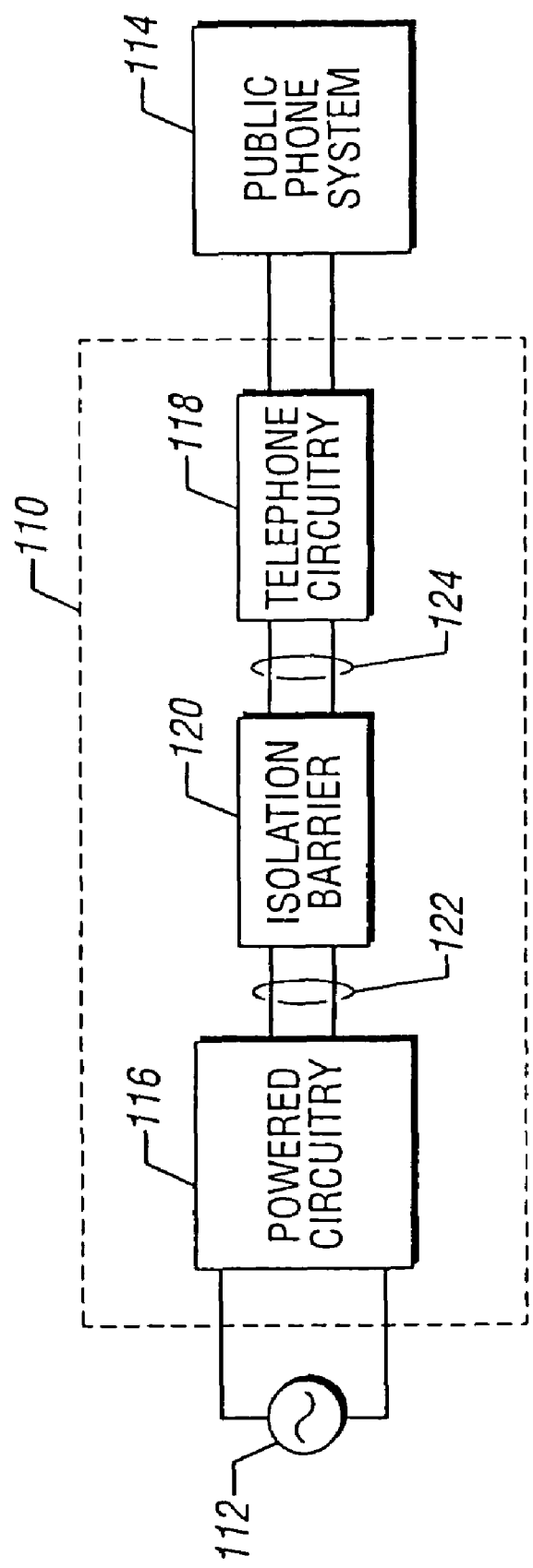
FIG. 1 is a block diagram of a telephone set illustrating a typical application of the present invention.

In order to provide a context for understanding this description, FIG. 1 illustrates a typical application for the present invention: a telephone that includes circuitry powered by a source external to the phone system. A basic telephone circuit 118 is powered by the "battery" voltage that is provided by the public telephone system and does not have a separate power connection. Many modern phones 110, however, include radio (cordless), speakerphone, or answering machine features that require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 that is connected to the phone lines, to prevent dangerous or destructive voltage or current levels from entering the phone system. (Similar considerations exist in many other applications as well, including communication, medical and instrumentation applications in which this invention may be beneficially applied.) The required isolation is provided by isolation barrier 120. The signal that passes through the isolation barrier 120 is an analog voice signal in a typical telephone application, but it may also be a digital signal or a multiplexed signal with both analog and digital components in various applications. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel.

The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
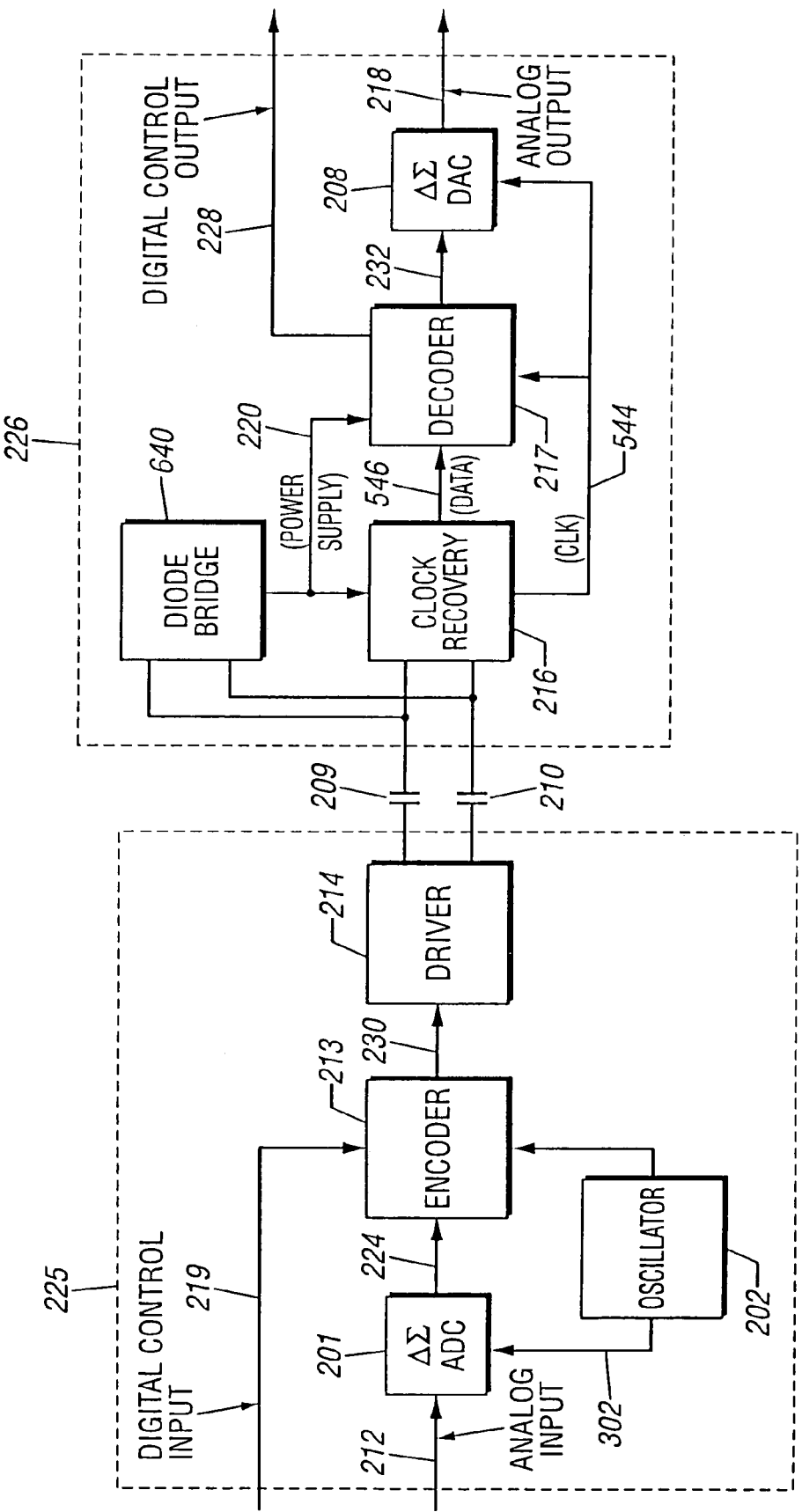
FIG. 2 is a block diagram showing a unidirectional isolation system according to the present invention.

FIG. 2 illustrates a basic block diagram of a preferred embodiment of the present invention. First the overall operation of the invention will be described, and then each component will be described in detail to the extent required to enable a person skilled in the art to make and use the invention. As a matter of terminology, the circuitry shown on the left or powered side of the isolation barrier (capacitors 209 and 210 in FIG. 2) will be referred to as the "powered" circuitry or the "transmit" circuitry or system, and the circuitry on the right side of the isolation barrier will be referred to as the "isolated" or "receive" circuitry or system. The "transmit" side can ordinarily be identified by the location of the dominant master oscillator 202 on that side of the barrier, and the slave oscillator (e.g. clock recovery circuit 216) is located on the receive side. Note, however, that in some embodiments of the present invention signals may be transmitted from the receive system to the transmit system, so these terms do not necessarily indicate the direction of data flow across the barrier. Furthermore, in some embodiments the master oscillator may be on the low-power (e.g. telephone system) side of the barrier, and a clock recovery PLL may be located on the high-power side of the barrier.

Referring to FIG. 2, a preferred unidirectional capacitive isolation system according to the present invention includes a delta-sigma analog to digital converter 201 operable on the analog input 212 and driven by a clock signal from oscillator 202. The digital output of the delta-sigma ADC 224 is synchronous with the operating frequency of oscillator 202 and time division multiplexed with digital control signals 219 by encoder circuit 213. The encoder circuit 213 also formats the resulting digital data stream 230 into a coding scheme or framing format that allows for robust clock recovery on the receiving side of the isolation barrier. The isolation barrier comprises two high voltage capacitors 209 and 210. In one embodiment of the present invention, driver circuit 214 drives the transmit side of capacitor 209 with a digital voltage signal. Clock recovery circuit 216 presents a very high impedance to the receive side of capacitor 209, allowing the digital voltage output of driver 214 to couple across the isolation barrier. In this embodiment, capacitor 210 provides a return current path across the barrier. In another embodiment, capacitors 209, 210 are differentially driven by complementary digital outputs of driver circuit 214. In that embodiment, clock recovery circuit 216 presents a very high impedance to the receive sides of capacitors 209 and 210, allowing the differential digital voltage outputs of driver 214 to couple across the isolation barrier. The input to driver circuit 214 is the output 230 of encoder 213.

The receive side of the isolation barrier includes clock recovery circuit 216, with inputs connected to isolation capacitors 209 and 210. The clock recovery circuit recovers a clock signal from the digital data driven across the isolation barrier. The recovered clock provides clocking signals for decoder 217 and delta-sigma digital-to-analog converter 208. Decoder circuit 217 separates the time division multiplexed data signal from control signals, providing a digital control output 228 and data output 232 that is routed to delta-sigma DAC 208. The delta-sigma DAC 208, with digital input supplied from decoder 217 and clock supplied from clock recovery circuit 216, provides the analog output of the receive side of the isolation system, which closely corresponds to the original analog input 212.

Active diode bridge circuit 640 may also be connected to isolation capacitors 209 and 210 to provide a DC voltage source 220 to clock recovery circuit 216 and decoder circuit 217 derived from energy contained in the signal transmitted across the isolation barrier.

In the descriptions of preferred embodiments that follow, all circuit references are made with respect to MOS (metal oxide-semiconductor) integrated circuit technology, although the invention may be implemented in other technologies as well, as will be understood by one skilled in the art. A preferred embodiment incorporates transmit system 225 consisting of delta-sigma ADC 201, oscillator 202, encoder 213 and driver 214 fabricated on one silicon substrate, and receive system 226 consisting of clock recovery circuit 216, decoder 217, delta-sigma DAC 208 and active diode bridge 640 fabricated on a second silicon substrate. The two separate silicon substrates are required to maintain the high voltage isolation provided by capacitors 209 and 210, since typical MOS technologies cannot provide high voltage isolation of 1000 volts or greater.

The delta-sigma analog-to-digital converter, shown as block 201 of FIG. 2, is well known in the art. See, for example, J. C. Candy, *A Use of Double Integration in Sigma Delta Modulation*, IEEE Trans. On Communication, March 1985, pp. 249-258, and B. E. Boser and B. A. Wooley, *The Design of Sigma-Delta Modulation Analog-to-Digital Converters*, IEEE Journal Solid State Circuits, December 1988, pp. 1298-1308, both of which are incorporated herein by reference. The specific design of ADC 201 will be a matter of design choice depending upon the needs of the particular application in which the isolation barrier will be used.

The use of a delta-sigma converter within the isolation system provides several desirable features. It will be appreciated that the delta-sigma converter uses a high oversampling rate to provide accurate A/D conversion over the input signal bandwidth without the use of precisely matched components or high-order, analog anti-aliasing filters. Moreover, such converters occupy a relatively small amount of space on an integrated circuit and are relatively easy to fabricate on a CMOS chip.

The digital pulse stream 224 output from delta-sigma converter 201 encodes the analog input signal 212 in a pulse density modulation format. In pulse density modulation, the amplitude information of the analog input signal is contained in the density of output pulses generated during a given interval of time.

Figure 3A:
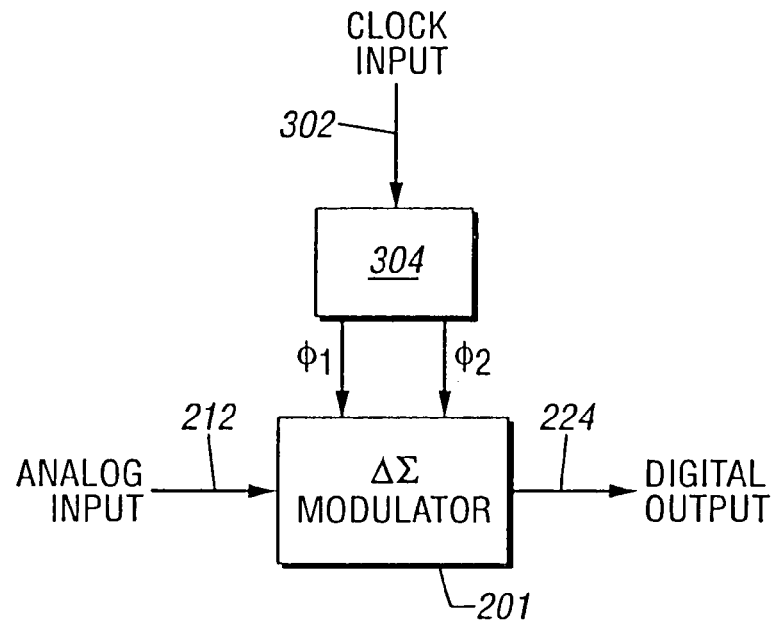
FIG. 3A is a block diagram detailing the circuitry used to provide a two-phase, non-overlapping clock signal to the delta-sigma modulators that are used in preferred embodiments of this invention.

Suitable designs for oscillator circuit 202 are well known in the art and may typically comprise a ring oscillator, relaxation oscillator, or an oscillator based on a piezoelectric crystal disposed external to the integrated MOS circuit. See, for example, A. B. Grebene, *Bipolar and MOS Analog Integrated Circuit Design*, John Wiley and Sons, 1984, which is incorporated herein by reference. FIG. 3A further illustrates the clock signals that may be provided to delta-sigma converter 201 in a preferred embodiment of this invention. Clock signal 302 from oscillator 202 is input to clock divider circuit 304 that divides the frequency of the input clock and provides an output in the form of two phase, non-overlapping clock signals $\varnothing_1$ and $\varnothing_2$ to the delta-sigma modulator circuit. The design and construction of clock divider circuit 304 is within the ordinary skill in the art and is not detailed here. Since encoder circuit 213 may perform time-division multiplexing of the digitized data signal 224 with digital control input data 219 using a time base derived from oscillator 202, clock divider 304 of FIG. 3A must typically divide the frequency of oscillator 202 by at least a factor of two.

Figure 3B:
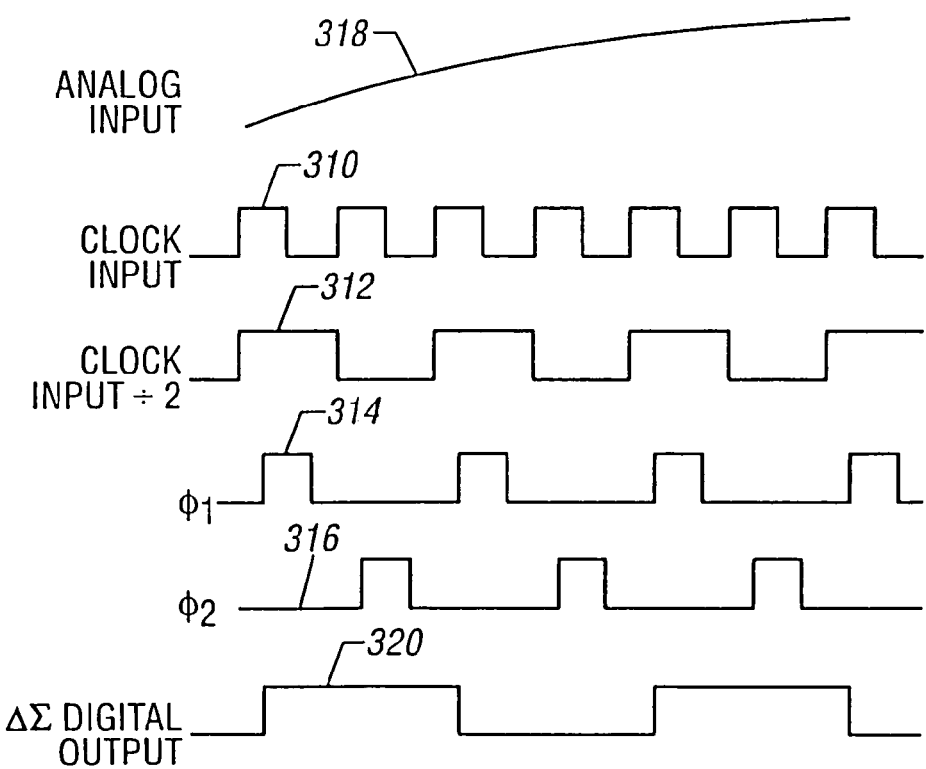
FIG. 3B is a timing diagram that illustrates timing relationships between various clock and data signals that occur in the circuitry of the present invention.

FIG. 3B illustrates exemplary signals associated with clock divider circuit 304 and delta-sigma modulator 201 in FIG. 3A. Trace 310 is the clock signal received from oscillator 202 on line 302. Trace 312 is the "clock divided by 2" signal that is generated by clock divider circuit 304. Traces 314 and 316 illustrate exemplary two phase, non-overlapping clock signals $\varnothing_1$ and $\varnothing_2$, respectively, that may be output from clock divider circuit 304 to delta-sigma modulator 201. Trace 318 represents the analog input to ADC 201, which generally changes very slowly in comparison to the frequency of clock signal 310. This bandwidth relationship is required because the delta-sigma modulator must operate at a sampling rate much higher than a typical Nyquist rate (for example, a 1 MHz sampling rate for a 4 kHz voiceband signal is typical) in order for the information in the analog signal to be accurately represented by the single-bit binary output. Finally, trace 320 represents the digital output of delta-sigma modulator 201, which may, for example, be synchronized to the rising edge of clock signal $\varnothing_1$. (The illustrated output bit pattern 320 is provided to show exemplary timing relationships and does not attempt to accurately reflect the illustrated analog input 318).

Figure 4A:
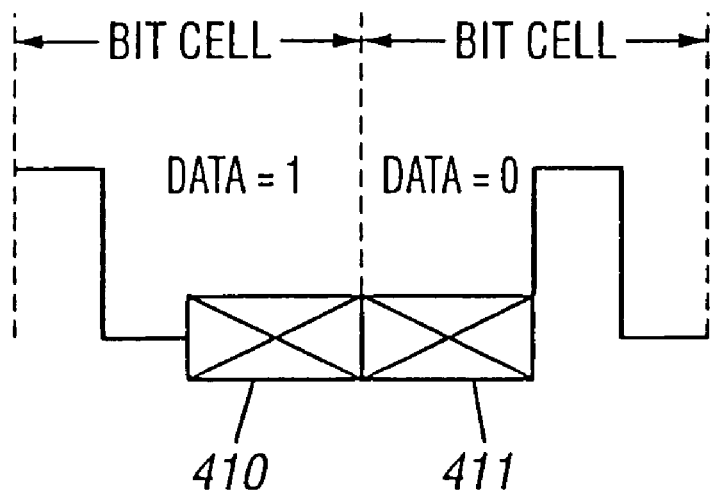
FIGS. 4A and 4B are diagrams that illustrate signal formats that may be produced by the encoders used in this invention.

Referring to FIG. 2, the encoder circuit 213 performs two primary functions in preferred embodiments of this invention. The first function of encoder 213 is time-division multiplexing of control signals 219 from other circuitry and data signals 224 from the delta-sigma modulator 201, an operation that is well known in the art and subject to many suitable implementations. The multiplexing function is synchronized by clock signals from oscillator 202. The second function of encoder 213 is formatting the data for transmission across isolation capacitors 209, 210. FIG. 4 details one coding scheme that may be used to transmit digital pulses across the capacitive isolation barrier. (Another suitable coding scheme is described below with reference to FIG. 14.) FIG. 4A shows the format for data sent from the transmit circuit to the receive circuit. When data=1 for a given bit cell, the output of the encoder is high for the first quarter of the bit cell period. When data=0 for a given bit cell, the output of the encoder is high for the third quarter of the bit cell period. This coding scheme guarantees one low-to-high transition followed by one high-to-low transition for every bit cell period, independent of the data pattern. The resulting data independent transition density allows for robust clock recovery in the receiving circuitry on the other side of isolation capacitors 209, 210. Alternatively, robust clock recovery can also be achieved by use of a preamble used for frequency locking followed by a data pattern which is not of constant average frequency.

In a bidirectional system, as is described below in connection with FIG. 7, the transmit system encoder 702 and driver 703 may cooperate to provide a high-impedance tri-state output to the isolation capacitor 705 during either the last half of the bit cell period 410 (if transmit data=1) or the first half of the bit cell period 411 (if transmit data=0) as shown in FIG. 4A. This permits transmission of information from the receive system to the transmit system during that portion of each bit cell when the transmit driver 703 is tri-stated.

Figure 4B:
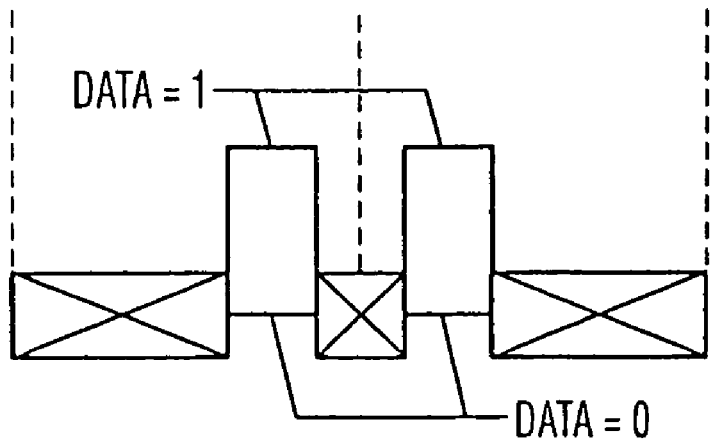

In a preferred embodiment, at the beginning of each bit cell period the receive system decoder section 708 detects whether the transmit circuit has sent a data=1 pulse across the isolation barrier. If a transmit data=1 pulse was sent, the receive driver remains tri-stated until the second half of the bit cell period, during which time a receive data=0 or 1 pulse can be sent back across the isolation barrier to the transmit system. If a transmit data=1 pulse is not detected by the receive circuit the receive driver sends receive data=0 or 1 during the first half of the bit cell period and tri-states for the second half of the bit cell period. This operation is shown in FIG. 4B.

In those embodiments in which the digital, bidirectional communication is differential. capacitors 705 and 706 are driven by complementary digital voltages in both directions, and the driver circuits associated with both capacitors are tri-stated during selected portions of the bit cell period in accordance with the coding scheme shown in FIG. 4.

A preferred embodiment of the unidirectional driver circuit 214 of FIG. 2 is detailed in FIG. 13A for single ended (not differential) communication and FIG. 13B for differential communication across the capacitive isolation barrier. Referring to FIG. 13A, the transmit circuit driver 214 may comprise an inverter 250 driven by the encoder output signal 230. The output of inverter 250 drives the transmit circuit side of isolation capacitor 209 to transmit logic levels defined by the transmit $V_{DD}$ and ground voltage levels. The clock recovery input buffer presents a high impedance to the receive side of capacitor 209, thereby allowing the receive side of capacitor 209 to attain substantially the same logic levels as the transmit side of capacitor 209. In this manner the digital logic signal is effectively coupled across the capacitive isolation barrier.

Capacitor 210 is disposed between the transmit circuit ground node 254 and receive circuit ground node 256 in order to form a ground current return path across the isolation barrier. This path is required because the clock recovery buffer input impedance, although high, is not infinite. Therefore a small current must flow across the barrier and back in order to couple the digital logic signal across the barrier. Furthermore, capacitor 209 must deliver charge to the active diode circuit 640 (FIG. 2) in order that a supply voltage for several receive circuit sections can be provided. The current associated with this transfer of charge from the transmit circuit to the receive circuit must have a path to return to the transmit circuit.

The single-ended communication system described above is insensitive to voltage signals that may exist between the transmit circuit ground 254 and receive circuit ground 256 provided that the rate of change of such voltage signals is substantially less than the frequency of the digital signal transmitted across the barrier. The single-ended method is also insensitive to resistive and capacitive impedances that may exist between the transmit circuit ground 254 and receive circuit ground 256. The system can be desensitized to inductive impedances that may exist between the transmit circuit ground 254 and receive circuit ground 256 by adding resistive elements in series with capacitor 210, in series with the transmit ground connection 254, in series with the receive ground connection 256, or any combination of these.

FIG. 13B shows an example of a suitable differential driver 258 for unidirectional digital communication across a capacitive isolation barrier. The inverter 260 that drives capacitor 209 is driven by the digital signal output from the transmit encoder circuit 213, while inverter 261, which drives capacitor 210, is driven by the complement 231 of the digital signal output from transmit encoder circuit 213. Clock recovery input buffer 262 presents high impedances to the receive sides of capacitors 209 and 210, allowing the differential digital transmit voltages to couple across the isolation barrier. In this differential communication method, both capacitors 209 and 210 provide return current paths across the isolation barrier. The differential digital communication system described above is largely insensitive to voltage signals and impedances that may exist between the transmit circuit ground 254 and receive circuit ground 256, since these voltages and impedances appear as common mode influences in differential communication.

Bidirectional communication across the barrier can be supported by additional driver and receive buffer structures, similar to those shown in FIG. 13, without the need for any additional isolation elements, providing that inverters 250, 260, 261, which drive the high voltage isolation capacitors, can be tri-stated generally in accordance with the timing diagram shown in FIG. 4 or any other suitable coding and timing scheme. In some embodiments, additional capacitor driving inverters that can be tri-stated may be provided in a receive-side driver circuit 713 (FIG. 7) and input buffers may be provided in a transmit side decoder circuit 714.

In presently preferred embodiments, the actual isolation barrier comprises a pair of isolation capacitors 209 and 210, which are high voltage capacitors that may be chosen for a particular application to prevent DC and low frequency current flow across the barrier and protect the isolated circuitry from high voltage faults and transients, while permitting data at selected transmission frequencies to cross the barrier. The capacitors must be capable of withstanding anticipated voltages that may appear due to faults in the powered circuitry 225, in order to provide the protective function that is the purpose of the barrier. For example, in preferred embodiments ordinary 2000 volt capacitors with capacitance on the order of 100 pF may be utilized in the isolation barrier. In a barrier system in accordance with the present invention it is not necessary to use high precision capacitors, because the system is very tolerant of variations in capacitor performance due to environmental influences, such as variations in voltage and temperature.

A preferred embodiment for a clock recovery circuit 216 for use in this invention is detailed in FIG. 5 and described below. One section of the clock recovery circuit may be a phase locked loop ("PLL") circuit, consisting of phase/frequency detector 531, charge pump 532, resistor 533, capacitor 534, and voltage controlled oscillator ("VCO") 535. The other section of the clock recovery block is data latch 542 operating outside the phase locked loop to re-time the digital data received across the isolation barrier. Circuitry for performing these functions is well known to those skilled in the art. See, for example, F. Gardner, *Phaselock Techniques*, 2d ed., John Wiley & Sons, NY, 1979; and R. Best, *Phase-Locked Loops*, McGraw-Hill, 1984, which are incorporated herein by reference. The data input to the receive system from the isolation capacitors may be derived from a differential signal present at the barrier by passing the differential signal through MOS input buffers (not shown), which are well known in the art, and providing a single-ended binary output signal 530 to the clock recovery circuit.

The illustrated exemplary phase/frequency detector 531 receives a digital input 530 from the isolation barrier and an input 536 from the output of VCO 535 and performs a phase comparison between these two inputs. If the VCO phase lags the input data phase, a speed up signal 538 is supplied to charge pump 532. If the input data 530 phase lags the VCO output 536 phase, a slow down signal 540 is supplied to charge pump 532. In response to "speed up" inputs from phase/frequency detector 531, charge pump 532 delivers a positive current to the loop filter consisting of resistor 533 and capacitor 534 connected in series. In response to "slow down" inputs from the phase/frequency detector, charge pump 532 sinks a positive current from the loop filter. The output voltage of the loop filter at node 542 drives voltage controlled oscillator 535, which increases its operation frequency as the input voltage increases. The output of VCO 535 is fed back as input 536 to phase/frequency detector 531, and it is also used to re-time the input data 530 by serving as the clock input to flip-flop latch 542, thus providing a clock signal to the isolated circuitry and also providing data signal 546 that is synchronized to clock signal 544. A divider circuit may be included in the feedback path 536.

The phase/frequency detector and charge pump operate to increase loop filter voltage 542 and VCO frequency if VCO phase 536 lags input data phase 530. Conversely, the VCO frequency is decreased if the VCO phase leads input data phase. In this manner, the VCO output phase is adjusted until phase lock is achieved with input data. Consequently, the VCO frequency is driven to be substantially identical to the input data frequency.

If noise interference occurs at the isolation barrier, the input data transitions will occur at points in time that are noisy, or jittered, relative to the transition times of the transmit circuit driver. These jittered data edges will cause a noise component in the charge pump current that drives the loop filter. The loop filter and VCO, however, low-pass filter this noise component, substantially attenuating the effects of this input data jitter. Consequently, the VCO output signal, while frequency locked to the input data, contains substantially less phase noise than the noisy input data. The bandwidth of the phase noise filtering operation may be set independently of the bandwidth of the analog signal to be communicated across the isolation barrier. Since the filtered, phase locked loop output clock signal 544 is used to latch or re-time the noisy input data at flip flop 542, the effects of noise interference at the capacitive isolation barrier are substantially eliminated. Finally, the filtered, phase locked loop output clock signal 544 is used as the timebase or clock for the other receive circuits, including decoder. 217 and delta-sigma DAC 208 shown in FIG. 2, resulting in an analog output 218 of the capacitive isolation system that is substantially free from any noise interference that may have been introduced at the capacitive isolation barrier.

Figure 6A:
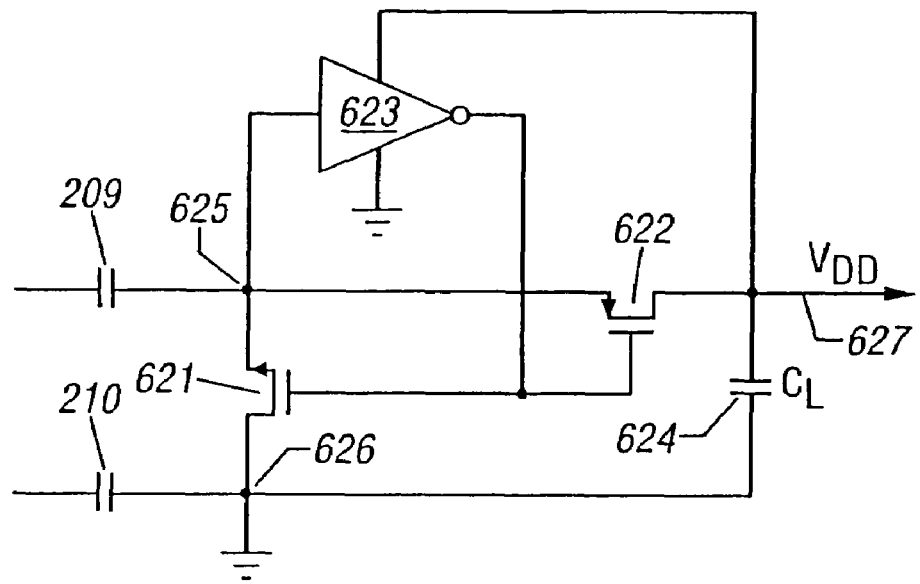
FIGS. 6A and 6B are schematic diagrams of active diode bridge circuits that may be used as power supplies in preferred embodiments of the present invention.
Figure 6B:
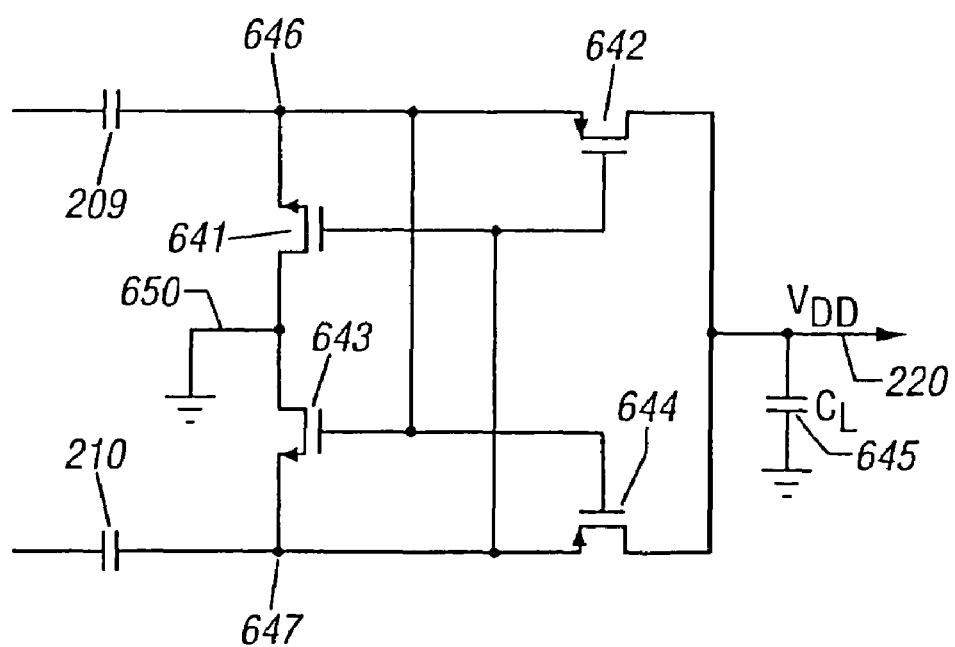

Preferred embodiments of active diode bridge circuit 640 of FIG. 2 are detailed in FIG. 6A for single-ended digital communication and FIG. 6B for differential digital communication across the isolation barrier. The active diode bridge generates a DC power supply voltage $V_{DD}$, which may be used to operate the clock recovery and receiver decoder circuits, in response to the digital data received across the capacitive isolation barrier. An active diode bridge circuit is distinguished from a standard or passive diode bridge in that the gating elements are active transistors rather than passive elements such as bipolar diodes.

Referring to the exemplary circuit illustrated in FIG. 6A, isolation capacitor 209 is connected to node 625 and isolation capacitor 210 is connected to node 626. The source of n-channel MOSFET 621 and the source of p-channel MOSFET 622 are connected to node 625. Also connected to node 625 is the input of standard CMOS inverter 623. The output of inverter 623 drives the gates of MOSFETS 621 and 622. The drain of n-channel MOSFET 621 is connected to node 626, the receive circuit ground node, while the drain of p-channel MOSFET 622 connects to node 627, which provides $V_{DD}$ voltage for the isolated circuitry. Also connected to $V_{DD}$ node 627 are load capacitor $C_L$ 624 and the power supply input of CMOS inverter 623. In a preferred embodiment, the power supply inputs of clock recovery circuit 216 and decoder circuit 217 shown in FIG. 2 are also connected to $V_{DD}$ node 627.

Referring to the exemplary embodiment illustrated in FIG. 6A, the operation of the active diode bridge circuit used in single-ended digital communication will now be described. A digital logic signal is coupled across capacitor 209 from the transmit section. When a digital "high" signal is received through capacitor 209, node 625 goes high. The logic "high" signal on node 625 forces the CMOS inverter 623 output node to go low, turning off device 621 and turning on device 622. Consequently, current flows through capacitor 209, device 622, and from $V_{DD}$ to receive circuit ground through capacitor $C_L$ and through clock recovery and decoder circuitry shown in FIG. 2. The circuit is completed by current flow returning across the isolation barrier through capacitor 210. The current demand by circuitry on $V_{DD}$ through capacitors 209 and 210 must be limited so that the voltage on node 625 relative to node 626 can still be recognized as a digital high logic level. When a digital "low" signal is received through capacitor 209, CMOS inverter 623 turns off device 622 and turns on device 621. Consequently, current flows across the isolation barrier through capacitor 210, through device 621, and returns across the isolation barrier through capacitor 209. Therefore, although no average current flows through capacitors 209 and 210, average current can be supplied from $V_{DD}$ to receive circuit ground to operate clock recovery circuit 216 and decoder circuit 217. Load capacitor 624 operates to minimize supply ripple on the DC supply voltage established on node $V_{DD}$.

Referring to the embodiment shown in FIG. 6B, isolation capacitor 209 connects to node 646 and isolation capacitor 210 connects to node 647. The source node of n-channel MOSFET 641 and the source node of p-channel MOSFET 642 connect to node 646. Also connected to node 646 are the gates of n-channel MOSFET 643 and p-channel MOSFET 644. The source node of n-channel MOSFET 643 and the source node of p-channel MOSFET 644 connect to node 647. Also connected to node 647 are the gates of n-channel MOSFET 641 and p-channel MOSFET 642. The drains of devices 641 and 643 are connected to the ground node of the receiving circuit. The drains of devices 642 and 644 are connected to the node 220, which provides $V_{DD}$ voltage for the isolated circuitry. Also connected to $V_{DD}$ node 220 are load capacitor $C_L$ 645 and the power supply inputs of clock recovery circuit 216 and decoder circuit 217 as shown in FIG. 2.

Referring to the exemplary embodiment illustrated in FIG. 6B, the operation of the active diode bridge used in differential digital communication will now be described. A differential digital signal is received through capacitors 209 and 210. When a digital 'high' signal is received through capacitor 209, a corresponding digital 'low' signal is received through capacitor 210, and node 646 goes high while node 647 goes low. This condition turns on devices 642 and 643 while turning off devices 641 and 644. Consequently, current flows through capacitor 209, device 642, from $V_{DD}$ to ground through capacitor $C_L$ and through clock recovery circuitry 216 and decoder circuitry 217 shown in FIG. 2. The circuit is completed from receive circuit ground 650, through device 643 and finally returning across the isolation barrier through capacitor 210. The current demand on $V_{DD}$ must be limited so that the voltage on node 646 relative to node 650 can be recognized as a high logic level signal by the clock recovery and decoder circuitry.

When a digital 'low' signal is received through capacitor 209, a digital 'high' signal is received through capacitor 210, and node 646 goes low while node 647 goes high. This condition turns on devices 641 and 644 while turning off devices 642 and 643. Consequently current flows through capacitor 210 and device 644 to $V_{DD}$ node 220, and from there to ground through capacitor 645 and through clock recovery and decoder circuitry shown in FIG. 2. The circuit is completed from ground 650, through device 641 and finally returning across the isolation barrier through capacitor 209. Therefore, in either logic state, and independently of the current flow direction through capacitors 209 and 210, current flows in the same direction from $V_{DD}$ to ground. Therefore, an average or DC supply voltage is established on node $V_{DD}$, and adequate current can be supplied to operate clock recovery circuit 216 and decoder circuit 217. Load capacitor 645 operates to minimize power supply ripple, providing a filtering operation on $V_{DD}$. An added benefit of the ability to power sections of the isolated circuitry from the digital signal transmitted across the capacitive isolation barrier from the powered circuitry is that it allows isolated power-up and power-down control of isolated circuitry sections on an as-needed basis.

Parasitic bipolar transistors may result from typical CMOS processes. If they are not controlled, these bipolar transistors can discharge the power supply 627 shown in FIG. 6A during the initial power up time. If the discharge current from the parasitic bipolar transistors is larger than the current delivered to the power supply 627 through transistor 622, then the circuit may not power up to the desired full voltage level. The beta of a lateral bipolar transistor in any CMOS process is a function of layout. With appropriate layout (i.e., large base region), the beta can be kept small enough to minimize undesired discharge currents. Further care needs to be taken in the design of any circuit that is connected to power supply 627. The circuits connected to power supply 627 cannot draw more current from the power supply than is available from the active diode bridge, even before the supply has ramped to the full value. Circuit design techniques to address these issues are common and well known in the art.

In the illustrative embodiment shown in FIG. 2, delta-sigma digital to analog converter (DAC) 208 receives input data from decoder 217 and synchronous clock input from clock recovery circuit 216. Analog output signal 218 is generated by DAC 208 in response to the digital data that is conmmunicated across the capacitive isolation barrier. The output signal 218 is highly immune to amplitude and phase noise that may be introduced in the barrier circuitry because the signal that is communicated across the isolation capacitors is a synchronous digital signal, and because the received data is resynchronized to the recovered, jitter-filtered clock signal. The DAC is also timed by that clock signal. Delta-sigma DAC technology is well known in the art, and selecting a suitable DAC circuit will be a matter of routine design choice directed to the intended application of the barrier circuit. See, for example, P. Naus et al., *A CMOS Stereo 16-Bit D/A Converter for Digital Audio*, IEEE Journal of Solid State Circuits, June 1987, pp. 390-395, which is incorporated herein by reference.

Figure 7:
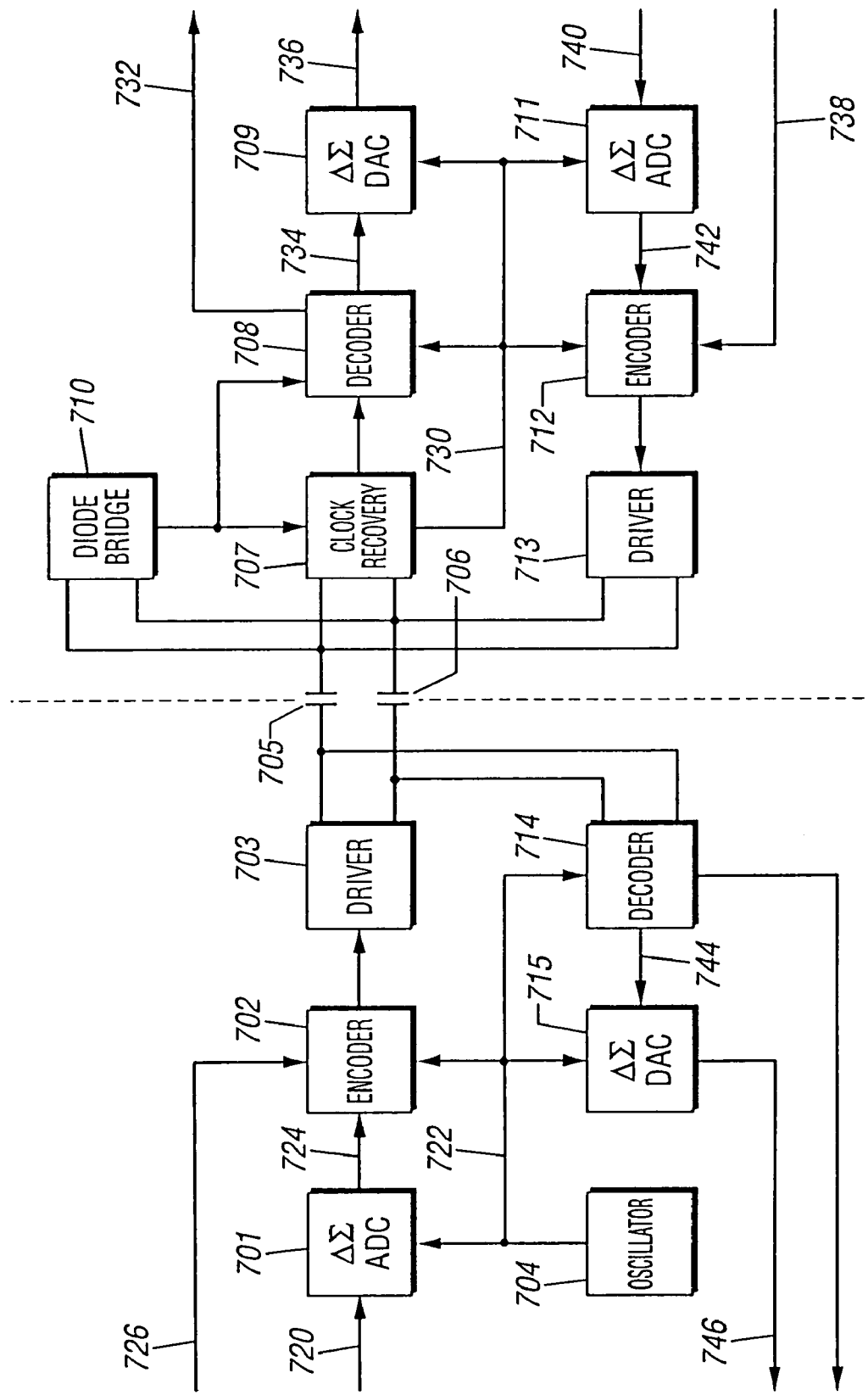
FIG. 7 is a block diagram illustrating a bidirectional isolation system according to the present invention.

FIG. 7 illustrates a preferred bidirectional embodiment of the present invention. It will be recognized that other unidirectional and bidirectional isolation barriers may be designed by persons skilled in the art using the principles described herein, and that such barriers will fall within the scope of this invention. In the illustrated and described embodiment, the capacitive isolation system comprises a "transmit" system to the left of center, a "receive" system to the right of center, and a capacitive isolation barrier in the center of the figure comprising two high voltage capacitors 705 and 706. Note that the terms "transmit" and "receive" are used to identify the powered and isolated sides of the barrier, respectively, and that in this embodiment data may be conveyed across the barrier in both directions. Many of the components in this bidirectional embodiment are identical or similar to those in the unidirectional embodiment described above with reference to FIG. 2.

The transmit system includes delta-sigma analog-to-digital converter 701 operable on the analog input 720 of the transmit circuit and synchronized to clock signal 722 from oscillator 704. The analog input 720 of the transmit system is an analog signal containing information to be transmitted across the isolation barrier, which may be for example an analog voice signal to be coupled to a telephone system. Digital output 724 of the delta-sigma ADC may be time-division multiplexed with digital control input 726 by the encoder circuit 702. Digital control input 726 is a digital signal containing additional information to be transmitted across isolation barrier 705, 706. Digital control input 726 may include control information for analog circuitry on the receiving side of the isolation barrier. Encoder circuit 702 also formats the resulting data stream into a coding scheme that allows for robust clock recovery on the receiving side of the isolation barrier, as is described above.

Encoder circuit 702 also receives a clock signal 722 from oscillator 704. Driver circuit 703 of the transmit system drives the encoded signal to isolation capacitors 705 and 706 in response to the output of encoder circuit 702.

The isolation barrier comprises two high voltage capacitors 705, 706. In one embodiment, capacitor 705 is driven bidirectionally by drivers 703, 713 while capacitor 706 provides a return path across the isolation barrier. In another embodiment of the present invention, capacitors 705 and 706 are differentially driven by digital driver circuits 703, 713.

A preferred embodiment of the receive system, shown to the right of isolation capacitors 705, 706 in FIG. 7 includes clock recovery circuit 707, whose inputs are connected to isolation capacitors 705, 706. The clock recovery circuit recovers a clock signal from the digital data driven across the isolation barrier and provides synchronized clock signal 730 to the various circuits in the receive system. The recovered clock operates as the time base for decoder 708 and delta-sigma digital-to-analog converter 709. Decoder section 708 separates the time division multiplexed data and control information, providing digital control output 732 to other circuitry, and providing synchronous data signal 734 as an input to delta-sigma DAC 709. The delta-sigma DAC 709, with digital input 734 supplied by decoder 708, and clock signal 730 supplied by clock recovery section 707, operates synchronously with the transmit system delta-sigma ADC 701 and provides analog output 736 on the receiving side of the isolation barrier. Active diode bridge 710 is connected to isolation capacitors 705 and 706 and supplies a DC power supply voltage to clock recovery circuit 707 and decoder circuit 708 by drawing current from the digital signal transmitted across the isolation barrier, as is described in detail above. Driver 713 must remain tri-stated until decoder 708 has detected a valid frame, indicating successful power-up of the receive circuit sections.

The embodiment shown in FIG. 7 also enables communication from the receive system to the transmit system, or from right to left across the isolation capacitors as illustrated. The receive system encoder circuit 712 and driver circuit 713 cooperate to communicate information back from the receive system to the decoder circuit 714 in the transmit system. Receive system encoder section 712 receives a clock input 730 from clock recovery section 707, and is thereby synchronized to the transmit system oscillator 704 and encoder 702. This synchronization allows transmission in each direction to occur in distinct time slots. In time slots where transmit driver 703 is operable to transmit information from the transmit system to the receive system, receive driver 713 is tri-stated or disabled. Alternatively, in time slots where receive driver 713 is operable to transmit information back from the receive system to the transmit system, transmit driver 703 is tri-stated or disabled. In this manner, bidirectional communication may be established across a single pair of high voltage isolation capacitors.

Digital control input 738 of the receive system is a digital signal containing information to be communicated across the isolation barrier, including control information for analog circuitry on the transmit system side of the barrier. The receive system also includes delta-sigma ADC 711 operable on analog input signal 740 so that the information contained in analog signal 740 on the receive system side of the isolation barrier can be conveyed across the barrier in digital form and then accurately reproduced on the transmit system side of the barrier. The receive system delta-sigma ADC 711 receives its clock input from clock recovery circuit 707, and is thereby synchronized with transmit system oscillator 704. Digital output signal 742 generated by receive system ADC 711 may be time-division multiplexed with receive system digital control input 738 in encoder section 712.

In the transmit system, decoder circuit 714 is connected to isolation capacitors 705, 706 to receive signals therefrom, identify signals representing information coming from the receive system. Decoder 714 then extracts the digital control information from the data stream received from the receive circuit, and passes data signal 744 generated by delta-sigma ADC 711 to transmit system delta-sigma DAC 715. Decoder 714 also latches and retimes the data received across the barrier to synchronize it with clock signal 722, which is generated by oscillator 704, thereby eliminating the effects of phase noise interference and other sources of jitter in the synchronous digital signal. Circuits that are suitable for performing these decoder functions are well known in the art.

Transmit system delta-sigma DAC 715 receives its clock input from oscillator 704 and is thereby synchronized to receive system ADC 711. Transmit system DAC 715 provides a reconstructed analog data output signal 746, thereby completing the communication of analog information back from the receive system to the transmit system.

In summary, FIG. 7 describes a bidirectional communication system for conveying analog and digital information across a capacitive isolation barrier. The barrier itself is inexpensive, since only two high voltage isolation capacitors are required for synchronous, bidirectional communication. The barrier is a reliable communication channel because the digital signals communicated across the barrier are insensitive to amplitude and phase noise interference that may be introduced at the isolation barrier.

Figure 8:
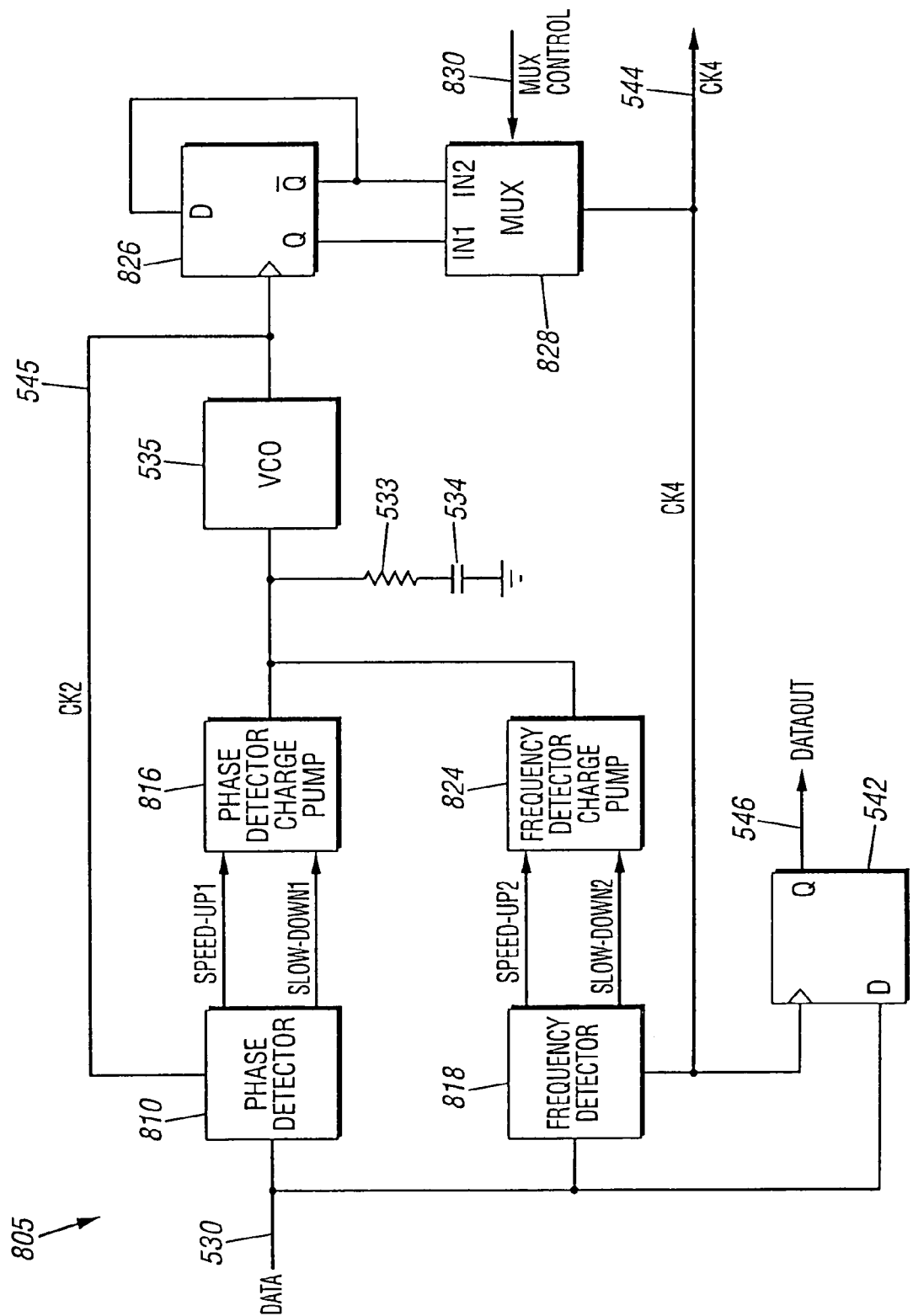
FIG. 8 is a block diagram of a clock recovery and data synchronization circuit according to a preferred embodiment of the present invention.

A more detailed description of a clock recovery circuit suitable for use in-this invention with the coding scheme of FIG. 4 will now be provided, with reference to FIG. 8. Clock recovery PLL 805 has data input 530, data output 546 and recovered clock signal output 544. Phase detector 810 has inputs DATA 530 and feedback clock signal CK2 545. The outputs of phase detector 810 are SPEED-UP1 and SLOW-DOWN1 signals, both of which are connected to inputs of phase detector charge pump 816. Frequency detector 818 has inputs DATA 530 and output clock signal CK4 544. The outputs of frequency detector 818 are signals designated SPEED-UP2 and SLOW-DOWN2, which are connected to the inputs of frequency detector charge pump 824. The outputs of phase detector charge pump 816 and frequency detector charge pump 824 are connected together and are also connected to the input of voltage controlled oscillator ("VCO") 535 and one terminal of resistor 533. The other terminal of resistor 533 is connected to one terminal of capacitor 534. The other terminal of capacitor 534 is connected to ground. The output of VCO 535 is the CK2 signal 545. The clock input of flip-flop 826 is connected to CK2 545. The Q-bar output of flip-flop 826 is connected to the D input of flip-flop 826. The Q and Q-bar outputs of flip-flop 826 are connected to the inputs of multiplexer (mux) 828. The control input 830 of mux 828 is called MUX CONTROL and comes from the framing logic, which is described elsewhere in this specification. The output of mux 828 is the CK4 signal 544. The D input of flip-flop 542 is connected to data input 530. The clock input of flip-flop 542 is connected to the CK4 signal 544. The Q output of flip-flop 542 is the resynchronized DATAOUT signal 546, which is sent to the frame detect logic.

Frequency detector 818 is dominant over phase detector 810 when the frequency of the DATA and CK4 signals are different. Once the frequency of the DATA and CK4 signals are substantially similar, the SPEED-UP2 and SLOW-DOWN2 signals become inactive and phase detector 810 becomes dominant. Separate charge pumps for the phase detector and frequency detector allow for independent control of the gain of the phase detector and frequency detector circuits. Alternatively, if independent gains are not required, then the SPEED-UP1 and SPEED-UP2 signals could be logically ORed together to drive one charge pump. And likewise the SLOW-DOWN1 and SLOW-DOWN2 signals could be logically ORed together to drive the other input to the charge pump.

The output of VCO 535 is the CK2 signal, which is divided by two in frequency by flip-flop 826. Since CK2 is divided by two to generate the bit rate clock signal CK4, there can be two phases of CK4 with respect to the start of a bit period. The phase of CK4 that will yield correct operation of the frequency detector is the one where the rising edge of CK4 aligns with the start of a bit period. The frame-detect logic is needed to detect the start of a bit interval and is used to select the appropriate phase of CK4 using mux 828.

Figure 15:
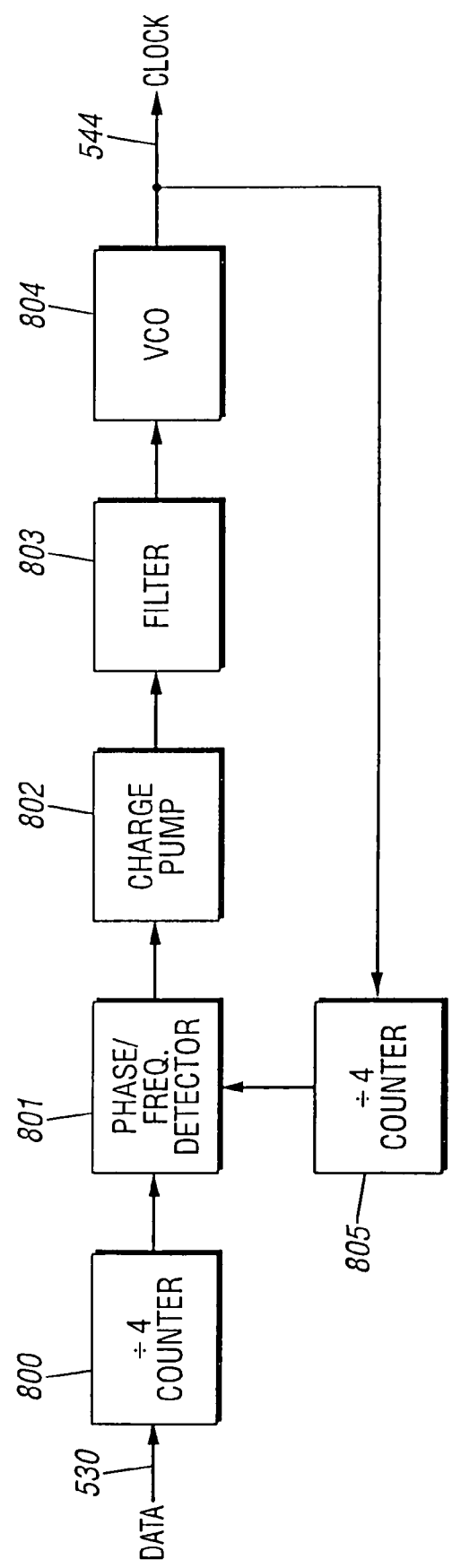
FIG. 15 is a block diagram of a clock recovery circuit that may be employed for use with the framing format of FIG. 14.

It will be appreciated that a clock recovery circuit according to this invention, such as that illustrated in FIG. 8 or FIG. 15, may be beneficially used to recover and stabilize a clock signal on the isolated side of the barrier where the clock signal is conveyed via isolation elements that are separate from the isolation elements that are used to transfer the data signal.

Figure 11:
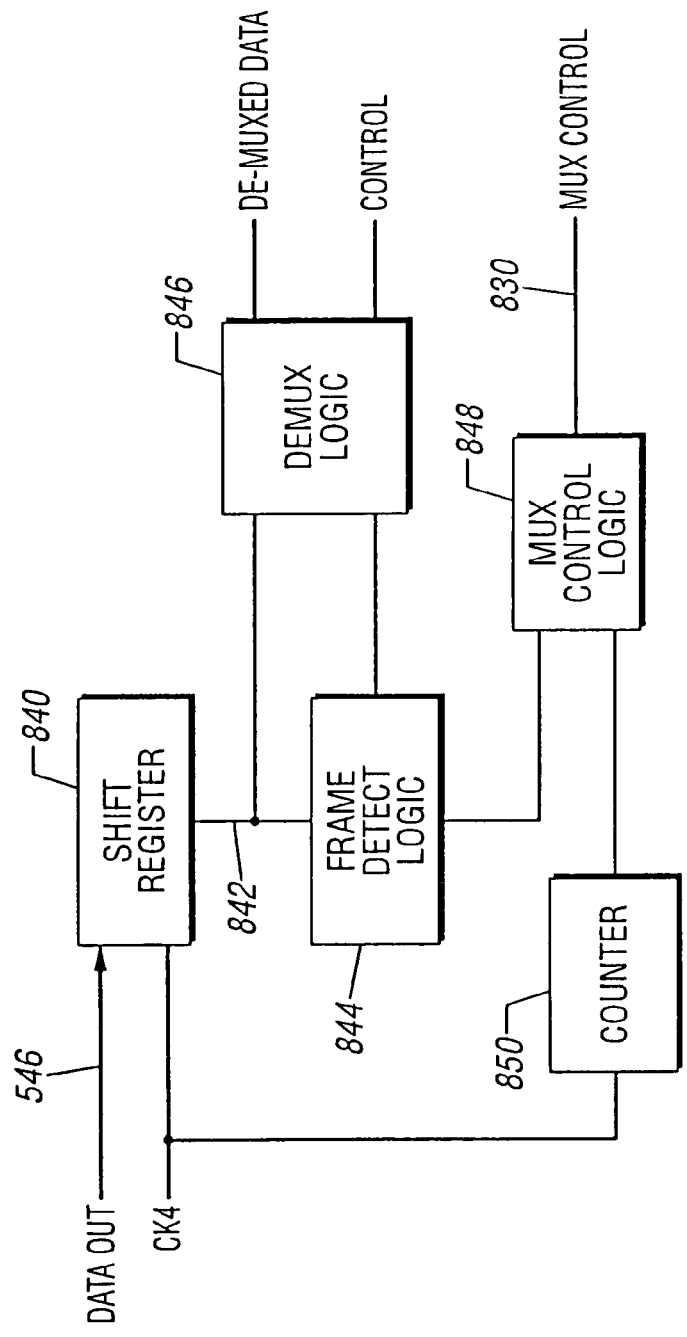
FIG. 11 is a block diagram of a decoder circuit that may be utilized in a preferred embodiment of the present invention.

A preferred embodiment of a decoder circuit 708 is shown in FIG. 11. Shift register 840 has an input connected to the DATAOUT signal 546 from clock recovery circuit 805 and is clocked by recovered clock signal CK4. Multi-bit output 842 of shift register 840 is connected to frame-detect logic 844 and to demux logic 846. Frame detect logic 844 has one output connected to mux control logic 848 and one output connected to demux logic 846. Demux logic 846 is clocked by CK4. Counter 850 is also clocked by CK4. The output of counter 850 is connected to mux control logic 848. The output of mux control logic 848 is the MUX-CONTROL signal 830 sent to the clock recovery PLL 805 to select the proper phase for the CK4 signal. The outputs of demux logic 846 are the DEMUXED DATA signal and the CONTROL signal.

Figure 12:
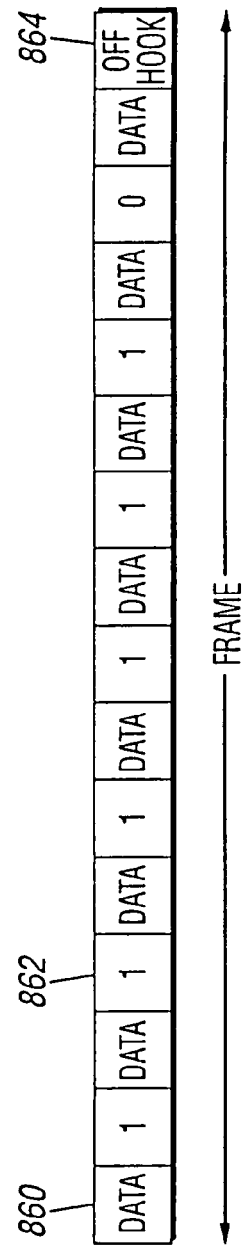
FIG. 12 is an illustration representing a framing format that may be beneficially used in preferred embodiments of the present invention.

Shift register 840 stores a predetermined number of bits of the serial DATAOUT signal 546. Frame-detect logic 844 operates on this data and detects when a frame signal is received. Many possible framing signal formats can be used. A format that may be used in a presently preferred embodiment is shown in FIG. 12. Data 860 is alternated with framing signals 862 and control signals. In the framing format shown in this figure, one control signal (off hook) 864 is sent for every eight data bits. The remaining seven bits in the frame of sixteen are used for frame synchronization. The illustrated framing signal is six ones followed by a zero in the control signal field. The data signal may be guaranteed to not have more than five ones in a row so that it will not be mistaken for a framing signal. Many other framing formats are possible to allow for different data signal properties and to permit the use of additional control bits.

Once the frame detect logic 844 detects six one's followed by a zero in the control signal field, mux control logic 848 is set to maintain the phase of the CK4 signal. If after a predetermined number of CK4 clock cycles a framing signal is not detected, then counter 850 will cause mux control logic 848 to change the phase-of CK4 using mux 828 (FIG. 8). Counter 850 will then be reset, and frame detect logic 844 will again attempt to detect the selected framing signal so as to achieve synchronization. Only the correct phase of CK4 will achieve frame synchronization. Once frame synchronization is achieved, demux logic 846 can correctly decode control and data signals.

The specific structure and operation of frame detect logic 844, demux logic 846, and mux control logic 848 is dependent upon the selected framing format, the selected multiplexing scheme, and other design choices. The detailed design of this circuitry is within the ordinary skill in the art and is omitted from this description of a preferred embodiment.

Figure 9:
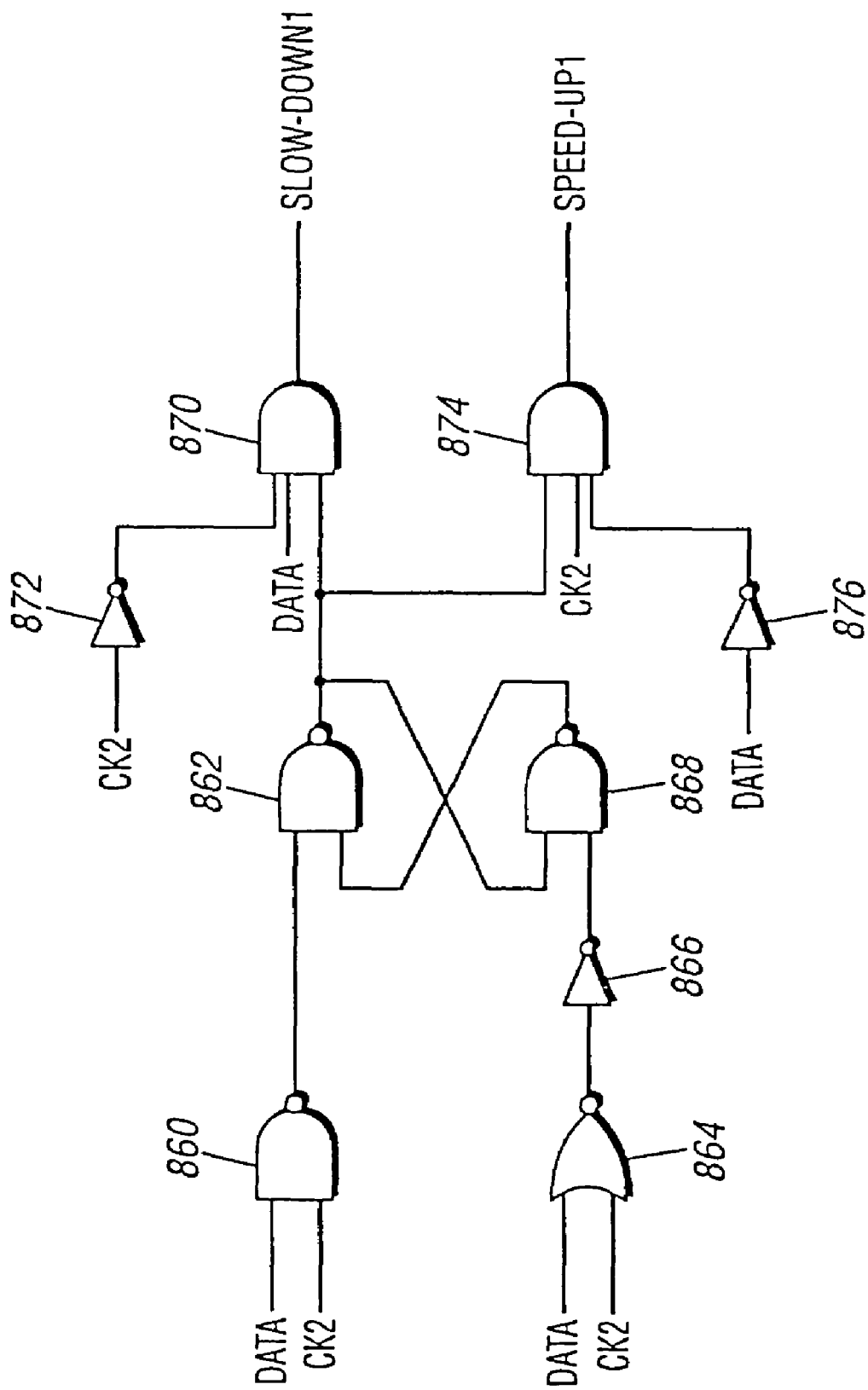
FIG. 9 is a schematic diagram of a phase detector circuit that may be used in a clock recovery circuit according to a preferred embodiment of the present invention.
Figure 10:
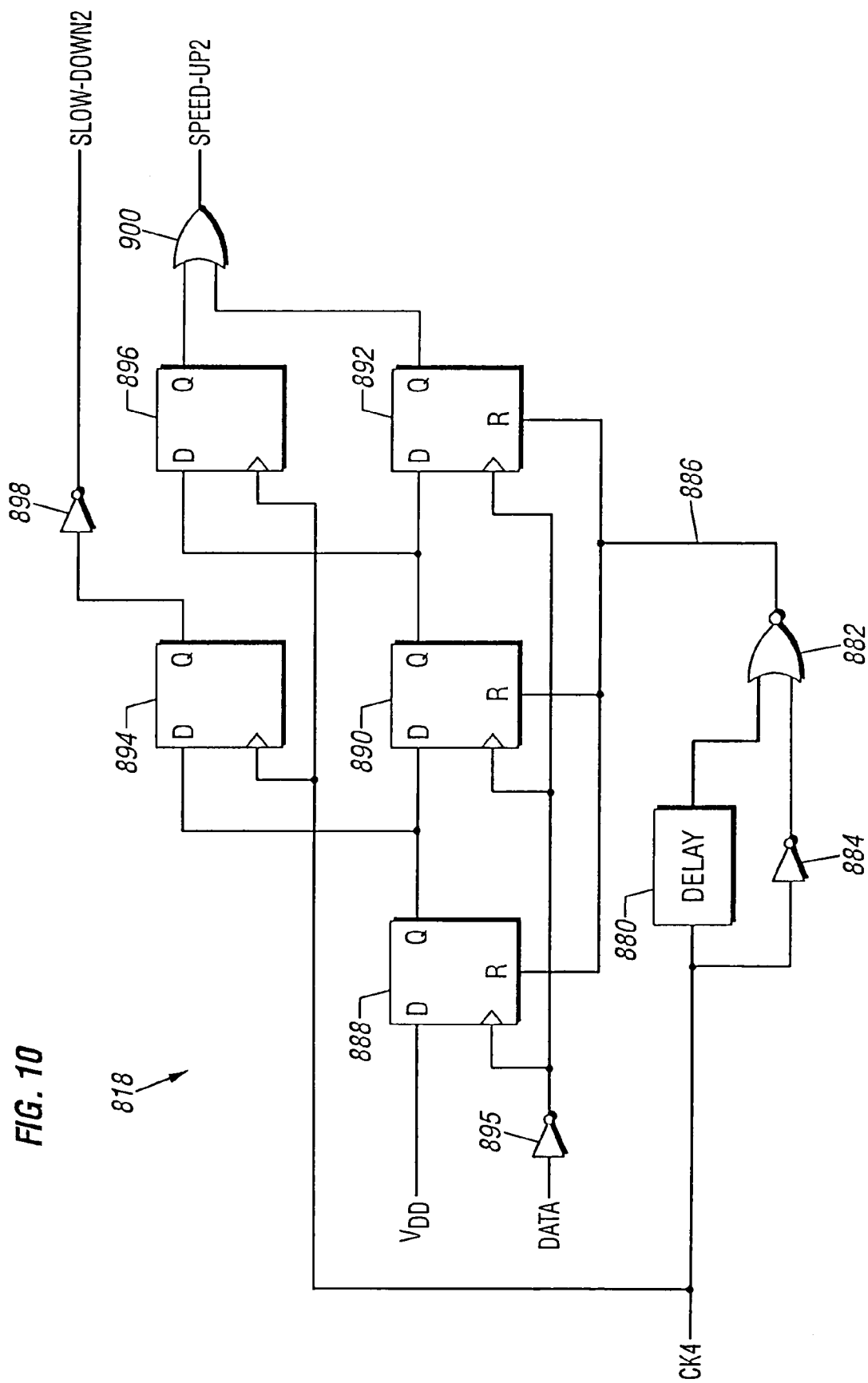
FIG. 10 is a schematic diagram of a frequency detector circuit that may be used in a clock recovery circuit according to a preferred embodiment of the present invention.

Exemplary embodiments of phase and frequency detectors 810, 818 are shown in FIGS. 9 and 10. Referring to FIG. 9, phase detector 810 has input signals CK2 and DATA and output signals SPEED-UP1 and SLOW-DOWN1. A two input NAND gate 860 has inputs DATA and CK2 and its output is connected to one input of NAND gate 862. A two input NOR gate 864 also has inputs DATA and CK2 and its output is connected to the input of inverter 866. A two input NAND gate 868 has one input connected to the output of the inverter 866 and one input connected to the output of NAND gate 862. NAND gate 862 has one input that is connected to the output of NAND gate 860 and the other input connected to the output of NAND gate 868. A three input AND gate 870 has one input connected to the output of inverter 872, another input connected to the DATA signal and another input connected to the output of NAND gate 862. The output of AND gate 870 is the SLOW-DOWN1 signal. The input of inverter 872 is connected to the CK2 signal. A three input AND gate 874 has one input connected to the output of NAND gate 862, another input is connected to the CK2 signal and another input is connected to the output of inverter 876. The output of AND gate 874 is the SPEED-UPI signal. The input of inverter 876 is connected to receive the DATA signal.

In the illustrated embodiment, phase detector 810 compares the phase on the falling edges of DATA and CK2 after both signals are high at the same time. NAND gates 862 and 868 form a set-reset type latch. The latch gets "set" such that the output of NAND gate 862 is high when both the DATA and CK2 signals are high. The latch gets "reset" such that the output of NAND gate 862 is low when both DATA and CK2 are low. When the latch is "set" (i.e., both DATA and CK2 are high), AND gates 870 and 874 are enabled. Once the AND gates 870 and 874 are enabled they can compare the falling edges of CK2 and DATA to determine which signal goes low first. If DATA goes low first, then the SPEED-UP1 signal will go high until CK2 also goes low, indicating that oscillator 535 needs to oscillate faster in order to achieve phase alignment with the DATA signal. If the CK2 signal goes low first then the SLOW-DOWN1 signal will go high until DATA also goes low, indicating that oscillator 535 should oscillate slower in order to achieve phase alignment with the DATA signal. The SPEED-UP1 and SLOW-DOWN1 signals are connected to phase detector charge-pump 816.

A preferred embodiment of frequency detector 818 is shown in FIG. 10. The inputs to frequency detector 818 are the DATA and CK4 signals and the outputs are the SPEED-UP2 and SLOW-DOWN2 signals. Delay cell 880 has its input connected to CK4 and output connected to one input of NOR gate 882. The delay cell 880 consists of an even number of capacitively loaded inverter stages or other delay generating circuitry and is well known in the art. The output of inverter 884 is connected to the other input of NOR gate 882 and the input of inverter 884 is connected to CK4. The output 886 of NOR gate 882 is reset pulse that occurs on the rising edge of CK4, and is connected to the reset input of D flip-flops 888, 890, and 892. The input of inverter 895 is connected to DATA. The output of inverter 895 is connected to the clock input of D flip-flops 888, 890, and 892. The D input of flip-flop 888 is connected to VDD. The D-input of flip-flop 890 is connected to the Q-output of flip-flop 888. The D-input of flip-flop 892 is connected to the Q-output of flip-flop 890. D flip-flops 894 and 896 have their clock inputs connected to CK4. The D input of flip-flop 894 is connected to the Q output of flip-flop 888. The D-input of flip-flop 896 is connected to the Q-output of flip-flop 890. The input of inverter 898 is connected to the Q-output of flip-flop 894, and the output of inverter 898 is the SLOW-DOWN2 signal. OR gate 900 provides the SPEED-UP2 signal. One input of OR gate 900 is connected to the Q-output of flip-flop 896, and the other input is connected to the Q-output of flip-flop 892. The SPEED-UP2 and SLOW-DOWN2 signals are connected to the frequency-detector charge pump 824.

The illustrated embodiment of frequency detector 818 counts the number of DATA pulses within one CK4 cycle. The frequency of CK4 should equal to the bit rate of the DATA pattern. Suitable encoding used for the DATA signal will ensure that there will be only one CK4 rising edge for each data pulse falling edge, if the frequency of CK4 is equal to the data rate. If the CK4 frequency is equal to the data rate then the Q-output of flip-flop 888 will be high prior to each rising edge of CK4 and the Q-outputs of flip-flops 890 and 892 will be low prior to each rising edge of CK4. If the Q-output of flip-flop 888 is low prior to the rising edge of CK4 then the SLOW-DOWN2 signal will go high for the duration of the next CK4 cycle, signaling that oscillator 535 should slow down. If the Q-output of flip-flop 890 is high prior to the rising edge of CK4, then the SPEED-UP2 signal will go high for the duration of the next CK4 cycle signaling that the oscillator should speed up.

Figure 14:
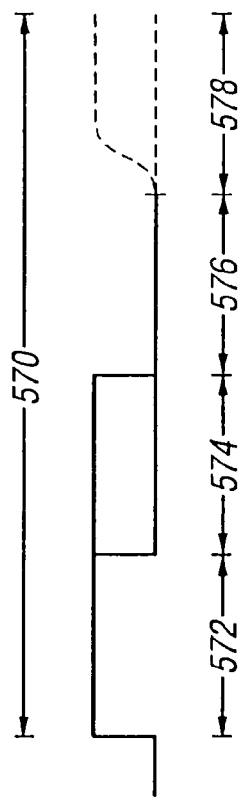
FIG. 14 is a timing diagram illustrating an alternative framing format that may be used in bidirectional embodiments of the present invention.

Another exemplary data coding scheme that may be used in an isolation system constructed in accordance with this invention is shown in FIG. 14. In this scheme, each bit period 570 is split into four fields. The first field 572 is referred to as the clock field and is always high independent of the data being transferred. The second field 574, which may occupy the second quarter of the bit period 570, contains the forward-going (from transmit side to receive side) data bit. This data bit can be either the delta-sigma data bit or a control bit or any desired type of encoding bit, in accordance with the requirements of the application in which the invention is used. The third field 576, which may occupy the third quarter of the bit period, is always low to ensure enough signal transitions to provide for power transmission in the forward path along with the first two fields, at least one of which is high in each bit period. The forward (transmit side) driver circuit is tri-stated during the fourth field 578, thus allowing for data transmission in the opposite direction across the isolation capacitor. Of course, this particular coding scheme is provided as an example, and many other coding schemes may be devised that will be operable in the various embodiments of the present invention.

It is desirable to use the logic "1" that is present at the beginning of each bit period for clock recovery, since it is always present at periodic intervals. However, if the reverse data bit from the previous bit period is a one, the rising edge at the beginning of the next bit period will not be readily seen by a logic gate and therefore will not be useful for clock recovery. To mitigate this effect and to allow reliable clock recovery, every fourth bit in the reverse field may be guaranteed to be zero by the encoding algorithms that are employed. The total frame length can be increased if more control bits need to be sent across the barrier in the reverse direction. Every fourth clock edge (the one associated with a zero in the previous reverse bit field) may then be used for clock recovery.

A block diagram of an exemplary PLL circuit that can perform clock recovery in accordance with the coding scheme of FIG. 14 is shown in FIG. 15. The forward data (conveyed from the transmit side to the receive side) is connected to divide-by-four counter 800. The output of counter 800 is connected to phase-frequency detector 801. The output of phase-frequency detector 801 is connected to charge pump 802. The output of charge pump 802 is connected to the input of loop filter 803. The output of loop filter 803 is connected to the input of voltage controlled oscillator (VCO) 804. The output of VCO 804 is the bit clock used for synchronizing the received data signal and for providing a clock signal to the receive side circuitry. The output of VCO 804 is also connected to the input of divide-by-four counter 805. The output of counter 805 is connected to the other input of phase-frequency detector 801. The phase-frequency detector 801 and the other circuits in the illustrated clock recovery circuit of FIG. 15 are well known in the art, and the specific circuitry selected for a particular application would be a matter of routine design choice.

Figure 16:
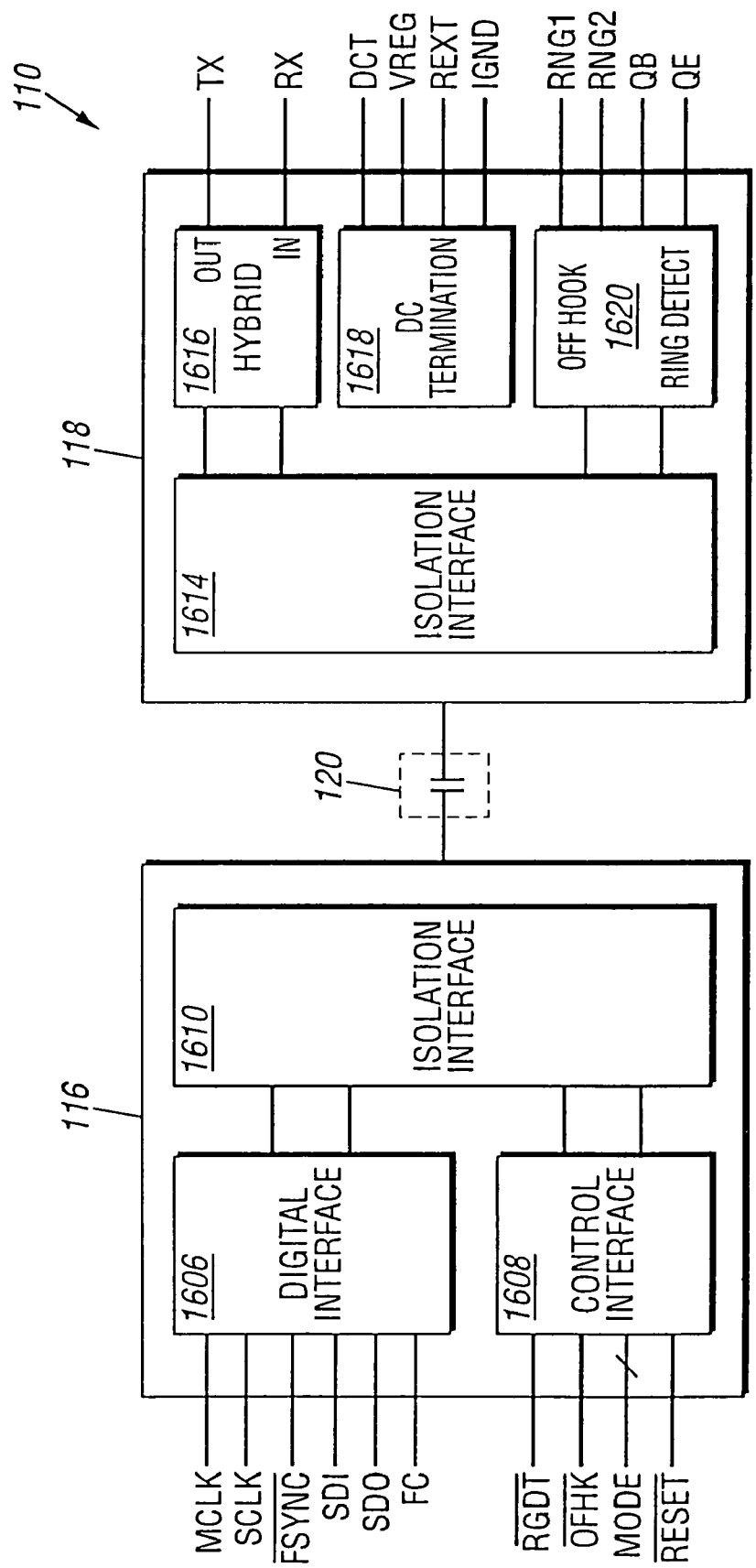
FIG. 16 is a general block diagram of digital DAA circuitry including phone line side circuitry, an isolation barrier, and powered side circuitry according to the present invention.

FIG. 16 is a general block diagram of digital DAA circuitry 110 including phone line side circuitry 118, an isolation barrier 120, and powered side circuitry 116 according to the present invention. The isolation barrier 120 may include one or more capacitors and allow for the transmission of digital information between the isolation interface 1614 in the phone line side circuitry and the isolation interface. 1610 in the powered side circuitry. The phone line side circuitry 118 may be connected to phone lines of a telephone network system, and the powered side circuitry 116 may be connected to external controllers, such as digital signal processors (DSP), that may be part of a communication device, such as a phone or modem.

The powered side circuitry 116, which may be implemented as an integrated circuit (IC), may communicate with the external controller through a digital interface 1606 and a control interface 1608. For example, the digital interface 1606 may have a number of external pins providing a serial port interface to the external controller, such as a master clock input pin (MCLK), a serial port bit clock output (SCLK), a serial port data IN pin (SDI), a serial port data OUT pin (SDO), a frame sync output pin (FSYNC_bar), and a secondary transfer request input pin (FC). Similarly, the control interface 1608 may have a number of external pins providing control and status information to and from the external controller, such as a ring detect status pin (RGDT_bar), an off-hook status pin (OFHK_bar), a reset pin (RESET_bar), and multiple mode select pins (MODE). (It is noted that the suffix "_bar" is used to denote a signal that is typically asserted when at a low logic level.) In addition, the digital interface 1606 and the control interface 1608 are connected to the isolation interface 1610 so that control, status, signal and other desired information may be transmitted to and received from the phone line side circuitry 118 across the isolation barrier 120.

The phone line side circuitry 118, which may be implemented as an integrated circuit (IC), may communicate with the phone lines through hybrid circuitry 1616, may receive DC power and provide an internal power supply voltage through DC termination circuitry 1618, and determine ring-detect and off-hook status information through off-hook/ring-detect block 1620. In addition, the hybrid circuitry 1616, the off-hook/ring-detect block 1620, and the DC termination circuitry 1618 are connected to the isolation interface 1614 so that control, status, signal and other desired information may be transmitted to and received from the powered side circuitry 116 across the isolation barrier 120.

In the embodiment depicted, the hybrid circuitry 1616 has an output pin (TX) and an input pin (RX) that may connect to external telephone interface circuitry such as hook-switch circuitry and a diode bridge. The hybrid circuitry 1616 may function to split the differential signal existing on the phone, which typically includes both transmit and receive analog information, into an internal transmit signal ($TX_{INT}$) and receive signal ($RX_{INT}$). It is noted that the TX output pin is labeled to indicate that it is used to transmit analog information to the phone lines, and that the RX pin is labeled to indicate that it is used to receive analog information from the phone lines. These external pin signals are different than the internal analog transmit signal ($TX_{INT}$) and analog receive signal ($RX_{INT}$).

The DC termination circuitry 1618 may have a number of external pins that also connect to external telephone interface circuitry such as hook-switch circuitry and a diode bridge. For example, the DC termination circuitry 1618 may have a DC termination pin (DCT), a voltage regulator pin (VREG), an external resistor pin (REXT), and a isolated ground pin (IGND). The DC termination circuitry 1618 terminates the DC voltage on the phone line and provides an internal power supply for the phone line side circuitry 118. The DC termination pin (DCT) receives the phone line DC current. The voltage regulator pin (VREG) allows external regulator circuitry, such as a capacitor, to be connected to the DC termination circuitry 1618. An external power dissipating resistor may be connected to the external resistor pin (REXT). And the isolated ground pin (IGND) may be connected to the system ground for the powered side circuitry 116 through a capacitor within the isolation barrier 120 and may also be connected to the phone line through a ground connection within external diode bridge circuitry.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead of the phone line through a capacitor (2200 pF), and the second ring detect pin (RNG2) may connect to the ring (R) lead of the phone line through a capacitor (2200 pF). In addition, off-hook/ring-detect block 1620 may have external output pins (QB, QE) that control external off-hook circuitry to enter, for example, an off-hook state or a limited power mode to get caller identification information. In addition, the output pins (QB, QE) may be connected to the base and emitter, respectively, of a bipolar transistor within external hook-switch circuitry.

Figure 17:
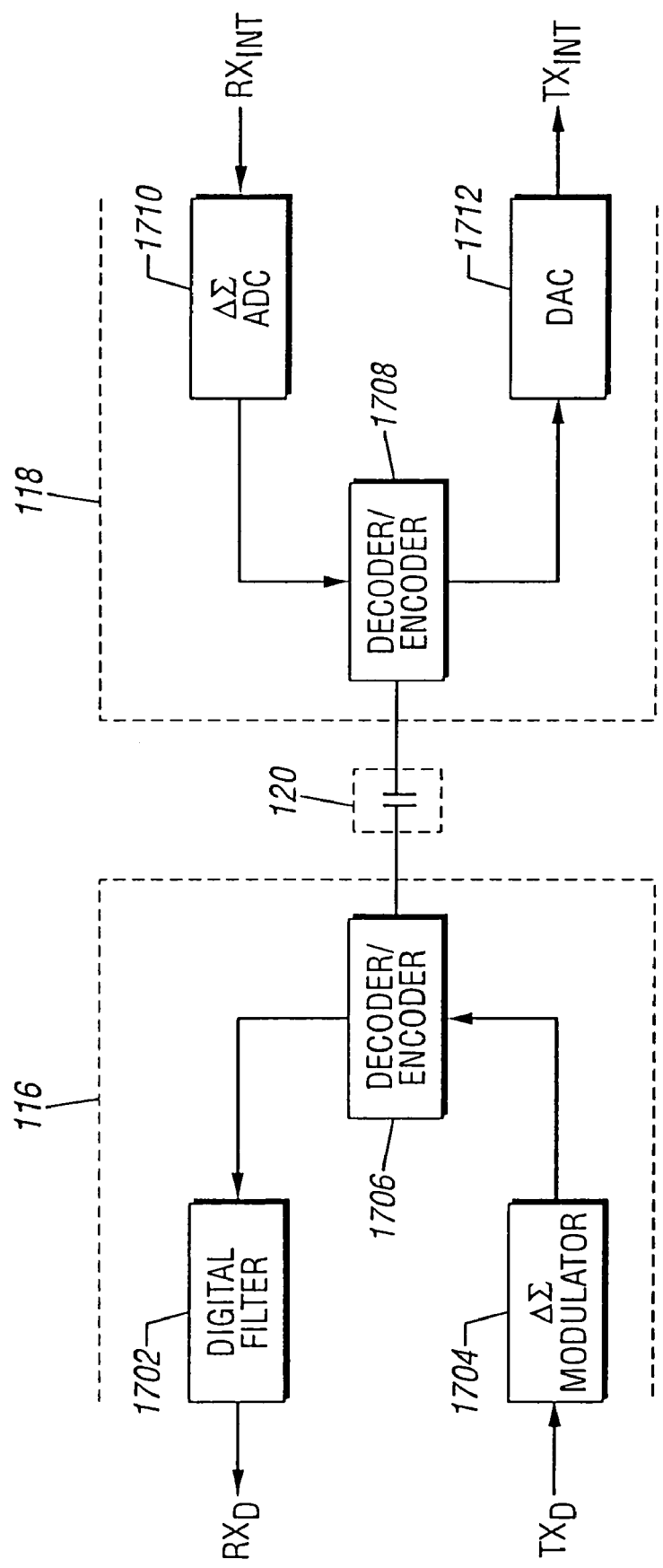
FIG. 17 is a general block diagram of transmit and receive signal paths within digital DAA circuitry according to the present invention.

FIG. 17 is a general block diagram of internal transmit (TX) and receive (RX) signal paths within digital DAA circuitry 110 according to the present invention. In the embodiment depicted, information may communicated in either direction across the isolation barrier 120. It is noted that FIG. 17 does not depict all of the functional blocks within powered side circuitry 116 and phone line side circuitry 118. It is also noted that the blocks depicted may be implemented as numerous additional blocks carrying out similar functions.

In-the embodiment of FIG. 17, communications from the phone line side circuitry 118 to the powered circuitry 116 are considered receive signals. Within phone line side circuitry 118, a delta-sigma analog-to-digital converter (ADC) 1710 receives an internal analog receive signal ($RX_{INT}$), which may be provided for example by hybrid circuitry 1616. The output of delta-sigma ADC 1710 is oversampled digital data stream in a pulse density modulation format. The decoder/encoder circuitry 1708 processes and formats this digital information as desired before sending it across the isolation barrier 120 as encoded digital information. For example, decoder/encoder 1708 may multiplex control data with the digital stream before it is sent across the isolation barrier 120. This control data may be a any desired information, such as ring detect signals, off-hook detect signals, or other phone line status information. Within powered side circuitry 116, the decoder/encoder 1706 decodes this encoded digital information received across the isolation barrier 120. The digital filter 1702 processes this decoded digital stream and converts it into internal digital receive data ($RX_D$) that may be provided through the digital interface 1606 to an external controller.

Communications from the powered side circuitry 116 to the phone line side circuitry 118 are considered transmit signals. Within powered side circuitry 116, a delta-sigma modulator 1704 receives an internal digital transmit signal ($TX_D$), which may be provided for example from an external controller through digital interface 1606. The output of delta-sigma modulator 1704 is an oversampled digital data stream in a pulse density modulation format. The decoder/encoder circuitry 1706 processes and formats this digital information as desired before sending it across the isolation barrier 120 as encoded digital information. For example, decoder/encoder 1706 may multiplex control data with the digital stream. This control data may be a any desired information, such as ring detect signals, off-hook detect signals, or other phone line status information. In addition, decoder/encoder 1706 may add framing information for;-synchronization purposes to the digital stream before it is sent across the isolation barrier 120. Still further, decoder/encoder 1706 may format the digital data stream so that a clock signal may be recovered within the phone line side circuitry 118, for example, as is discussed with respect to FIG. 14 above. Within phone line side circuitry 118, the decoder/encoder 1708 may recover a clock signal and may decode the encoded digital information received across the isolation barrier 120 to obtain framing, control or status information. The digital-to-analog converter (DAC) 1712 converts the decoded digital stream and converts it into internal analog transmit data ($TX_{INT}$) that may be provided as an analog signal through the hybrid circuitry 1616 and ultimately to the phone lines.

Figure 18:
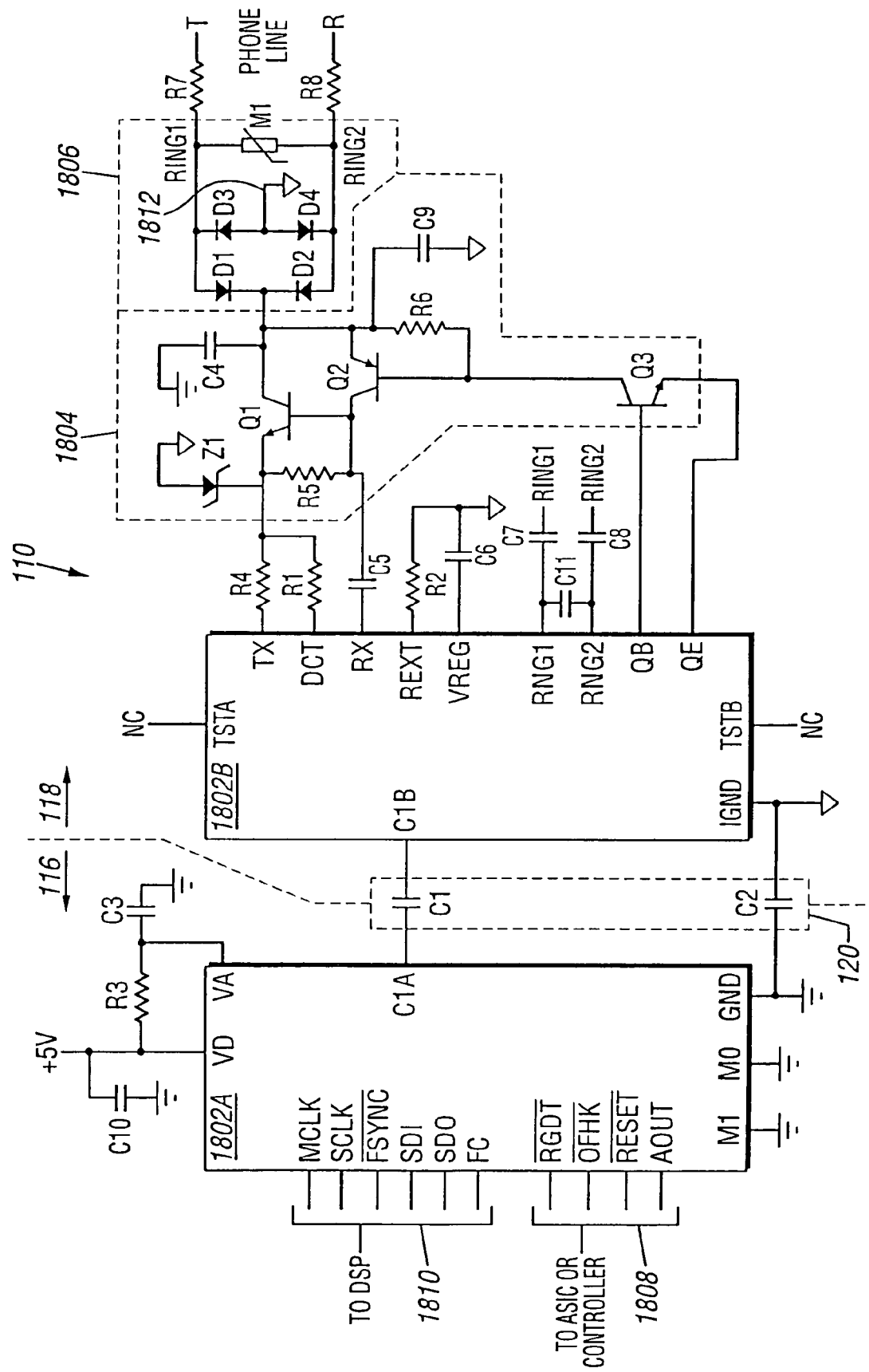
FIG. 18 is a general circuit diagram of digital DAA circuitry implemented with two integrated circuits (ICs) and a capacitive isolation barrier according to the present invention.

FIG. 18 is a general circuit diagram of digital DAA circuitry 110 implemented with a two integrated circuits (ICs) and a capacitive isolation barrier 120 according to the present invention. In particular, powered side circuitry 116 may include a powered side integrated circuit (IC) 1802A, and phone line side circuitry 118 may include a phone line side IC 1802B. External circuitry, such as hook-switch circuitry 1804 and diode bridge circuitry 1806, is also shown connected to external pins of the phone line side IC 1802B. In the embodiment depicted, external pins 1810 of the powered side IC 1802A are connected to an external digital signal processor (DSP) and the external pins 1808 are connected to a external application specific IC (ASIC) or controller. The isolation barrier 120 may include a first capacitor (C1) connecting an external signal (C1A) pin on the powered side IC 1802A to an external signal (C1B) pin on the phone line side IC 1802B. In addition, the isolation barrier 120 may., have a second capacitor (C2) connecting the isolated ground (IGND) pin on the phone line side IC 1802B to the system ground (GND) pin on the powered side IC 1802A. In addition, the isolated ground (IGND) pin may be connected to node 1812 within diode circuitry 1806 and thereby be connected to the phone line.

The data sheet, which has been attached as an APPENDIX below, further describes the embodiment depicted in FIG. 18 for digital DAA circuitry according to the present invention. This data sheet is subject to the notice of copyright at the beginning of this specification.

Si3032

DIRECT DIGITAL ACCESS ARRANGEMENT (DDAA)

Features

Complete DAA includes:

- 90 dB dynamic range TX/RX paths
- 2–4-wire hybrid
- Integrated ring detector
- 2200V isolation
- Support for Caller ID
- Low profile SOIC packages
- Direct interface to DSPs
- Integrated analog front end (AFE)
- Compliant with FCC Part 68
- Low power standby mode
- Proprietary ISOLink™ Technology

Applications

- Modems
- Phone line interface systems

Description

The Si3032 is an integrated Direct Digital Access Arrangement (DDAA) that provides a digital, low-cost, solid state interface to the telephone line. Available in two 16-pin small outline packages, it eliminates the need for an analog front end (AFE), an isolation transformer, relays, opto-isolators, and 2–4 wire hybrid. The Si3032 dramatically reduces the number of discrete components and cost required to achieve compliance with FCC Part 68. The Si3032 interfaces directly to standard modem DSPs and supports all U.S. FCC requirements. International support is provided by the pin compatible Si3034.

Ordering Information:
See "Ordering Guide" on page 24

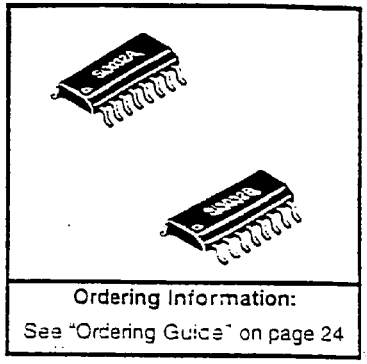

Pin Assignments

Functional Block Diagram

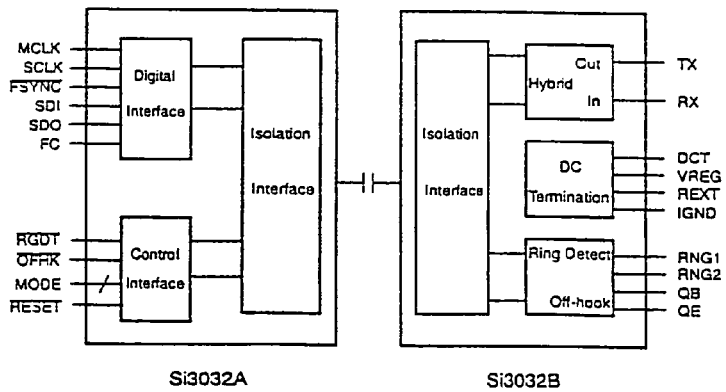

Patents pending

Preliminary Rev. 0.8 11/97       Copyright © 1997 by Silicon Laboratories       Si3032-DS08
This information applies to a product under development. Its characteristics and specifications are subject to change without notice.

Si3032

Table 1. Recommended Operating Conditions

| Parameter | Symbol | Test Condition | Min[1] | Typ | Max[1] | Unit |
|---|---|---|---|---|---|---|
| Ambient Temperature | $T_A$ | K-grade | 0 | 25 | 70 | °C |
| Ambient Temperature | $T_A$ | B-grade | 0 | 25 | 90 | °C |
| Si3032A Supply Voltage, Analog | $V_A$ | | 4.50 | 5.0 | 5.50 | V |
| Si3032A Supply Voltage, Digital[2] | $V_D$ | | 3.0 | 3.3/5.0 | 5.50 | V |

Notes:
1. All minimum and maximum specifications are guaranteed and apply across the recommended operating conditions. Typical values apply at nominal supply voltages and an operating temperature of 25°C unless otherwise stated.
2. The digital supply, $V_D$, can operate from either 3.3V or 5.0V. The Si3032A supports interface to 3.3V logic when operating from 3.3V. 3.3V operation applies to both the serial port and the digital signals $\overline{RGDT}$, $\overline{OFHK}$, $\overline{RESET}$, M0, and M1.

Table 2. Loop Characteristics
($V_A$, $V_D$ = +5V ± 10%, $T_A$ = 0°C to 70°C for K-grade, 0°C to 90°C for B-grade, refer to Figure 1)

| Parameter | Symbol | Test Condition | Min | Typ | Max | Unit |
|---|---|---|---|---|---|---|
| DC Termination Voltage | $V_{DCT}$ | $I_L$ = 20 mA | | | 7.7 | V |
| DC Termination Voltage | $V_{DCT}$ | $I_L$ = 120 mA | 12 | | | V |
| DC Ring Current | $I_{RDC}$ | | | | 720 | µA |
| AC Termination Impedance | $Z_{ACT}$ | | | 600 | | Ω |
| Operating Loop Current | $I_{LP}$ | | 8 | | 120 | mA |
| Ring Voltage Detect | $V_{RD}$ | | 13 | 18 | 26 | $V_{RMS}$ |
| Ring Frequency | $F_R$ | | 15 | | 68 | Hz |
| On-hook Leakage Current | $I_{LK}$ | $V_{SAT}$ = –48V | | | 1 | µA |
| Ringer Equivalence Number | REN | | | | 1.2 | |

Table 3. DC Characteristics, $V_D$ = +5V
($V_A$ = +5V ±10%, $V_D$ = +5V ± 10%, $T_A$ = 0°C to 70°C for K-grade, 0°C to 90°C for B-grade)

| Parameter | Symbol | Test Condition | Min | Typ | Max | Unit |
|---|---|---|---|---|---|---|
| High Level Input Voltage | $V_{IH}$ | | 2.0 | | | V |
| Low Level Input Voltage | $V_{IL}$ | | | | 0.8 | V |
| High Level Output Voltage | $V_{OH}$ | $I_O$ = –2 mA | 2.4 | | | V |
| Low Level Output Voltage | $V_{OL}$ | $I_O$ = +2 mA | | | 0.4 | V |
| Input Leakage Current | $I_L$ | | | | ±10 | µA |
| Power Supply Current, Analog | $I_A$ | $V_A$ pin | | 5 | TBD | mA |
| Power Supply Current, Digital | $I_D$ | $V_D$ pin | | 10 | TBD | mA |
| Total Supply Current, Sleep Mode | | | | | 1.5 | mA |

Preliminary Rev. 0.8

Si3032

Table 4. DC Characteristics, $V_D$ = +3.3V

($V_A$ = +5V ±10%, $V_D$ = +3.3V ± 10%, $T_A$ = 0°C to 70°C for K-grade, 0°C to 90°C for B-grade)

| Parameter | Symbol | Test Condition | Min | Typ | Max | Unit |
|---|---|---|---|---|---|---|
| High Level Input Voltage | $V_{IH}$ | | 2.0 | | | V |
| Low Level Input Voltage | $V_{IL}$ | | | | 0.8 | V |
| High Level Output Voltage | $V_{OH}$ | $I_O$ = –2 mA | 2.4 | | | V |
| Low Level Output Voltage | $V_{OL}$ | $I_O$ = +2 mA | | | 0.35 | V |
| Input Leakage Current | $I_L$ | | | | ±10 | µA |
| Power Supply Current, Analog | $I_A$ | $V_A$ pin | | 5 | TBD | mA |
| Power Supply Current, Digital | $I_D$ | $V_D$ pin | | 10 | TBD | mA |
| Total Supply Current, Sleep Mode | | | | | 1.5 | mA |

Table 5. AC Characteristics

($V_A$, $V_D$ = +5V ± 10%, $T_A$ = 0°C to 70°C for K-grade, 0°C to 90°C for B-grade)

| Parameter | Symbol | Test Condition | Min | Typ | Max | Unit |
|---|---|---|---|---|---|---|
| Freq Response, Transmit[3] | $F_{RT}$ | Low –3 dB corner | | 66 | | Hz |
| Freq Response, Transmit[3] | $F_{RT}$ | 300 Hz | –0.2 | | 0 | dB |
| Freq Response, Transmit | $F_{RT}$ | 3400 Hz | –0.2 | | 0 | dB |
| Freq Response, Receive[3] | $F_{RR}$ | Low –3 dB corner | | 6 | | Hz |
| Freq Response, Receive[3] | $F_{RR}$ | 300 Hz | –0.01 | | 0 | dB |
| Freq Response, Receive | $F_{RR}$ | 3400 Hz | –0.2 | | 0 | dB |
| Dynamic Range[4] | DR | VIN = 1 kHz, –60 dB | | 90 | | dB |
| Total Harmonic Distortion[5] | THD | VIN = 1 kHz, –3 dB | | | –84 | dB |
| Gain Drift | $A_T$ | VIN = 1 kHz | | 0.002 | | dB/°C |
| Dynamic Range (call progress AOUT) | $DR_{AO}$ | VIN = 1 kHz | 60 | | | dB |
| THD (call progress AOUT) | $THD_{AO}$ | VIN = 1 kHz | | | 1.0 | % |
| Mute Level (call progress AOUT) | | | –90 | | | dB |

Notes:
3. These characteristics are determined by external components. See Figure 8.
4. DR = 60 dB + 20 log (RMS signal/RMS noise). Applies to both the transmit and receive paths. Measurement bandwidth is 300 Hz to 3400 Hz.
5. THD = 20 log (RMS distortion/RMS signal). Applies to both the transmit and receive paths.

Silicon Laboratories

Preliminary Rev. 0.8

Si3032

Table 6. Absolute Maximum Ratings

| Parameter | Symbol | Value | Unit |
|---|---|---|---|
| DC Supply Voltage | $V_D$, $V_A$ | −0.5 to +6.0 | V |
| Input Current, Si3032A digital input pins | $I_{IN}$ | ±10 | mA |
| Digital Input Voltage | $V_{IND}$ | −0.3 to ($V_D$ + 0.3) | V |
| Operating Temperature Range | $T_A$ | −10 to 100 | °C |
| Storage Temperature Range | $T_{STG}$ | −40 to +150 | °C |

Note: Permanent device damage may occur if the above Absolute Maximum Ratings are exceeded. Functional operation should be restricted to the conditions as specified in the operational sections of this data sheet. Exposure to absolute maximum rating conditions for extended periods may affect device reliability.

Table 7. Switching Characteristics—General Inputs
($V_A$, $V_D$ = +5V ± 10%, $T_A$ = 70°C for K-grade, 90°C for B-grade, $C_L$ = 20 pF)

| Parameter | Symbol | Test Condition | Min | Typ | Max | Unit |
|---|---|---|---|---|---|---|
| Cycle time, MCLK | $t_{mc}$ | | 16.67 | | | ns |
| MCLK duty cycle | $t_{dty}$ | | 40 | 50 | 60 | % |
| Rise time, MCLK | $t_r$ | | | | 5 | ns |
| Fall time, MCLK | $t_f$ | | | | 5 | ns |
| MCLK before RESET ↑ | $t_{mr}$ | | 10 | | | cycles |
| RESET pulse width[6] | $t_{rt}$ | | 250 | | | ns |
| M0, M1 before RESET ↑[7] | $t_{mxr}$ | | 20 | | | ns |

Notes:
6. The minimum RESET pulse width is the greater of 250 ns or 10 MCLK cycle times.
7. M0 and M1 are typically connected to $V_D$ or GND and should not be changed during normal operation.
8. All timing (except Rise and Fall time) is referenced to the 50% level of the waveform. Input test levels are: $V_{IH}$ = $V_D$ − 0.4V, $V_{IL}$ = 0.4V. Rise and Fall times are referenced to the 20% and 80% levels of the waveform.

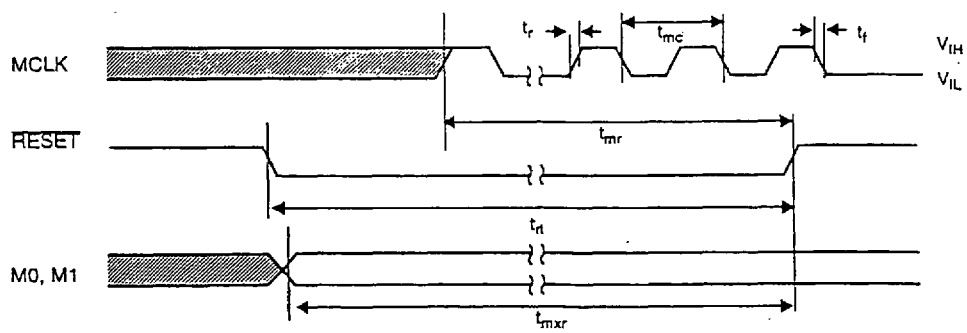

Figure 1. General Inputs Timing Diagram

Table 8. Switching Characteristics—Serial Interface
($V_A$, $V_D$ = +5V ± 10%, $T_A$ = 70°C for K-grade, 90°C for B-grade, $C_L$ = 20 pF)

| Parameter[8] | Symbol | Test Condition | Min | Typ | Max | Unit |
|---|---|---|---|---|---|---|
| Cycle time, SCLK | $t_c$ | | 354 | 1/256 Fs | | ns |
| SCLK duty cycle | $t_{dtv}$ | | | 50 | | % |
| Delay time, SCLK ↑ to FSYNC ↓ | $t_{d1}$ | | | | 10 | ns |
| Delay time, SCLK ↑ to SDO valid | $t_{d2}$ | | | | 20 | ns |
| Delay time, SCLK ↑ to FSYNC ↑ | $t_{d3}$ | | | | 10 | ns |
| Setup time, SDI before SCLK ↓ | $t_{su}$ | | 25 | | | ns |
| Hold time, SDI after SCLK ↓ | $t_h$ | | 20 | | | ns |
| Setup time, FC ↑ before SCLK ↑ | $t_{sfc}$ | | 40 | | | ns |
| Hold time, FC ↑ after SCLK ↑ | $t_{hfc}$ | | 40 | | | ns |

Notes:
9. All timing is referenced to the 50% level of the waveform. Input test levels are: $V_{IH}$ = $V_D$ − 0.4V, $V_{IL}$ = 0.4V

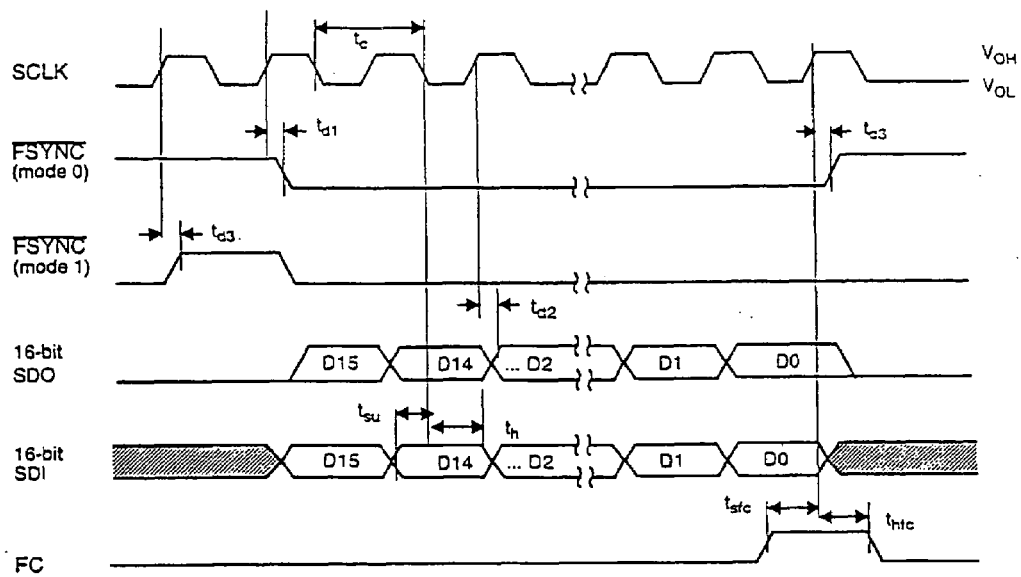

Figure 2. Serial Interface Timing Diagram

Si3032

Table 9. Digital Filter Characteristics—Interpolation and Decimation
($V_A$, $V_D$ = +5V ± 10%, Sample Rate = 8 kHz, $T_A$ = 70°C for K-grade, 90°C for B-grade)

| Parameter | Symbol | Test Condition | Min | Typ | Max | Unit |
|---|---|---|---|---|---|---|
| Passband (0.1dB) | $F_{(0.1dB)}$ | | 0 | | 3.3 | kHz |
| Passband (3dB) | $F_{(3dB)}$ | | 0 | | 3.6 | kHz |
| Passband Ripple peak-to-peak | | | −0.1 | | 0.1 | dB |
| Stopband | | | | 4.4 | | kHz |
| Stopband Attenuation | | | | −74 | | dB |
| Group Delay | $t_{gd}$ | | | 12/Fs | | sec |

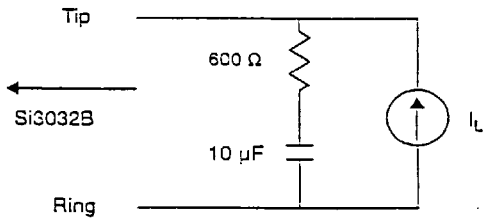

Note: The remainder of the circuit is identical to the one shown in the Application Diagram.

Figure 3. Test Circuit For Loop Characteristics

Preliminary Rev. 0.8

Si3032

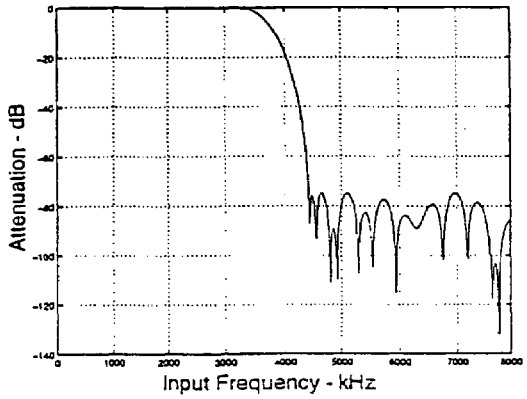

Figure 4. Decimation Filter Response

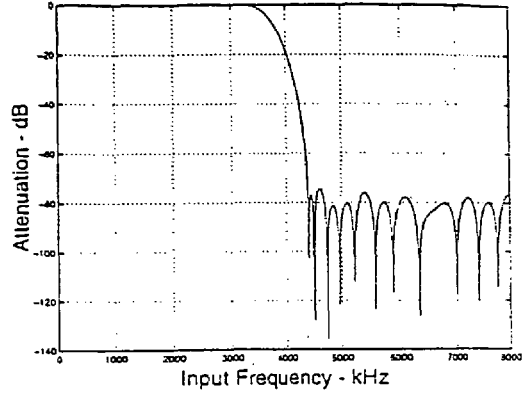

Figure 6. Interpolation Filter Response

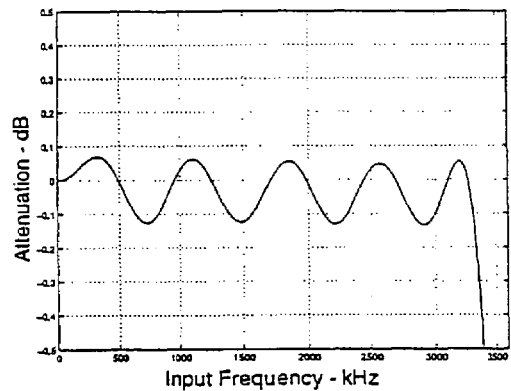

Figure 5:
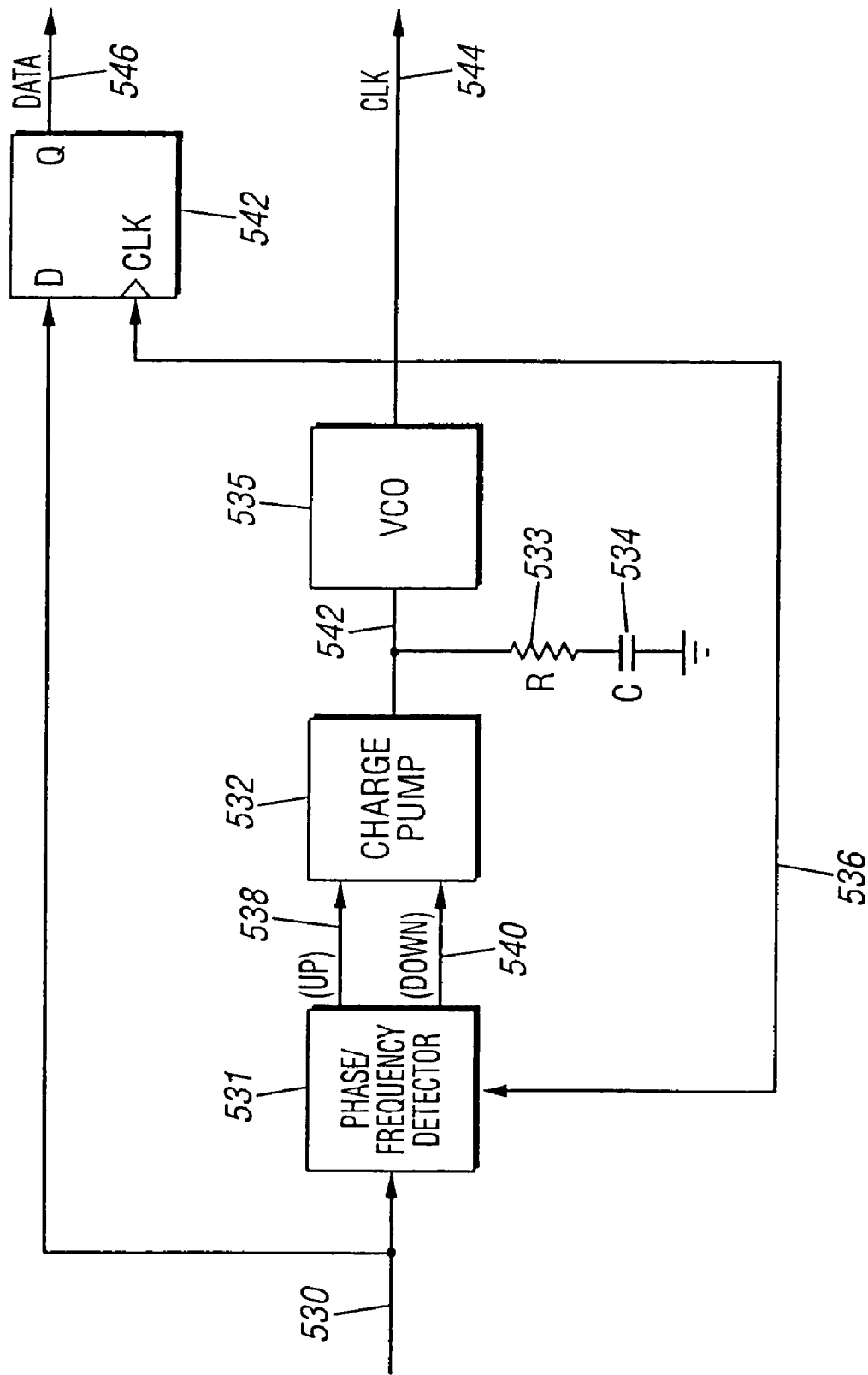
FIG. 5 is a block diagram showing the components of exemplary clock recovery circuit that is used in the present invention.

Figure 5. Decimation Filter Passband Ripple

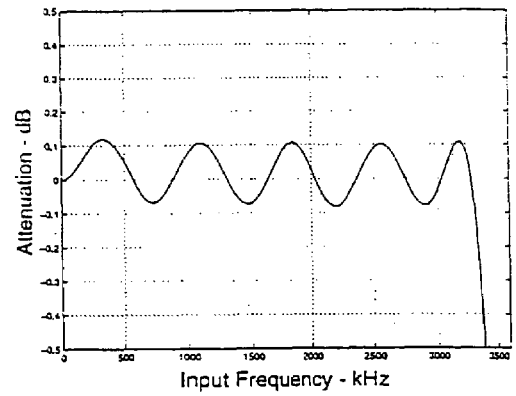

Figure 7. Interpolation Filter Passband Ripple

All filter plots apply to a sample rate of Fs = 8 kHz. The filters scale with the sample rate as follows:

$$F_{(0.1\,dB)} = 0.4125 Fs$$

$$F_{(-3\,dB)} = 0.45 Fs$$

where Fs is the sample frequency.

Preliminary Rev. 0.8

Silicon Laboratories

Si3032
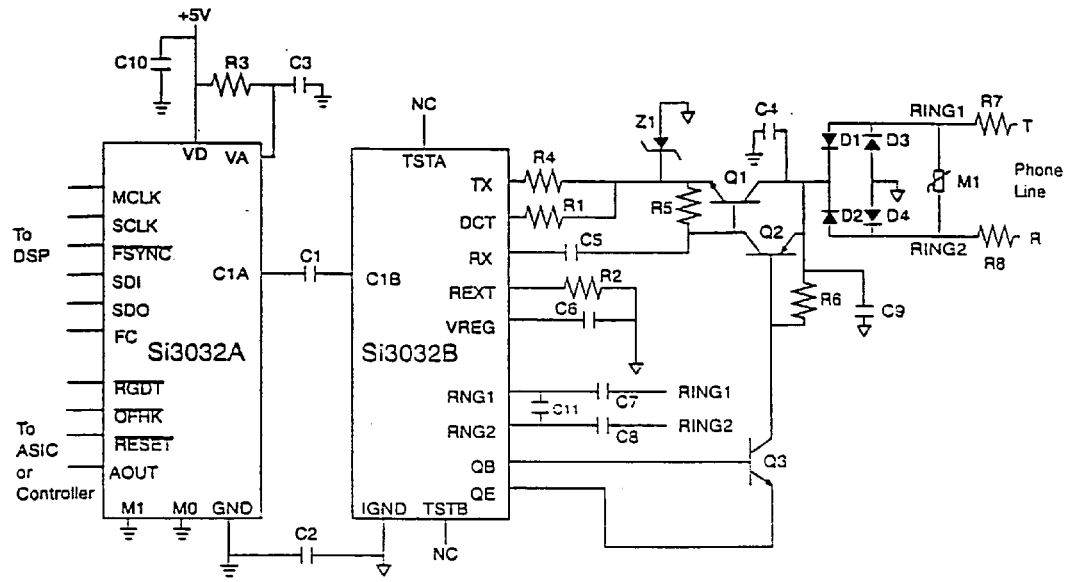
Figure 8. Typical Application Circuit
Table 10. Component Values—Typical Application
| Symbol | Value |
|---|---|
| C1 | 150 pF, 2kV, X7R, ±20% |
| C2, C4 | 1000 pF, 2kV, X7R, ±20% |
| C3, C6, C10 | 0.1 µF, 16V, ±20% |
| C5 | 0.47 µF, 16V, X7R, ±20% |
| C7, C8 | 2200 pF, 300V, X7R, ±20% |
| C9 | 15 nF, 300 V, X7R, ±20% |
| C11 | 5600 pF, 50V, X7R, ±20% |
| R1 | 51 Ω, 1/2 W ±5% |
| R2 | 15 Ω, 1/4 W ±5% |
| R3 | 10 Ω, 1/10 W, ±5% |
| Symbol | Value |
|---|---|
| R4 | 604 Ω, 1/4 W, ±1% |
| R5, R6 | 30 kΩ, 1/4 W ±5% |
| R7, R8 | 5.1 Ω, 1/4 W ±5% |
| Z1 | Zener diode, 18V |
| Q1 | Zetex FMMT497 |
| Q2 | Motorola MMBTA92LT1 |
| Q3 | Motorola MMBTA42LT1 |
| M1 | MOV |
| D1–D4 | 1N4004 |
|  |  |
Preliminary Rev. 0.8

Analog Output

Figure 9 illustrates an optional application circuit to support the analog output capability of the Si3032 for call progress monitoring purposes.

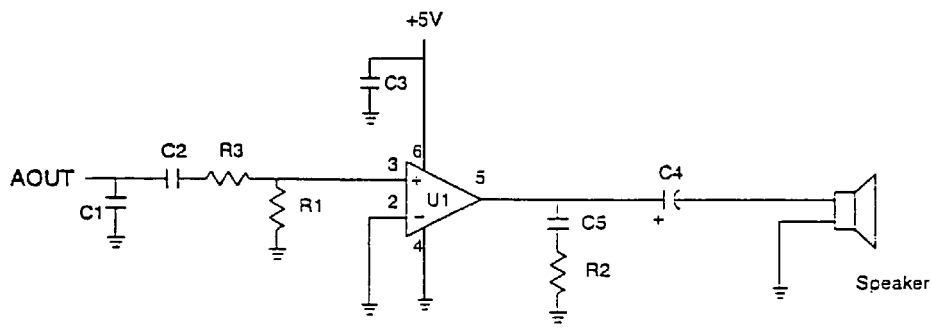

Figure 9. Optional Connection to AOUT For a Call Progress Speaker

Table 11. Component Values—Optional Connection to AOUT

| Symbol | Value |
|---|---|
| C1 | 2200 pF, 16 V, ±20% |
| C2, C3, C5 | 0.1 µF, 16 V, ±20% |
| C4 | 100 µF, 16 V, Elec. ±20% |
| R1 | 3 kΩ 1/10 W, ±5% |
| R2 | 10 Ω 1/10 W, ±5% |
| R3 | 47 kΩ 1/10W, ±5% |
| U1 | LM386 |

Preliminary Rev. 0.8

Si3032

Functional Description

The Si3032 is an integrated chip set that provides a low cost, isolated, silicon-based interface to the telephone line. The Si3032 saves cost and board area by eliminating the need for a modem analog front end or serial codec, and eliminating the need for an isolation transformer, relays, opto-isolators, and a 2–4 wire hybrid. The Si3032 solution needs only a few low cost, discrete components to achieve full compliance with FCC Part 68. See Figure 8 for a typical application circuit. See the pin-compatible Si3034 data sheet for designs requiring international support.

Isolation Barrier

The Si3032 achieves an isolation barrier through a low cost, high voltage capacitor in conjunction with Silicon Laboratories' proprietary ISOLink™ signal processing techniques. These techniques eliminate any signal degradation due to capacitor mismatches, common mode interference, or noise coupling. All transmit, receive, control, and caller ID data are communicated through this barrier.

Off-Hook

The communication system generates an off-hook command by applying logic 0 to the $\overline{OFHK}$ pin OR writing a logic 1 to bit 0 of control register 5. The $\overline{OFHK}$ pin must be enabled by setting bit 1 (CHE) of register 5. With $\overline{OFHK}$ at logic 0, the system is in an off-hook state. This state is used to seize the line for an outgoing call and can also be used for pulse dialing. With $\overline{OFHK}$ at logic 1, negligible DC current flows through the hookswitch. When a logic 0 is applied to the $\overline{OFHK}$ pin, the hookswitch transistor pair, Q1 & Q2, turn on. The net effect of the hook signal is the application of a termination impedance across tip and ring and the flow of DC loop current. The termination impedance has both an AC and DC component.

The AC termination impedance is a 604 ohm resistor, which is connected to the TX pin. The DC termination is a 51 ohm resistor, which is connected to the DCT pin.

When executing an off-hook sequence the Si3032 requires 4620/Fs clock cycles to complete the off-hook and provide phone line data on the serial link. This includes the 12/Fs filter group delay. It is recommended, for the shortest delay, a higher Fs is established prior to executing the off-hook, such as an Fs of 10.286 kHz.

Ring Detect

The ring signal enters the Si3032 through low value capacitors connected to Tip and Ring. $\overline{RGDT}$ is a clipped, half-wave rectified version of the ringing waveform. See Figure 10 for a timing diagram of the $\overline{RGDT}$ pin.

The integrated ring detect of the Si3032 allows it to present the ring signal, with caller ID information, to the DSP through the serial port with no additional signaling required. The signal sent to the DSP is a clipped version of the original ring signal. The Si3032 passes through the caller ID data unaltered.

The system can also detect a ring occurring by the status of the RDT bit of register 5. This bit is a read only bit that is set when the line side device detects a ring signal at RNG1 and RNG2. When this state occurs, the line side chip draws a small amount of DC current from the line to provide the digitized line data to the DSP. This bit clears when the system either goes off-hook or four to eight seconds after the last ring is detected.

Digital Interface

The Si3032 has two serial interface modes that support most standard modem DSPs. The M0 and M1 mode pins select the interface mode. The key difference between these two serial modes is the operation of the $\overline{FSYNC}$ signal. Table 15 summarizes the serial mode definitions.

The digital interface consists of a single synchronous serial link which communicates both telephony and control data.

The Si3032 operates as a master, where the master clock (MCLK) is an input and the serial data clock (SCLK) is an output. The MCLK frequency and the value of the sample rate control registers 7, 8, 9 and 10 determine the sample rate (Fs). The serial port clock, SCLK, runs at 256 bits per frame, where the frame rate is equivalent to the sample rate. Refer to "Clock Generation Subsystem" on page 11 for more details on programming sample rates.

The Si3032 transfers 16-bit or 15-bit telephony data in the primary timeslot and 16-bit control data in the secondary timeslot. Figure 12 and Figure 13 show the relative timing of the serial frames. Primary frames occur at the frame rate and are always present. To minimize overhead in the external DSP, secondary frames are not present every frame, but only when requested.

Two methods exist for transferring control information in the secondary frame. The default power-up mode uses the LSB of the 16-bit transmit (TX) data word as a flag to request a secondary transfer. In this mode, only 15-bit TX data is transferred, resulting in a loss of SNR but allowing software control of the secondary frames. In addition, the FC pin can serve as a hardware flag for requesting a secondary frame. The external DSP can Preliminary Rev. 0.8

Si Silicon Laboratories

Si3032 turn on the 16-bit TX mode by setting the S8 bit of register 1. In the 16-bit TX mode, the hardware FC pin must be used to request secondary transfers.

Figure 14 and Figure 15 illustrate the secondary frame read cycle and write cycle, respectively. During a read cycle, the R/W bit is high and the 5-bit address field contains the address of the register to be read. The contents of the 8-bit control register are placed on the SDO signal. During a write cycle, the R/W bit is low and the 5-bit address field contains the address of the register to be written. The 8-bit data to be written immediately follows the address on SDI. Only one register can be read or written during each secondary frame. See "Control Registers" on page 19 for the register addresses and functions.

Clock Generation Subsystem

The Si3032 contains an on-chip clock generator. This unique design allows it to generate all the desired standard modem sample rates, as well as the common 11.025 kHz rate for audio playback, with a single clock-in frequency at MCLK.

The clock generator consists of two phase-locked loops (PLLs) that achieve the desired sample frequencies. Figure 11 illustrates the clock generator. The architecture allows a wide range of MCLK frequencies to satisfy the system clock requirements. Depending on the clock mode, maximum sample rate lock times of either 100 μs or 1 ms are guaranteed. These lock times allows for very fast sample rate adjustments when negotiating with a down-line modem during connect time.

The clock generator supports two different clocking modes. These modes are controlled by the clock generation mode (CGM) bit in register 10. Mode 0 allows for PLL lock times of less than 100 μs. However, the MCLK flexibility is not as great in this mode as in mode 1. Mode 1 results in PLL lock times of less than 1 ms, but increases the MCLK choices. The designer must carefully consider the available MCLK frequencies and the system lock time requirements to determine which scheme is appropriate.

Programming the Clock Generator

The clock generator, while flexible in design, requires some specific rules for setting the registers. Use the following sequence when setting up the clock generator following a reset condition:

1. Set the value of the CGM (register 10 bit 0) for the desired clocking scheme.
2. Program the first PLL by writing the values for N1 (register 7) and M1 (register 8). This order is critical;

program N1 *first*, then M1. In addition, program *both* registers each time the first PLL must change. When both registers have been set, the first PLL closes the loop and locks.
3. Set up the second PLL by writing the values for N2 and M2 (register 9). When this register has been set, the second PLL closes the loop and locks. Any changes to the CGM bit after writing to register 9 do not take affect until the next write of register 9.

Clock Generation Mode 0 (CGM = 0)

In mode 0, the designer gains the advantage of fast PLL locking times. Design considerations for this choice include:

1. The system has the ability to accept limited choices for the Si3032 MCLK.
2. The system needs to achieve a fast sample rate change. Note, as with mode 1, the filter group delay of 12/Fs must be accounted for in determining the overall time for the data pump to receive new data after requesting a sample rate change.
3. For the PLLs to operate in a stable region, the following condition for the update rates into the PLLs ($F_{UP1}$, $F_{UP2}$) must be met:

$$F_{UP1} \geq 144 kHz$$

$$F_{UP2} \geq 1.44 MHz$$

See Figure 11 for a diagram of the clock generation subsystem.

4. For the standard modem sample rates shown in Table 13, program $F_{PLL1}$ to 36.864 MHz. This value allows a single register update when requesting sample rate changes, thus minimizing the overall time for sample rate changes.

To satisfy condition 4, the N1 and M1 values must satisfy this equation:

$$MCLK = (F_{PLL1} \cdot N1)/M1$$

N1 (register 7) and M1 (register 8) are 8-bit unsigned values. Table 14 lists several standard crystal rates that could be supplied to MCLK. If condition 4 can be met, then the first PLL needs to be programmed only at start-up and following a reset of the chip.

Note that condition 3 must also be satisfied. The equation for this condition is:

$$F_{UP1} = (MCLK/N1) \geq 144 kHz$$

After the first PLL has been setup, the second PLL can be programmed easily. For this case, set the CGM bit to

Si3032

0. Zero is the default value for the CGM bit and does not need to be written if the bit has not been set previously. The values for N2 and M2 are shown in Table 13.

Note: The values shown in Table 12, Table 13, and Table 14 satisfy the equations above. However, when programming the registers for N1, M1, N2, and M2, the value placed in these registers must be one less than the value calculated from the equations. For example, for mode 0 with a MCLK of 48.0 MHz, the values placed in the N1 and M1 registers would be 7Ch and 5Fh, respectively.

Clock Generation Mode 1 (CGM = 1)

In mode 1, the designer has a larger selection of allowable MCLK frequencies. Design considerations for this choice include:

1. System constraints on the clock available for the Si3032 MCLK pin.
2. System can tolerate PLL locking times of up to 1 ms. Note, while the clock generator will lock in less than 5/Fs, the group delay of the Si3032's digital filters (12/Fs) must be accounted for in determining the overall time for the data pump to receive new data after requesting a sample rate change.
3. For the PLLs to operate in a stable region, the update rates into the PLLs ($F_{UP1}$, $F_{UP2}$) must meet the following conditions:

$$F_{UP1}, F_{UP2} \geq 144 kHz$$

See Figure 11 for a diagram of the clock generation subsystem.

4. For the standard modem sample rates shown in Table 13, $F_{PLL1}$ should be 57.6 MHz. This value allows for a single register update when requesting sample rate changes, thus minimizing the overall time for sample rate changes.

To satisfy condition 4, the N1 and M1 values must satisfy this equation:

$$MCLK = (F_{PLL1} \cdot N1)/M1$$

N1 (register 7) and M1 (register 8) are 8-bit unsigned values. Table 12 lists several standard crystal rates that could be supplied to MCLK. If condition 4 can be met, then the first PLL needs to be programmed only at start-up and following a reset of the chip.

Note that condition 3 must also be satisfied. The equation for this condition is:

$$F_{UP1} = (MCLK/N1) \geq 144 kHz$$

After the first PLL has been set up, the second PLL can be programmed easily. For this case, set the CGM bit to 1 following a reset. It should not need to be set again. The values for N2 and M2 are shown in Table 13.

Note: The values shown in Table 12, Table 13, and Table 14 satisfy the equations above. However, when programming the registers for N1, M1, N2, and M2, the value placed in these registers must be one less than the value calculated from the equations. For example, for mode 1 with a MCLK of 60.0 MHz, the values placed in the N1 and M1 registers would be 18h and 17h, respectively.

Setting Generic Sample Rates

The above clock generation mode descriptions focus on the common modem sample rates. An application may require a sample rate not listed in Table 13, such as the common audio rate of 11.025 kHz. The restrictions and equations above still apply; however, a more generic relationship between MCLK and Fs (the desired sample rate) is needed. The following equation describes this relationship:

$$\frac{M1 \cdot M2}{N1 \cdot N2} = ratio \cdot \frac{5 \cdot 1024 \cdot Fs}{MCLK}$$

where Fs is the sample frequency, ratio is 1 for mode 0 and 25/16 for mode 1, and all other symbols are shown in Figure 11.

Knowing the MCLK frequency, the clock mode, and desired sample rate allows the determination of values for the M1, N1, M2, N2 registers. When determining these values, remember to consider the range for each register as well as the minimum update rates for the first and second PLL.

The values determined for M1, N1, M2, and N2 must be adjusted by minus one when determining the value written to the respective registers. This is due to internal logic, which adds one to the value stored in the register. This addition allows the user to write a zero value in any of the registers and the effective divide by is one. A special case occurs when both M1 and N1 and/or M2 and N2 are programmed with a zero value. When Mx and Nx are both zero the corresponding PLLx is bypassed. Note that if M2 and N2 are set to zero the ratio of 25/16 is eliminated and cannot be used in the above equation. In this condition the CGM bit has no effect.

Sleep Mode

The Si3032 supports a low power sleep mode. Activate sleep mode by setting the Power Down (PDN) bit in register 6. In this mode, the RDT pin functions when a ring is detected. When the Si3032 is in sleep mode, the MCLK signal may be stopped or remain active, but it Preliminary Rev. 0.8

Silicon Laboratories

Si3032

*must* be active before waking up the Si3032. To take the Si3032 out of sleep mode, pulse the reset pin (RESET) low. In summary, the power down/up sequence is as follows:

1. Set the Power Down bit (PDN, register 6, bit 3).
2. MCLK may stay active or stop.
3. Restore MCLK before initiating the power up sequence.
4. Reset the Si3032 using the RESET pin (after MCLK is present).
5. Program the registers to desired settings.

Note: The line side chip defaults to a low power mode. Following any reset of the chip set, be sure to clear the PDL bit in register 6 for proper operation. This should be done only *after* the clock generator has been successfully programmed.

The Si3032 supports an additional power down mode. When both the PDL (register 6, bit 4) and PDN (register 6, bit 3) bits are set, the chip set enters a complete power down mode and draws negligible current. In this mode, the RDT pin does not function. Restore normal operation using the same process for taking the chip set out of sleep mode. Set the PDL bit either before setting the PDN bit or at the same time.

Analog Output

The Si3032 supports an analog output (AOUT) for driving the call progress speaker found with most of today's modems. AOUT is an analog signal that is comprised of a mix of the transmit and receive signals. The receive portion of this mixed signal has a 0 dB gain while the transmit signal has a gain of –20 dB.

The transmit and receive portions of the AOUT signal have independent mute controls found in control register 6. Figure 9 illustrates a recommended application circuit. Note that in the configuration shown, the LM386 provides a gain of 26 dB. Make additional gain adjustments by varying R1 and R3.

On-hook Line Monitor

The Si3032 allows the user to detect line activity when the device is in an on-hook state. When the system is on-hook, the line data can be passed to the DSP across the serial port while drawing a small amount of DC current from the line. This process is similar to the passing of line information (such as caller ID) while on-hook following a ring signal detection. To activate this feature, set the SNP bit in register 5.

Loop Current Monitor

When the system is in an off-hook state, the LCS bits of register 12 indicate the amount of DC loop current that is flowing in the loop. The LCS is a 4-bit value ranging from zero to fifteen. Each unit represents 8 mA of loop current. An LCS value of zero means the loop current is less than 8 mA. An LCS value of fifteen means the loop current is greater than 120 mA.

This feature enables the modem to determine if an additional line has "picked up" while the modem is transferring information. In the case of a second phone going off-hook, the loop current falls approximately 50% and is reflected in the value of the LCS bits.

In-Circuit Testing

The Si3032's advanced design provides the modem manufacturer with increased ability to determine system functionality during production line tests, as well as user diagnostics. Several loopback modes exist allowing increased coverage of system components. For all test modes a line side power source is needed. While a standard phone line can be used, the test circuit in Figure 3 is adequate. In addition, an off-hook sequence must be performed to connect the power source to the line side chip.

The digital loopback mode allows the data pump to provide a digital input test pattern on SDI and receive that digital test pattern back on SDO. To enable this mode, set the DL bit of register 1. In this mode, the isolation barrier is actually being tested. The digital stream is delivered across the isolation capacitor, C1 of Figure 8, to the line side device and returned across the same barrier.

The analog loopback mode allows an external device to drive the RX pin of the line side chip and receive the signal from the TX pin. This mode allows testing of external components connecting the RJ-11 jack (tip and ring) to the line side of the Si3032. To enable this mode, set the AL bit of register 2.

The final testing mode allows the system to test the basic operation of the converters of the line side and the external components R4, C4, and C5 of Figure 8. In this test mode, the data pump provides a digital test waveform on SDI. This data is passed across the isolation barrier, converted to analog, looped from the TX to RX pins, converted to digital, passed back across the isolation barrier, and presented to the data pump on SDO. To enable this mode, clear the TXE bit of register 2.

Note: All test modes are mutually exclusive. If more than one test mode is enabled concurrently, the results are unpredictable.

Preliminary Rev. 0.8

Si3032

Exception Handling

The Si3032 provides several mechanisms to determine if an error occurs during operation. Through the secondary frames of the serial link, the controlling DSP can read several status bits. The bit of highest importance is the frame detect bit (FDT, register 12 bit 6). This bit indicates that the DSP side and Line side chips are communicating. During normal operation, check the FDT bit before reading any bits that indicate information about the line side chip. If FDT is not set, then the following bits related to the line side chip are invalid: RDT, LCS, CBID, REVB.

Following power-up and reset, the FDT bit is not set because the PDL bit (register 6 bit 4) defaults to 1. In this state, the ISOLink is not operating and no information about the line side chip can be determined. The user must program the clock generator to a valid configuration for the system and clear the PDL bit to activate the ISOLink. During the frame acquiring period, the DSP side chip does not generate -FSYNC signals. Therefore, if the controlling DSP serial interface is interrupt driven, based on the -FSYNC signal, the controlling DSP does not require a special delay loop to wait for this event to complete.

The FDT bit can also indicate if the line side chip executes an off-hook request successfully. If the line side chip is not connected to the phone line (that is, the user forgets to connect the phone line to the modem), the FDT bit remains cleared. In this condition, the DSP serial interface is able to pass secondary frames without interruption because no updates to the PLL have occurred, so the controlling DSP must allow sufficient time for the line side chip to execute the off-hook request. The maximum time for FDT to be valid following an off-hook request is 10 ms. At this time, the LCS bits indicate the amount of loop current flowing. For more information, see "Loop Current Monitor" on page 13.

Another useful bit is the communication link error (CLE) bit (register 12 bit 7). The CLE bit indicates a time-out error for the ISOLink following a change to either PLL1 or PLL2. For more information, see "Clock Generation Subsystem" on page 11. When the CLE bit is set, the DSP side chip has failed to receive verification from the line side that the clock change has been accepted in an expected period of time. This condition indicates a severe error in programming the clock generator or possibly a defective line side chip.

Preliminary Rev. 0.8

Silicon Laboratories

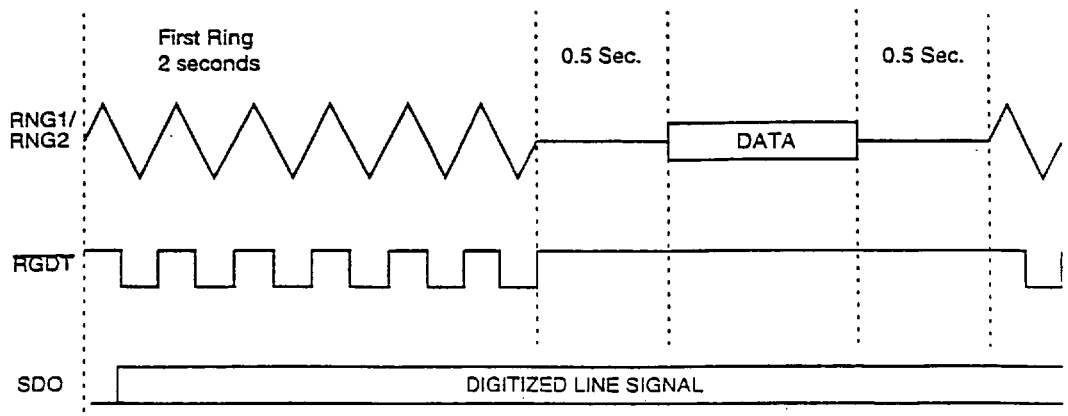
Figure 10. Ring Detect Timing
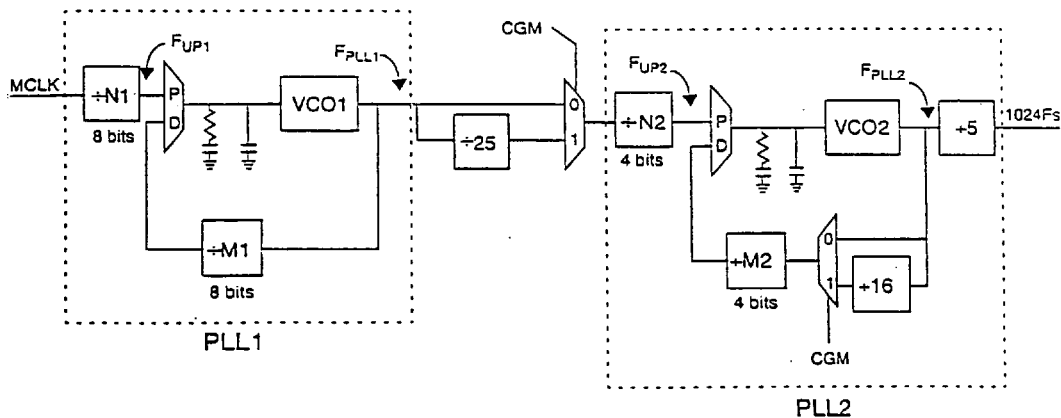
Figure 11. Clock Generation Subsystem

Si3032

Table 12. MCLK Examples (CGM = 1)

| MCLK (MHz) | N1 | M1 |
|---|---|---|
| 1.8432 | 4 | 125 |
| 4.0000 | 5 | 72 |
| 5.0688 | 11 | 125 |
| 6.0000 | 5 | 48 |
| 6.1440 | 8 | 75 |
| 8.1920 | 32 | 225 |
| 9.2160 | 4 | 25 |
| 10.0000 | 25 | 144 |
| 10.3680 | 9 | 50 |
| 11.0592 | 24 | 125 |
| 12.2880 | 16 | 75 |
| 14.7456 | 32 | 125 |
| 16.0000 | 5 | 18 |
| 18.4320 | 8 | 25 |
| 24.5760 | 32 | 75 |
| 33.8688 | 147 | 250 |
| 44.2368 | 96 | 125 |
| 47.9232 | 104 | 125 |
| 56.0000 | 35 | 36 |
| 60.0000 | 25 | 24 |

Table 13. N2, M2 Values (CGM = 0, 1)

| Fs (Hz) | N2 | M2 |
|---|---|---|
| 7200 | 1 | 1 |
| 8000 | 9 | 10 |
| 8229 | 7 | 8 |
| 8400 | 6 | 7 |
| 9000 | 4 | 5 |
| 9600 | 3 | 4 |
| 10286 | 7 | 10 |

Table 14. MCLK Examples (CGM = 0)

| MCLK (MHz) | N1 | M1 |
|---|---|---|
| 1.8432 | 1 | 20 |
| 4.0960 | 1 | 9 |
| 5.0688 | 11 | 80 |
| 6.1440 | 1 | 6 |
| 9.2160 | 1 | 4 |
| 10.3680 | 9 | 32 |
| 11.0592 | 3 | 10 |
| 12.2880 | 1 | 3 |
| 14.7456 | 2 | 5 |
| 18.4320 | 1 | 2 |
| 25.8048 | 7 | 10 |
| 33.8688 | 147 | 160 |
| 46.0800 | 5 | 4 |
| 47.9232 | 13 | 10 |
| 48.0000 | 125 | 96 |

Table 15. Serial Modes

| Mode | M1 | M0 | Description |
|---|---|---|---|
| 0 | 0 | 0 | FSYNC frames data |
| 1 | 0 | 1 | FSYNC pulse starts data frame |
| 2 | 1 | 0 | Reserved |
| 3 | 1 | 1 | Reserved |

Preliminary Rev. 0.8

Si Silicon Laboratories

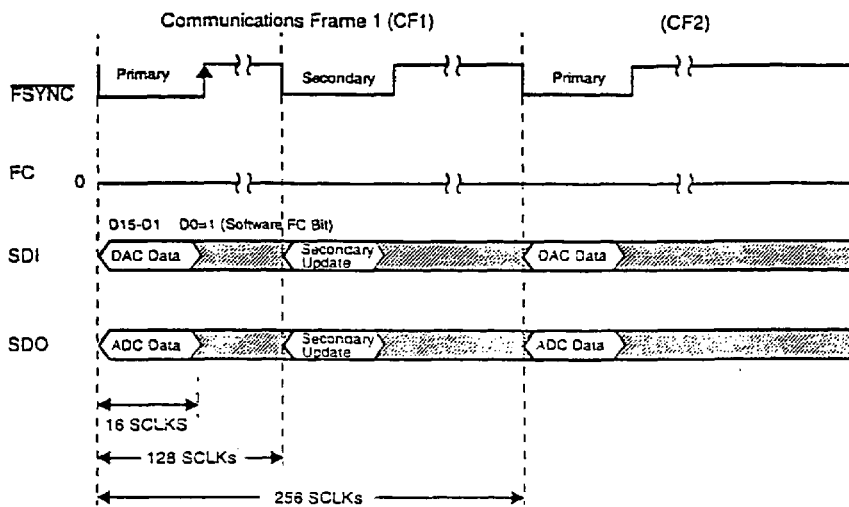
Figure 12. Software FC Secondary Request
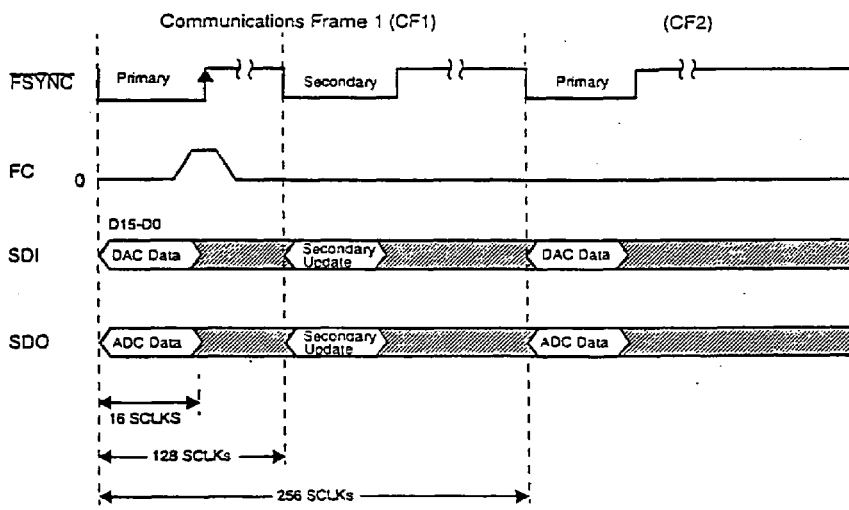
Figure 13. Hardware FC Secondary Request

Si3032
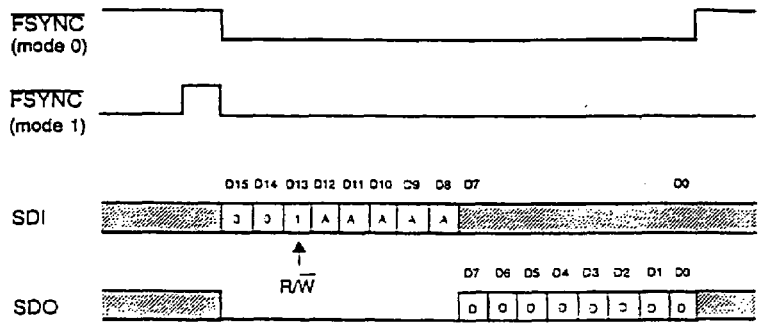
Figure 14. Secondary Communication Data Format—Read Cycle
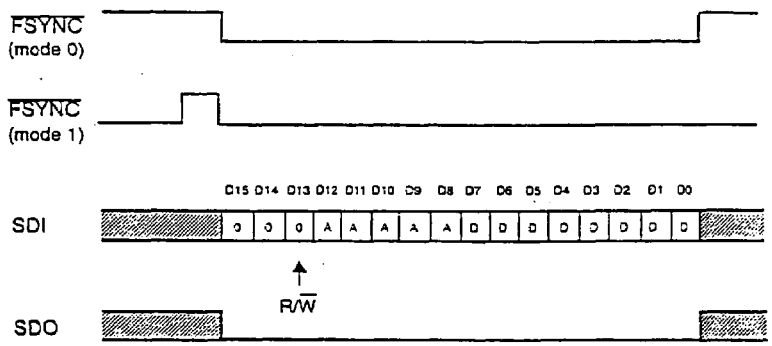
Figure 15. Secondary Communication Data Format—Write Cycle

Si3032

Control Registers

Note: Any register not listed here is reserved and should not be written.

Register 1. Control 1

| D7 | D6 | D5 | D4 | D3 | D2 | D1 | D0 |
|----|----|----|----|----|----|----|----|
| SR |    |    |    |    |    | DL | SB |
| R/W |   |    |    |    |    | R/W | R/W |

Reset settings = 0000 0000

| Bit | Name | Function |
|-----|------|----------|
| 7 | SR | Software Reset. 1 = Sets all registers to their reset value. 0 = Enables chip for normal operation. |
| 6:2 | Reserved | Read returns zero. |
| 1 | DL | Digital Loopback. 1 = Enables digital loopback mode. |
| 0 | SB | Serial Digital Interface Mode. 1 = The serial port is operating in 16-bit mode and requires use of the secondary frame sync signal, FC, to initiate control data reads/writes. 0 = Operation is in 15-bit mode and the lsb of the data field indicates whether a secondary frame is required. |

Register 2. Control 2

| D7 | D6 | D5 | D4 | D3 | D2 | D1 | D0 |
|----|----|----|----|----|----|----|----|
|    |    |    |    | AL |    | TXE | RXE |
|    |    |    |    | R/W |   | R/W | R/W |

Reset settings = 0000 0011

| Bit | Name | Function |
|-----|------|----------|
| 7:4 | Reserved | Read returns zero. |
| 3 | AL | Analog Loopback. 1 = Enables analog loopback mode. |
| 2 | Reserved | Read returns zero. |
| 1 | TXE | Transmit Enable. 1 = Enables transmit path |
| 0 | RXE | Receive Enable. 1 = Enables receive path |

Register 3. Control 3

| D7 | D6 | D5 | D4 | D3 | D2 | D1 | D0 |
|----|----|----|----|----|----|----|----|
|    |    |    |    |    |    |    |    |

Reset settings = 0000 0000

| Bit | Name | Function |
|-----|------|----------|
| 7:0 | Reserved | Read returns zero. |

Register 4. Control 4

| D7 | D6 | D5 | D4 | D3 | D2 | D1 | D0 |
|----|----|----|----|----|----|----|----|
|    |    |    |    |    |    |    |    |

Reset settings = 0000 0000

| Bit | Name | Function |
|-----|------|----------|
| 7:0 | Reserved | Read returns zero. |

Register 5. DAA Control 1

| D7 | D6 | D5 | D4 | D3 | D2 | D1 | D0 |
|----|----|----|----|----|----|----|----|
|    |    |    |    | SNP | RDT | OHE | OH |
|    |    |    |    | R/W | R | R/W | R/W |

Reset settings = 0000 0000

| Bit | Name | Function |
|-----|------|----------|
| 7:4 | Reserved | Read returns zero. |
| 3 | SNP | Snoop. 1 = Enables low-power monitoring mode allowing the DSP to receive line activity without going off-hook. |
| 2 | RDT | Ring Detect. 1 = Indicates a ring is occurring. |
| 1 | OHE | Off-hook Pin Enable. 1 = Enables the operation of the off-hook pin. 0 = Off-hook pin is ignored. |
| 0 | OH | Off-hook. 1 = Causes the line side chip to go off-hook. This bit operates independently of OHE and is a logic OR with the off-hook pin when enabled. |

Si Silicon Laboratories

Preliminary Rev. 0.8

Si3032

Register 6. DAA Control 2

| D7 | D6 | D5 | D4 | D3 | D2 | D1 | D0 |
|---|---|---|---|---|---|---|---|
|  | ATM | ARM | PDL | PDN |  |  |  |
|  | R/W | R/W | R/W | R/W |  |  |  |

Reset settings = 0111 0000

| Bit | Name | Function |
|---|---|---|
| 7 | Reserved | Read returns zero. |
| 6 | ATM | Analog Transmit Path Mute. 1 = Mutes the transmit path. This is the default value. |
| 5 | ARM | Analog Receive Path Mute. 1 = Mutes the receive path. This is the default value. |
| 4 | PDL | Power Down Line Side Chip. 1 = Places the Si3032B in lower power mode. This bit must be zero for normal operation. Program the clock generator before clearing this bit. |
| 3 | PDN | Power Down. 1 = Powers down the Si3032. A reset pulse on $\overline{RESET}$ is required to restore normal operation. |
| 2:0 | Reserved | Read returns zero. |

Register 7. PLL1 Divide N1

| D7 | D6 | D5 | D4 | D3 | D2 | D1 | D0 |
|---|---|---|---|---|---|---|---|
| Divider N1 ||||||||
| R/W ||||||||

Reset settings = 0000 0000

| Bit | Name | Function |
|---|---|---|
| 7:0 | N1 | N1. Contains the (value − 1) for determining the output frequency on PLL1. |

Register 8. PLL1 Multiply M1

| D7 | D6 | D5 | D4 | D3 | D2 | D1 | D0 |
|---|---|---|---|---|---|---|---|
| Multiplier M1 ||||||||
| R/W ||||||||

Reset settings = 0000 0000

| Bit | Name | Function |
|---|---|---|
| 7:0 | M1 | M1. Contains the (value − 1) for determining the output frequency on PLL1 |

Register 9. PLL2 Divide/Multiply N2/M2

| D7 | D6 | D5 | D4 | D3 | D2 | D1 | D0 |
|---|---|---|---|---|---|---|---|
| Divider N2 |||| Multiplier M2 ||||
| R/W |||| R/W ||||

Reset settings = 0000 0000

| Bit | Name | Function |
|---|---|---|
| 7:4 | N2 | Contains the (value − 1) for determining the output frequency on PLL2. |
| 3:0 | M2 | Contains the (value − 1) for determining the output frequency on PLL2. |

Preliminary Rev. 0.8

Silicon Laboratories

Si3032

Register 10. PLL Control Register

| D7 | D6 | D5 | D4 | D3 | D2 | D1 | D0 |
|----|----|----|----|----|----|----|----|
|    |    |    |    |    |    |    | CGM |
|    |    |    |    |    |    |    | R/W |

Reset settings = 0000 0000

| Bit | Name | Function |
|-----|------|----------|
| 7:1 | reserved | Read returns zero. |
| 0 | CGM | Clock Generation Mode. 1 = A 25/16 ratio is applied to the PLL allowing for a more flexible choice of MCLK frequencies while slowing down the PLL lock time. 0 = No additional ratio is applied to the PLL and faster lock times are possible. |

Register 11. Chip Revision

| D7 | D6 | D5 | D4 | D3 | D2 | D1 | D0 |
|----|----|----|----|----|----|----|----|
|    |    |    |    | REVA |    |    |    |
|    |    |    |    | R    |    |    |    |

Reset settings = N/A

| Bit | Name | Function |
|-----|------|----------|
| 7:4 | Reserved | Read returns zero. |
| 3:0 | REVA | Chip Revision. Four-bit value indicating the revision of the Si3032A (DSP-side) silicon. |

Register 12. Line Side Status

| D7 | D6 | D5 | D4 | D3 | D2 | D1 | D0 |
|----|----|----|----|----|----|----|----|
| CLE | FDT |    |    | LCS |    |    |    |
| R/W | R  |    |    | R   |    |    |    |

Reset settings = N/A

| Bit | Name | Function |
|-----|------|----------|
| 7 | CLE | Com Link Error. 1 = Indicates a communication problem between the Si3032A and the Si3032B. When it goes high, it remains high until a logic 0 is written to it. |
| 6 | FDT | Frame Detect. 1 = Indicates ISOLink frame lock has been established. 0 = Indicates ISOLink has not established frame lock. |
| 5:4 | Reserved | Read returns zero. |
| 3:0 | LCS | Loop Current Sense. Four-bit value returning the loop current in 8-mA increments. 0 = Loop current < 8 mA. 1111 = Loop current > 120 mA. |

Register 13. Transmit and Receive Gain

| D7 | D6 | D5 | D4 | D3 | D2 | D1 | D0 |
|----|----|----|----|----|----|----|----|
|    | CBID | REVB |   |   |   | ARX | ATX |
| R  |      |      |   |   |   | R/W | R/W |

Reset settings = 0000_0000

| Bit | Name | Function |
|-----|------|----------|
| 7 | Reserved | Read returns zero. |
| 6 | CBID | Chip B ID. 1 = Indicates the line side has international support. 0 = Indicates the line side is domestic only. |
| 5:2 | REVB | Chip Revision. Four-bit value indicating the revision of the Si3032B (line side) silicon. |
| 1 | ARX | Receive Gain. 1 = A +6 dB gain is applied to the receive path. 0 = 0 dB gain is applied. |
| 0 | ATX | Transmit Gain. 1 = A −3 dB gain (attenuation) is applied to the transmit path. 0 = 0 dB gain is applied. |

Preliminary Rev. 0.8

Si3032

Pin Descriptions—Si3032A

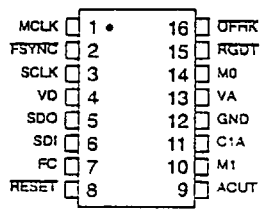

Figure 16. Si3032A Pin Configuration

Serial Interface

MCLK Master Clock Input—High speed master clock input. Generally supplied by the system crystal clock or Modem/DSP.

SCLK Serial Port Bit Clock Output—Controls the serial data on SDOUT and latches the data on SDIN.

SDI Serial Port Data In—Serial communication and control data that is generated by the Modem/DSP and presented as an input to the Si3032A.

SDO Serial Port Data Out—Serial communication data that is provided by the Si3032A to the Modem/DSP.

FSYNC Frame Sync Output—Data framing signal that is used to indicate the start and stop of a communication data frame.

FC Secondary Transfer Request Input—An optional signal to instruct the Si3032A that control data is being requested in a secondary frame.

Control Interface

RGDT Ring Detect—Output signal that indicates the status of a ring signal. Produces an active low, half wave rectified version of the ring signal.

OFHK Off Hook—Input control signal that provides a termination across tip and ring for line seizing and pulse dialing, active low.

RESET Reset Input—An Active low input that is used to reset all control registers to a defined, initialized state. Also used to bring the Si3032 out of sleep mode.

M0 Mode Select 0—One of two mode select pins that is used to select the operation of the serial port/DSP interface.

M1 Mode Select 1—The second of two mode select pins that is used to select the operation of the serial port/DSP interface.

Miscellaneous Signals

AOUT Analog Speaker Output—Provides an analog output signal for driving a call progress speaker.

C1A Isolation Capacitor 1A—Connects to one side of the isolation capacitor C1.

Power Signals

VD Digital Supply Voltage—Provides the digital supply voltage to the Si3032A. Nominally either 5V or 3.3V.

VA Analog Supply Voltage—Provides the analog supply voltage for the Si3032A. Nominally 5V.

GND Ground—Connects to the system digital ground.

Preliminary Rev. 0.8

Si3032

Pin Descriptions—Si3032B

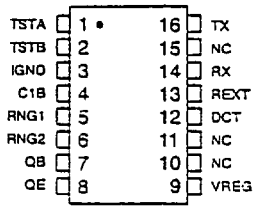

Figure 17. Si3032B Pin Configuration

Line Interface

TX  Transmit Output—Provides the output, through an AC termination impedance, to the telephone network.

RX  Receive Input—Serves as the receive side input from the telephone network.

DCT  DC Termination—Provides DC termination to the telephone network.

REXT  External Resistor—Connects to an external resistor.

RNG1  Connects through a 2200 pF capacitor to the "Tip" lead of the telephone line. Provides the ring and caller ID signals to the Si3032.

RNG2  Connects through a 2200pF capacitor to the "Ring" lead of the telephone line. Provides the ring and caller ID signals to the Si3032.

QB  Transistor Base—Connects to the base of the hookswitch transistor.

QE  Transistor Emitter—Connects to the emitter of the hookswitch transistor.

Isolation

C1B  Isolation Capacitor 1B—Connects to one side of isolation capacitor C1.

IGND  Isolated Ground—Connects to ground on the line-side interface. Also connects to capacitor C2.

Miscellaneous

VREG  Voltage Regulator—Connects to an external capacitor to provide bypassing for an internal voltage regulator.

TSTA  Test Input A—Allows access to test modes, which are reserved for factory use. This pin has an internal pull-up and should be left as a no connect for normal operation.

TSTB  Test Input B—Allows access to test modes, which are reserved for factory use. This pin has an internal pull-up and should be left as a no connect for normal operation.

NC  No Connection—These are unused pins and must be left floating.

Si3032

Ordering Guide

Table 16. Ordering Guide

| Model | DSP Interface | Line Interface | Temperature | Package |
|---|---|---|---|---|
| Si3032A-KS | Digital | | 0°C to 70°C | 16-pin SOIC |
| Si3032B-KS | | North America | 0°C to 70°C | 16-pin SOIC |
| Si3032A-BS | Digital | | 0°C to 90°C | 16-pin SOIC |
| Si3032B-BS | | North America | 0°C to 90°C | 16-pin SOIC |
| Si3034A-KS | Digital | | 0°C to 70°C | 16-pin SOIC |
| Si3034B-KS | | International | 0°C to 70°C | 16-pin SOIC |
| Si3034A-BS | Digital | | 0°C to 90°C | 16-pin SOIC |
| Si3034B-BS | | International | 0°C to 90°C | 16-pin SOIC |

Contact Information

Silicon Laboratories Inc.

2024 E. St. Elmo
Austin, TX 78744
Tel:1+(512) 416-8500
Fax:1+ (512) 416-9669

Email: productinfo@silabs.com

Silicon Laboratories and ISOLink are trademarks of Silicon Laboratories Inc.

Preliminary Rev. 0.8

Si3032
Package Outline
Figure 18 illustrates the package details for the Si3032A and Si3032B. Table 17 lists the values for the dimensions shown in the illustration.
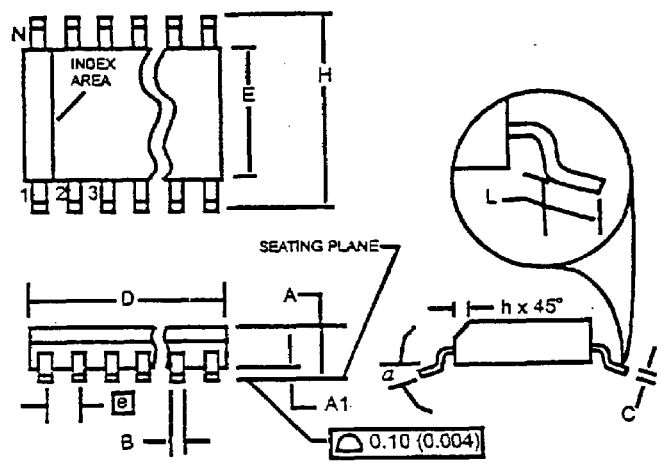
*Controlling Dimension: MM
Figure 18. 16-pin Small Outline Plastic Package (SOIC)
Table 17. Package Diagram Dimensions
| Symbol | Inches | | Millimeters | |
|---|---|---|---|---|
| | Min | Max | Min | Max |
| A | 0.053 | 0.069 | 1.35 | 1.75 |
| A1 | 0.0040 | 0.0098 | 0.102 | 0.249 |
| B | 0.013 | 0.020 | 0.330 | 0.508 |
| C | 0.007 | 0.020 | 0.178 | 0.254 |
| D | 0.386 | 0.394 | 9.80 | 10.01 |
| E | 0.149 | 0.157 | 3.80 | 4.00 |
| e | 0.050 BSC | | 1.27 BSC | |
| H | 0.231 | 0.241 | 5.86 | 6.12 |
| h | 0.0099 | 0.0196 | 0.25 | .50 |
| L | 0.016 | 0.050 | 0.41 | 1.27 |
| N | 16 | | 16 | |
| a | 0° | 8° | 0° | 8° |
Preliminary Rev. 0.8

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:

1. Powered side circuitry for digital direct access arrangement circuitry for terminating a phone line connection at a user end of a phone line, comprising:
   a communication interface capable of being coupled to an external user end device;
   an isolation interface capable of communicating digitally with user end phone line side circuitry through a user end isolation barrier that comprises a plurality of isolation elements; and
   encode circuitry within said isolation interface to generate an encoded digital differential signal from a digital data stream for transmission across at least two of the isolation elements of said isolation barrier, the at least two isolation elements comprising at least a first isolation capacitor and a second isolation capacitor, and the isolation interface being capable of communicating bi-directionally across said first and second isolation capacitors of said isolation barrier;
   wherein said encoded digital differential signal comprises control data added to said digital data stream and wherein said encoded digital differential signal comprises framing data added to said digital data stream for data synchronization within said phone line side circuitry;
   wherein the powered side circuitry is configured to provide a clock signal to the phone line side circuitry through at least one of the plurality of isolation elements; and
   wherein the powered side circuitry is configured so that power is capable of being provided from the powered side circuitry to the phone line side circuitry while still maintaining the isolation required by the phone line isolation regulatory standards.

2. The powered side circuitry of claim 1, wherein the powered side circuitry is further configured to provide a clock signal to the phone line side circuitry through at least one of the plurality of isolation elements that is separate from the first isolation capacitor and the second isolation capacitor.

3. The powered side circuitry of claim 1, wherein each of said plurality of isolation elements of said isolation barrier comprises a capacitor.

4. The powered side circuitry of claim 1, wherein at least a portion of said plurality of isolation elements of said isolation barrier each comprises a capacitor.

5. Powered side circuitry for digital direct access arrangement circuitry for terminating a phone line connection at a user end of a phone line, comprising:
   a communication interface capable of being coupled to an external user end device;
   an isolation interface capable of communicating digitally with user end phone line side circuitry through a user end isolation barrier that comprises a plurality of isolation elements; and
   encode circuitry within said isolation interface to generate an encoded digital differential signal from a digital data stream for transmission across at least two of the isolation elements of said isolation barrier, the at least two isolation elements comprising at least a first isolation capacitor and a second isolation capacitor, and the isolation interface being capable of communicating bi-directionally across said first and second isolation capacitors of said isolation barrier;
   wherein said encoded digital differential signal comprises control data added to said digital data stream and wherein said encoded digital differential signal comprises framing data added to said digital data stream for data synchronization within said phone line side circuitry;
   wherein the powered side circuitry is configured to provide a clock signal to the phone line side circuitry through at least one of the plurality of isolation elements that is separate from the first isolation capacitor and the second isolation capacitor;
   wherein the powered side circuitry is configured so that power is capable of being provided from the powered side circuitry to the phone line side circuitry to generate at least one power supply within the phone line side circuitry while still maintaining the isolation required by the phone line isolation regulatory standards; and
   wherein the encoded digital differential signal includes both data information and control information.

6. The powered side circuitry of claim 5, wherein each of said plurality of isolation elements of said isolation barrier comprises a capacitor.

7. The powered side circuitry of claim 5, wherein at least a portion of said plurality of isolation elements of said isolation barrier each comprises a capacitor.

8. Digital direct access arrangement circuitry for terminating a phone line connection, comprising:
   powered side circuitry operable to communicate digitally with phone line side circuitry across an isolation barrier that comprises a plurality of isolation elements, said digital communication comprising a first digital data stream transmitted as a first digital differential signal across at least two of the isolation elements of said isolation barrier through a first set of bi-directional connections, the at least two isolation elements comprising at least a first isolation capacitor and a second isolation capacitor; and
   phone line side circuitry operable to communicate digitally with said powered side circuitry by a second digital differential signal transmitted across the same first and second isolation capacitors of said isolation barrier through a second set of bi-directional connections so that the first and second isolation capacitors bidirectionally transfer the first and second digital differential signals;
   wherein the powered side circuitry is configured to provide a clock signal to the phone line side circuitry through at least one of the plurality of isolation elements; and
   wherein the powered side circuitry is configured so that power is capable of being provided from the powered side circuitry to the phone line side circuitry while still maintaining the isolation required by the phone line isolation regulatory standards.

9. The digital direct access arrangement circuitry of claim 8, further comprising said isolation barrier coupled between said powered side circuitry and said phone line side circuitry.

10. The digital direct access arrangement circuitry of claim 8, wherein said first digital differential signal comprises an first encoded digital differential signal; and wherein said powered side circuitry includes encode circuitry coupled to said digital data stream to generate said first encoded digital differential signal for transmission across said first and second isolation capacitors of said isolation barrier; and wherein said phone line circuitry includes first decode circuitry to generate a first decoded digital signal from said first encoded digital differential signal.

11. The digital direct access arrangement circuitry of claim 10, wherein said first encoded digital differential signal comprises control data added to said digital data stream.

12. The digital direct access arrangement circuitry of claim 10, wherein said first encoded digital differential signal comprises framing data added to said digital data stream for data synchronization within said phone line side circuitry.

13. The digital direct access arrangement circuitry of claim 8, wherein said second digital differential signal comprises a second encoded digital differential signal; and wherein said phone line side circuitry includes second encode circuitry coupled to said digital data stream to generate said second encoded digital differential signal for transmission across said isolation barrier; and wherein said powered circuitry includes second decode circuitry to generate a second decoded digital signal from said second encoded digital differential signal.

14. The digital direct access arrangement circuitry of claim 13, wherein said encoded digital differential signal comprises control data added to said digital data stream.

15. The digital direct access arrangement circuitry of claim 14, wherein said control data comprises phone line status information.

16. The digital direct access arrangement circuitry of claim 8, wherein at least one of the first digital differential signal and the second digital differential signal includes both data information and control information.

17. The digital direct access arrangement circuitry of claim 8, wherein the powered side circuitry is further configured to provide a clock signal to the phone line side circuitry through at least one of the plurality of isolation elements that is separate from the first isolation capacitor and the second isolation capacitor.

18. The digital direct access arrangement circuitry of claim 8, wherein each of said plurality of isolation elements of said isolation barrier comprises a capacitor.

19. The digital direct access arrangement circuitry of claim 8, wherein at least a portion of said plurality of isolation elements of said isolation barrier each comprises a capacitor.

20. Digital direct access arrangement circuitry for terminating a phone line connection, comprising:
powered side circuitry operable to communicate digitally with phone line side circuitry across an isolation barrier that comprises a plurality of isolation elements, said digital communication comprising a digital data stream transmitted as a first digital differential signal across at least two of the isolation elements of said isolation barrier through a first set of bi-directional connections, the at least two isolation elements comprising at least a first isolation capacitor and a second isolation capacitor; and phone line side circuitry operable to communicate digitally with said powered side circuitry by a second digital differential signal transmitted across the same first and second isolation capacitors of said isolation barrier through a second set of bi-directional connections so that the first and second isolation capacitors bidirectinoally transfer the first and second digital differential signals';

wherein the powered side circuitry is further configured to provide a clock signal to the phone line side circuitry through at least one of the plurality of isolation elements that is separate from the first isolation capacitor and the second isolation capacitor;

wherein the powered side circuitry is configured so that power is capable of being provided from the powered side circuitry to the phone line side circuitry to generate at least one power supply within the phone line side circuitry while still maintaining the isolation required by the phone line isolation regulatory standards; and wherein at least one of the first digital differential signal and the second digital differential signal includes both data information and control information.

21. The digital direct access arrangement circuitry of claim 20, further comprising said isolation barrier coupled between said powered side circuitry and said phone line side circuitry.

22. The digital direct access arrangement circuitry of claim 20, wherein said first digital differential signal comprises an encoded digital differential signal; and wherein said powered side circuitry includes encode circuitry coupled to said digital data stream to generate said encoded digital differential signal for transmission across said first and second isolation capacitors of said isolation barrier; and wherein said phone line circuitry includes decode circuitry to generate a decoded digital signal from said encoded digital differential signal.

23. The digital direct access arrangement circuitry of claim 22, wherein said encoded digital differential signal comprises control data added to said digital data stream.

24. The digital direct access arrangement circuitry of claim 22, wherein said encoded digital differential signal comprises framing data added to said digital data stream for data synchronization within said phone line side circuitry.

25. The digital direct access arrangement circuitry of claim 20, wherein said second digital differential signal comprises an encoded digital differential signal; and wherein said phone line side circuitry includes encode circuitry coupled to said digital data to generate said encoded digital differential signal for transmission across said isolation barrier; and wherein said powered circuitry includes decode circuitry to generate a decoded digital signal from said encoded digital differential signal.

26. The digital direct access arrangement circuitry of claim 25, wherein said encoded digital differential signal comprises control data added to said digital data stream.

27. The digital direct access arrangement circuitry of claim 26, wherein said control data comprises phone line status information.

28. The digital direct access arrangement circuitry of claim 20, wherein each of said plurality of isolation elements of said isolation barrier comprises a capacitor.

29. The digital direct access arrangement circuitry of claim 20, wherein at least a portion of said plurality of isolation elements of said isolation barrier each comprises a capacitor.

30. Powered side circuitry for digital direct access arrangement circuitry for terminating a phone line connection at a user end of a phone line, comprising:
a communication interface capable of being coupled to an external user end device;
an isolation interface capable of communicating digitally with user end phone line side circuitry through a user end isolation barrier that comprises a plurality of isolation elements; and
encode circuitry within said isolation interface to generate an encoded digital differential signal from a digital data stream for transmission across at least two of the isolation elements of said isolation barrier, the at least two isolation elements comprising at least a first isolation capacitor and a second isolation capacitor, and the isolation interface being capable of communicating hi-directionally across said first and second isolation capacitors of said isolation barrier;
wherein said encoded digital differential signal comprises control data added to said digital data stream;
wherein the powered side circuitry is configured to provide a clock signal to the phone line side circuitry through at least one of the plurality of isolation elements; and
wherein the powered side circuitry is configured so that power is capable of being provided from the powered side circuitry to the phone line side circuitry while still maintaining the isolation required by the phone line isolation regulatory standards.

31. The powered side circuitry of claim 30, wherein signals communicated through said communication interface comprise digital data signals, control signals and phone line status signals.

32. The powered side circuitry of claim 31, wherein said communication interface comprises a digital serial port interface.

33. The powered side circuitry of claim 30, wherein the encoded digital differential signal includes both data information and control information.

34. The powered side circuitry of claim 30, wherein the powered side circuitry is further configured to provide a clock signal to the phone line side circuitry through at least one of the plurality of isolation elements that is separate from the first isolation capacitor and the second isolation capacitor.

35. The powered side circuitry of claim 30, wherein each of said plurality of isolation elements of said isolation barrier comprises a capacitor.

36. The powered side circuitry of claim 30, wherein at least a portion of said plurality of isolation elements of said isolation barrier each comprises a capacitor.

37. Powered side circuitry for digital direct access arrangement circuitry for terminating a phone line connection at a user end of a phone line, comprising:
a communication interface capable of being coupled to an external user end device;
an isolation interface capable of communicating digitally with user end phone line side circuitry through a user end isolation barrier that comprises a plurality of isolation elements; and
encode circuitry within said isolation interface to generate an encoded digital differential signal from a digital data stream for transmission across at least two of the isolation elements of said isolation barrier, the at least two isolation elements comprising at least a first isolation capacitor and a second isolation capacitor, and the isolation interface being capable of communicating bi-directionally across said first and second isolation capacitors of said isolation barrier;
wherein said encoded digital differential signal comprises control data added to said digital data stream;
wherein the powered side circuitry is configured to provide a clock signal to the phone line side circuitry through at least one of the plurality of isolation elements that is separate from the first isolation capacitor and the second isolation capacitor;
wherein the powered side circuitry is configured so that power is capable of being provided from the powered side circuitry to the phone line side circuitry to generate at least one power supply within the phone line side circuitry while still maintaining the isolation required by the phone line isolation regulatory standards; and
wherein the encoded digital differential signal includes both data information and control information.

38. The powered side circuitry of claim 37, wherein signals communicated through said communication interface comprise digital data signals, control signals and phone line status signals.

39. The powered side circuitry of claim 38, wherein said communication interface comprises a digital serial port interface.

40. The powered side circuitry of claim 37, wherein each of said plurality of isolation elements of said isolation barrier comprises a capacitor.

41. The powered side circuitry of claim 37, wherein at least a portion of said plurality of isolation elements of said isolation barrier each comprises a capacitor.

42. Digital direct access arrangement circuitry for terminating a phone line connection, comprising:
powered side circuitry operable to communicate digitally with phone line side circuitry, said digital communication comprising a digital data stream transmitted across an isolation barrier that comprises a plurality of isolation elements;
phone line side circuitry operable to communicate digitally with powered side circuitry across said isolation barrier that comprises a plurality of isolation elements; and
encode and decode circuitry coupled to said digital data stream to generate an encoded digital differential signal for transmission and receipt across at least two of the isolation elements of said isolation barrier, the at least two isolation elements comprising at least a first isolation capacitor and a second isolation capacitor;
wherein said encoded digital differential signal comprises control data added to said digital data stream;
wherein communication across said isolation barrier is bi-directional across said first and second isolation capacitors of said isolation barrier;
wherein the powered side circuitry is configured to provide a clock signal to the phone line side circuitry through at least one of the plurality of isolation elements; and
wherein the powered side circuitry is configured so that power is capable of being provided from the powered side circuitry to the phone line side circuitry while still maintaining the isolation required by the phone line isolation regulatory standards.

43. The digital direct access arrangement circuitry of claim 42, further comprising said isolation barrier coupled between said powered side circuitry and said phone line side circuitry.

44. The digital direct access arrangement circuitry of claim 42, wherein said powered side circuitry includes encode circuitry coupled to said digital data stream to generate an encoded digital differential signal for transmission across said at least two isolation elements of said isolation barrier and wherein said phone line circuitry includes decode circuitry to generate a decoded digital signal from said encoded digital differential signal.

45. The digital direct access arrangement circuitry of claim 42, wherein said phone line side circuitry includes encode circuitry coupled to said digital data to generate an encoded digital differential signal for transmission across said at least two isolation elements of said isolation barrier and said powered circuitry includes decode circuitry to generate a decoded digital signal from said encoded digital differential signal.

46. The digital direct access arrangement circuitry of claim 45, wherein said control data comprises phone line status information.

47. The digital direct access arrangement circuitry of claim 42, wherein said phone line side circuitry has analog output signals that is capable of being coupled to phone lines through hook-switch circuitry and diode bridge circuitry.

48. The digital direct access arrangement circuitry of claim 42, wherein the encoded digital differential signal includes both data information and control information.

49. The digital direct access arrangement circuitry of claim 42, wherein the powered side circuitry is further configured to provide a clock signal to the phone line side circuitry through at least one of the plurality of isolation elements that is separate from the first isolation capacitor and the second isolation capacitor.

50. The digital direct access arrangement circuitry of claim 42, wherein each of said plurality of isolation elements of said isolation barrier comprises a capacitor.

51. The digital direct access arrangement circuitry of claim 42, wherein at least a portion of said plurality of isolation elements of said isolation barrier each comprises a capacitor.

52. Digital direct access arrangement circuitry for terminating a phone line connection, comprising:
powered side circuitry operable to communicate digitally with phone line side circuitry, said digital communication comprising a digital data stream transmitted across an isolation barrier that comprises a plurality of isolation elements;
phone line side circuitry operable to communicate digitally with powered side circuitry across said isolation barrier that comprises a plurality of isolation elements; and
encode and decode circuitry coupled to said digital data stream to generate an encoded digital differential signal for transmission and receipt across at least two of the isolation elements of said isolation barrier, the at least two isolation elements comprising at least a first isolation capacitor and a second isolation capacitor;
wherein said encoded digital differential signal comprises control data added to said digital data stream;
wherein communication across said isolation barrier is bi-directional across said first and second isolation capacitors of said isolation barrier;
wherein the powered side circuitry is configured to provide a clock signal to the phone line side circuitry through at least one of the plurality of isolation elements that is separate from the first isolation capacitor and the second isolation capacitor;
wherein the powered side circuitry is configured so that power is capable of being provided from the powered side circuitry to the phone line side circuitry to generate at least one power supply within the phone line side circuitry while still maintaining the isolation required by the phone line isolation regulatory standards; and
wherein the encoded digital differential signal includes both data information and control information.

53. The digital direct access arrangement circuitry of claim 52, further comprising said isolation barrier coupled between said powered side circuitry and said phone line side circuitry.

54. The digital direct access arrangement circuitry of claim 52, wherein said powered side circuitry includes encode circuitry coupled to said digital data stream to generate an encoded digital differential signal for transmission across said at least two isolation elements of said isolation baffler and wherein said phone line circuitry includes decode circuitry to generate a decoded digital signal from said encoded digital differential signal.

55. The digital direct access arrangement circuitry of claim 52, wherein said phone line side circuitry includes encode circuitry coupled to said digital data to generate an encoded digital differential signal for transmission across said at least two isolation elements of said isolation barrier and said powered circuitry includes decode circuitry to generate a decoded digital signal from said encoded digital differential signal.

56. The digital direct access arrangement circuitry of claim 55, wherein said control data comprises phone line status information.

57. The digital direct access arrangement circuitry of claim 52, wherein said phone line side circuitry has analog output signals that is capable of being coupled to phone lines through hook-switch circuitry and diode bridge circuitry.

58. The digital direct access arrangement circuitry of claim 52, wherein each of said plurality of isolation elements of said isolation barrier comprises a capacitor.

59. The digital direct access arrangement circuitry of claim 52, wherein at least a portion of said plurality of isolation elements of said isolation barrier each comprises a capacitor.

* * * * *